US012663371B2

(12) United States Patent
Wallace

(10) Patent No.: US 12,663,371 B2
(45) Date of Patent: Jun. 23, 2026

(54) METHOD OF DETECTING AN ANALYTE IN A MEDIUM COMPRISING A LIGHT SCATTERING CONSTITUENT

(71) Applicant: King's College London, London (GB)

(72) Inventor: Mark Wallace, London (GB)

(73) Assignee: King's College London, London (GB)

( * ) Notice: Subject to any disclaimer, the term of this patent is extended or adjusted under 35 U.S.C. 154(b) by 868 days.

(21) Appl. No.: 17/916,140

(22) PCT Filed: Apr. 1, 2021

(86) PCT No.: PCT/GB2021/050816
§ 371 (c)(1),
(2) Date: Sep. 30, 2022

(87) PCT Pub. No.: WO2021/198695
PCT Pub. Date: Oct. 7, 2021

(65) Prior Publication Data
US 2023/0408408 A1 Dec. 21, 2023

(30) Foreign Application Priority Data
Apr. 3, 2020 (GB) ...................................... 2004944

(51) Int. Cl.
*G01N 21/51* (2006.01)

(52) U.S. Cl.
CPC .................................. *G01N 21/51* (2013.01)

(58) Field of Classification Search
None
See application file for complete search history.

(56) References Cited

U.S. PATENT DOCUMENTS

| | | | |
|---|---|---|---|
| 5,576,204 A | 11/1996 | Blanco et al. | |
| 2020/0041483 A1* | 2/2020 | Fujioka | C12Q 1/6839 |

FOREIGN PATENT DOCUMENTS

| | | |
|---|---|---|
| EP | 2717038 A1 | 4/2014 |
| JP | 2010-243267 A | 10/2010 |
| WO | WO 2000/028312 A1 | 5/2000 |
| WO | WO 2008/102120 A1 | 8/2005 |
| WO | WO 2006/100484 A2 | 9/2006 |
| WO | WO 2007/039847 A1 | 4/2007 |
| WO | WO 2009/024775 A1 | 2/2008 |
| WO | WO 2008/102121 A1 | 8/2008 |
| WO | WO 2009/020682 A2 | 2/2009 |
| WO | WO 2009/035647 A1 | 3/2009 |
| WO | WO 2009/077734 A2 | 6/2009 |
| WO | WO 2010/086622 A1 | 8/2010 |
| WO | WO 2010/122293 A1 | 10/2010 |
| WO | WO 2012/005857 A1 | 1/2012 |
| WO | WO 2012/107778 A2 | 8/2012 |
| WO | 2012/164270 A1 | 12/2012 |
| WO | 2013/057495 A2 | 4/2013 |
| WO | 2013/083983 A1 | 6/2013 |
| WO | 2013/098561 A1 | 7/2013 |
| WO | 2013/098562 A2 | 7/2013 |
| WO | 2013/153359 A1 | 10/2013 |
| WO | 2014/013260 A1 | 1/2014 |
| WO | 2014/064443 A2 | 5/2014 |
| WO | 2014/064444 A1 | 5/2014 |
| WO | 2014/187924 A1 | 11/2014 |
| WO | 2015/055981 A2 | 4/2015 |
| WO | 2015/150786 A1 | 10/2015 |
| WO | 2016/009180 A1 | 1/2016 |
| WO | 2016/034591 A2 | 3/2016 |
| WO | 2016/055777 A2 | 4/2016 |
| WO | 2020/016573 A1 | 1/2020 |

OTHER PUBLICATIONS

United Kingdom Search Report for Application No. GB2004944.1, mailed Jan. 7, 2021.
International Search Report and Written Opinion for Application No. PCT/GB2021/050816, mailed Jul. 22, 2021.
International Preliminary Report on Patentability for Application No. PCT/GB2021/050816, mailed Oct. 13, 2022.
Bayley, Nanopore sequencing: from imagination to reality. Clin Chem. Jan. 2015;61(1):25-31. doi: 10.1373/clinchem.2014.223016. Epub Dec. 4, 2014. Author Manuscript, 11 pages.
Cheng et al., High-speed imaging and tracking of very small single nanoparticles by contrast enhanced microscopy. Nanoscale. Jan. 3, 2019;11(2):568-577. doi: 10.1039/c8nr06789a.
Coker et al., Controlling anomalous diffusion in lipid membranes. arXiv: 1709.04698; Oct. 24, 2017. Accessed online: https://arxiv.org/pdf/1709.04698.pdf. 16 pages.
Curtis, The Mechanism of Adhesion of Cells to Glass. A Study by Interference Reflection Microscopy. J Cell Biol. Feb. 1964;20(2):199-215. doi: 10.1083/jcb.20.2.199.
De Wit et al., Dynamic label-free imaging of lipid nanodomains. Proc Natl Acad Sci U S A. Oct. 6, 2015;112(40):12299-303. doi: 10.1073/pnas.1508483112. Epub Sep. 23, 2015.
Gonzalez-Perez et al., Biomimetic triblock copolymer membrane arrays: a stable template for functional membrane proteins. Langmuir. Sep. 15, 2009;25(18):10447-50. doi: 10.1021/la902417m.
Howorka et al., A protein pore with a single polymer chain tethered within the lumen. Journal of the American Chemical Society. Mar. 22, 2000;122(11):2411-6.
Howorka et al., Sequence-specific detection of individual DNA strands using engineered nanopores. Nat Biotechnol. Jul. 2001;19(7):636-9. doi: 10.1038/90236.
Huang et al., High-throughput optical sensing of nucleic acids in a nanopore array. Nat Nanotechnol. Nov. 2015;10(11):986-91. doi: 10.1038/nnano.2015.189. Epub Aug. 31, 2015.
(Continued)

*Primary Examiner* — Samuel C Woolwine

(74) *Attorney, Agent, or Firm* — Wolf, Greenfield & Sacks, P.C.

(57) ABSTRACT

The invention provides methods of optically detecting an analyte in a medium as the analyte moves with respect to a nanopore. The analyte may be, for example, a biological molecule such as a polynucleotide or polypeptide. Systems and apparatuses for carrying our such methods are also provided.

22 Claims, 7 Drawing Sheets

Specification includes a Sequence Listing.

(56)  References Cited

OTHER PUBLICATIONS

Jacobsen et al., Interferometric optical detection and tracking of very small gold nanoparticles at a water-glass interface. Opt Express. Jan. 9, 2006;14(1):405-14. doi: 10.1364/opex.14.000405.

Kim, Digital Holographic Microscopy: Principles, Techniques, and Applications, 2011 (162), Springer-Verlag New York. Preface and content, 14 pages.

Langecker et al., Synthetic lipid membrane channels formed by designed DNA nanostructures. Science. Nov. 16, 2012;338(6109):932-6. doi: 10.1126/science.1225624.

Leptihn et al., Constructing droplet interface bilayers from the contact of aqueous droplets in oil. Nat Protoc. Jun. 2013;8(6):1048-57. doi: 10.1038/nprot.2013.061. Epub May 2, 2013.

Shi et al., A scattering nanopore for single nanoentity sensing. ACS Sensors. Sep. 23, 2016;1(9):1086-90. DOI: 10.1021 /acssensors. 6b00408.

Shi et al., An integrated system for optical and electrical detection of single molecules/particles inside a solid-state nanopore. Faraday Discuss. 2015;184:85-99. doi: 10.1039/c5fd00060b. Epub Sep. 30, 2015.

Taylor et al., Interferometric Scattering Microscopy: Seeing Single Nanoparticles and Molecules via Rayleigh Scattering. Nano Lett. Aug. 14, 2019;19(8):4827-4835. doi: 10.1021/acs.nanolett. 9b01822. Epub Jul. 30, 2019.

Verschueren et al., Label-Free Optical Detection of DNA Translocations through Plasmonic Nanopores. ACS Nano. Jan. 22, 2019;13(1):61-70. doi: 10.1021/acsnano.8b06758. Epub Dec. 10, 2018.

Verschueren, Plasmonic nanopores for single molecule sensing. Thesis; Delft University of Technology, 2018. DOI: 10.4233/ uuid:a0099c3d-3244-4789-baa7-4819d7a429fa, Retrieved from the Internet: https://pure.tudelft.nl/ws/portalfiles/portal/46669799/01981_ INN_FC_V2.pdf. 250 pages.

Weber, Reflection interference contrast microscopy. Methods Enzymol. 2003;361:34-47. doi: 10.1016/s0076-6879(03)61004-9.

* cited by examiner

Fig. 4

METHOD OF DETECTING AN ANALYTE IN A MEDIUM COMPRISING A LIGHT SCATTERING CONSTITUENT

RELATED APPLICATIONS

This application is a national stage filing under 35 U.S.C. § 371 of international PCT application PCT/GB2021/050816, filed Apr. 1, 2021, which claims the benefit of Great Britain application number GB 2004944.1, filed Apr. 3, 2020, each of which is herein incorporated by reference in its entirety.

REFERENCE TO A SEQUENCE LISTING SUBMITTED AS A TEXT FILE VIA EFS-WEB

The instant application contains a Sequence Listing which has been submitted in ASCII format via EFS-Web and is hereby incorporated by reference in its entirety. Said ASCII copy, created on Sep. 16, 2022, is named O036670132US00-SEQ-KZM and is 36,603 bytes in size.

FIELD

The present invention relates to methods of optically detecting analytes in a medium, and to systems and apparatuses for optically detecting analytes in a medium. The methods are particularly suited to detecting and characterising analytes such as polynucleotides and polypeptides.

BACKGROUND

Nanopore sensing is an approach to analyte detection and characterization that relies on the observation of individual binding or interaction events between the analyte molecules and an ion conducting channel. Nanopore sensors can be created by placing a pore of nanometre dimensions in an electrically insulating membrane and measuring signals, such as voltage-driven ion currents, through or across the pore in the presence of analyte molecules. Typically, the presence of an analyte alters the measured signal and the properties of the signal are characteristic of the analyte.

Polypeptides and polynucleotides are important analytes for sensing in this manner. Nanopore sensing of polypeptide and polynucleotide analytes can reveal the identity and perform single molecule counting of the sensed analytes, but can also provide information on their composition such as their sequence, as well as the presence of characteristics such as amino acid/base modifications, oxidation, reduction, decarboxylation, deamination and more. Nanopore sensing has the potential to allow rapid and cheap polynucleotide and polypeptide sequencing, e.g. providing single molecule sequence reads of polynucleotides of tens to hundreds of thousands (or even more) bases in length.

In some known systems of nanopore sensing, the signal measured may be a voltage driven ion current measured through the pore, and in the presence of an analyte such as a polypeptide or polynucleotide the current signal can be measured as the analyte interacts with the pore. For example, when the analyte is a polynucleotide, information about the properties of the polynucleotide can be determined from the duration and extent of current blocks and the variance of current levels during the interaction time of the polynucleotide with the pore. However, electrically detecting ionic currents can be challenging, e.g. in a massively parallelised system such as an extended array of nanopores as each nanopore in the array needs to be individually electrically addressable. Furthermore, the high salt concentrations typically necessary to generate ionic currents of sufficient magnitude to allow appropriate discrimination of analytes can interact or interfere with the analytes present. Furthermore, if multiple nanopores are present in the electrically addressable area, the electrical signal recorded reports on an average ionic current recorded for all nanopores present.

One approach that has been suggested for addressing this problem is to use optical detection of analyte molecules as they interact with the pore. For example, a known method involves the optical encoding of an ionic flux. A fluorescent signal can be recorded from an indicator dye. The fluorescent signal arises as a cofactor specific for the indicator flows through the pore. For example, a suitable indicator dye is the fluorescent molecule Fluo-8, which fluoresces in the presence of its cofactor $Ca^{2+}$. Uninterrupted, the flow of the cofactor ($Ca^{2+}$) through the pore under the influence of an applied voltage leads to a steady background fluorescent signal in the vicinity of the pore. The presence of an analyte blocks the flow of the cofactor and thus perturbs the fluorescent signal recorded in the vicinity of the pore. In this manner, the optical fluorescent signal is a proxy for the electrical ionic current recorded in conventional nanopore techniques. Such techniques are described in Huang et al, Nature Nanotechnology 10, 986-991 (2015).

Whilst this approach has shown promise, problems remain outstanding. For example, the generation of the fluorescent signal requires labelling the analyte (e.g. using an indicator dye as described above). Indicator dyes are typically expensive and can perturb the system under investigation (e.g. by reacting with or altering the properties of the analyte at issue). Furthermore, the detection of fluorescence with a suitable degree of accuracy for single-molecule discrimination of analytes requires complex equipment, such as filter assemblies, cameras, and high numerical aperture optics, all of which are difficult to miniaturise for practical operation. Furthermore, the physics of fluorescence places limits on the practical utility of such methods. Firstly, only limited photon flux is achievable from an individual fluorescent molecule, and the sensitivity of current optical technologies is such that this limits the maximum possible acquisition rate (i.e. the minimum sample time) to around 100 µs for a single fluorophore. As such, discriminating between analyte events that occur on a faster time scale (e.g. discriminating between individual nucleotides in a polynucleotide as they move through a nanopore at a rate of greater than 100 µs/nucleotide) may not be possible. Secondly, photo-bleaching places severe limits on the maximum time duration to which a single fluorophore can be probed, thus limiting the maximum possible acquisition time.

Given these issues, there is a pressing need to provide new methods of optically detecting analytes as they move with respect to a nanopore. The methods provided herein are intended to address some or all of these issues.

SUMMARY

The disclosure relates to a method of detecting an analyte in a medium. The medium comprises a light-scattering constituent. The method comprises contacting the medium with a nanopore such that a flux of the light-scattering constituent is generated through the nanopore. The analyte is contacted with the nanopore such that the analyte influences the flux of the constituent through the nanopore. The medium in the vicinity of the nanopore is illuminated with one or more light sources thus resulting in the generation of a scattering signal as light is scattered from the constituent. By measuring the scattering signal as the analyte moves with respect to the nanopore, the analyte can be detected as it moves with respect to the nanopore.

Accordingly, provided herein is a method of detecting an analyte in a medium, the medium comprising a light-scattering constituent, the method comprising:

contacting the medium with a nanopore;

generating a flux of the constituent through the nanopore;

contacting the analyte with the nanopore so that the analyte influences the flux of the constituent through the nanopore;

illuminating the medium in the vicinity of the nanopore with one or more light sources; and taking one or more measurements of the light scattered by the constituent in the vicinity of the nanopore as the analyte moves with respect to the nanopore, and thereby detecting the analyte as it moves with respect to the nanopore.

In some embodiments, taking one or more measurements of the light scattered by the constituent comprises generating a scattering signal corresponding to the flux of the constituent through the nanopore. In some embodiments, taking one or more measurements of the light scattered by the constituent comprises detecting interference between the scattering signal and a reference beam. In some embodiments, the interference is detected by reflection interference contrast microscopy, digital holographic interference microscopy, interference scattering microscopy (iSCAT), or coherent brightfield interference microscopy (COBRI).

In some embodiments, the reference beam is reflected from an interface.

In some embodiments, the flux of the constituent is from a first volume of medium to a second volume of medium, and the one or more measurements of the light scattered by the constituent are one or more measurements of the second volume of medium in the vicinity of the nanopore.

In some embodiments, the one or more light sources each independently comprise a laser, a superluminescent diode and/or an incoherent source, preferably an LED or a lamp. In some embodiments, the scattering signal, the reference beam and/or interference therebetween is detected using a detector selected from a CCD, a CMOS camera, and a point detector such as a photodiode.

In some embodiments, the light-scattering constituent has a refractive index different to the refractive index of the medium. In some embodiments, the light-scattering constituent has a refractive index greater than the refractive index of the medium.

In some embodiments, the constituent comprises a hydrophilic water-soluble molecule. In some embodiments, the constituent is uncharged. In some embodiments, the constituent comprises a saccharide or a polyethylene glycol. In some embodiments, the constituent does not comprise a fluorophore.

In some embodiments, the flux of the constituent through the nanopore is driven by a physical or chemical potential. In some embodiments, the flux of the constituent through the nanopore is driven by an electrical potential or by a chemical concentration gradient across the nanopore.

In some embodiments, the analyte is a biological polymer. In some embodiments, the analyte is a polynucleotide or a polypeptide. In some embodiments, the analyte is not labelled or is not labelled with an optical label such as a fluorophore or chromophore.

In some embodiments, the movement of the analyte with respect to the nanopore is driven by a physical or chemical potential. In some embodiments the methods comprise contacting the analyte with a motor protein, wherein the motor protein controls the movement of the analyte with respect to the nanopore. In some embodiments the motor protein is a helicase, a polymerase, an exonuclease, a topoisomerase, an unfoldase, or a variant thereof.

In some embodiments, the medium comprises an aqueous or non-aqueous solvent.

In some embodiments, the nanopore is a transmembrane nanopore. In some embodiments the nanopore is a protein nanopore, a solid-state nanopore, a nucleic acid nanopore or a polymer nanopore. In some embodiments the nanopore is a beta-barrel protein nanopore. In some embodiments, the nanopore is present in a membrane. In some embodiments, the nanopore is present in a droplet interface bilayer. In some embodiments, the nanopore is present in an array of a plurality of nanopores.

Also provided is a method of characterising an analyte, comprising carrying out a method as described herein; and taking one or more measurements as the analyte moves with respect to the nanopore, wherein the one or more measurements are indicative of one or more characteristics of the analyte, and thereby characterising the analyte as it moves with respect to the pore.

Also provided is a system, comprising:

a medium comprising a light-scattering constituent;

a nanopore in contact with the medium;

the medium in the vicinity of the nanopore being illuminated by one or more light sources; and a reference light source.

In some embodiments, the light-scattering constituent is non-fluorescent. In some embodiments, the medium comprises an analyte for detection. In some embodiments, the system further comprises a motor protein for controlling the movement of the analyte with respect to the nanopore.

Also provided is an apparatus for detecting an analyte, comprising:

a chamber having a volume, said volume containing a medium comprising a light-scattering constituent;

a membrane comprising a nanopore, wherein said nanopore is in contact with said medium;

one or more light sources for illuminating the volume in the vicinity of the nanopore; and a detector for detecting light scattered by the constituent.

In some embodiments, the detector is configured to detect interference between a scattering signal corresponding to flux of the constituent through the nanopore and a reference beam. In some embodiments, the medium comprises an analyte for detection. In some embodiments, the apparatus further comprises a motor protein for controlling the movement of the analyte with respect to the nanopore.

BRIEF DESCRIPTION OF THE FIGURES

FIG. 4. Montage of imaged α-hemolysin nanopores in the presence of a 1 M sucrose gradient in the absence of analytes. Results described in the Example.

DETAILED DESCRIPTION

Figure 1:
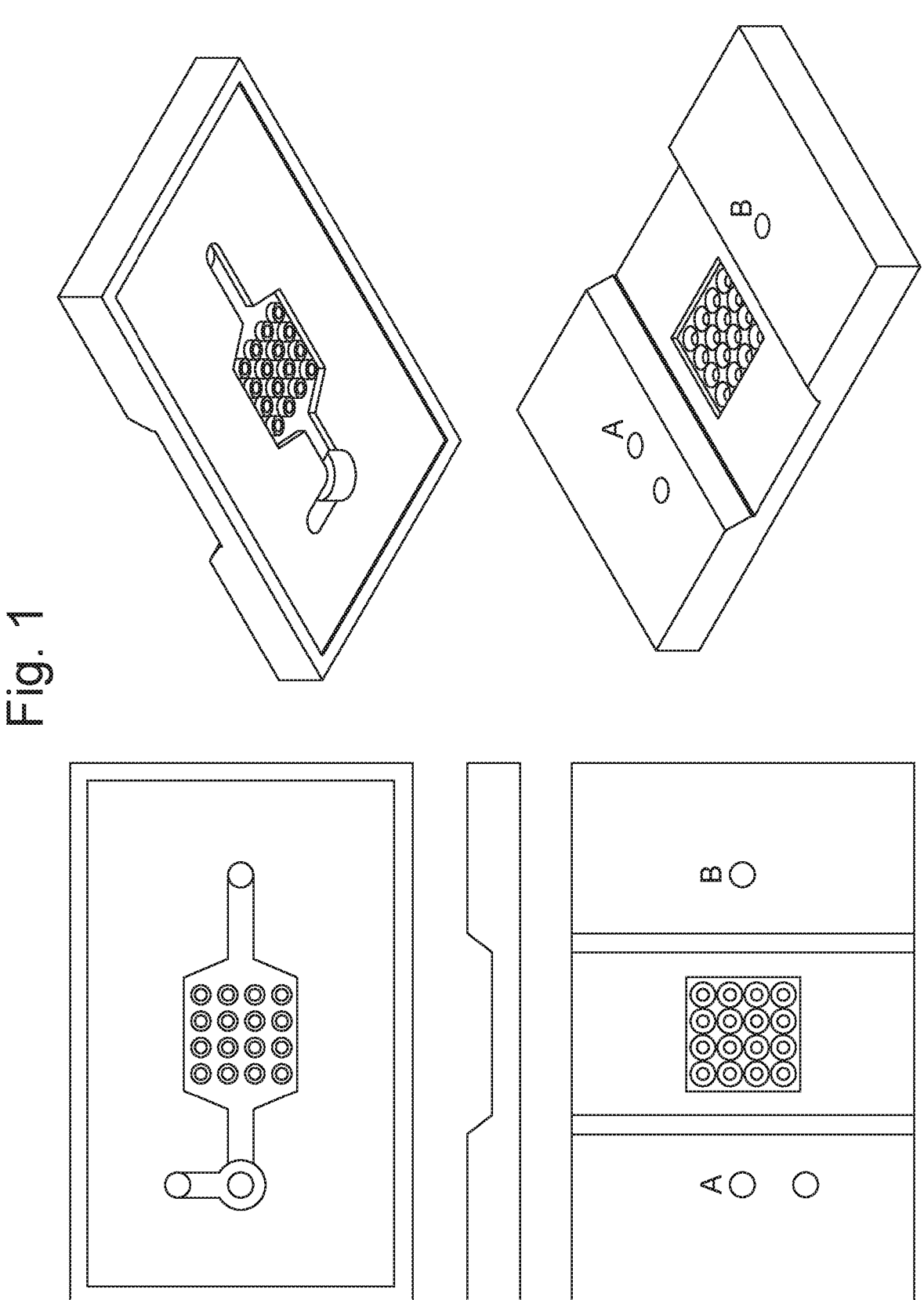
FIG. 1. Schematic of a PMMA micro-machined coverslip useful for generating droplet interface bilayers as described in the Example.

The present invention will be described with respect to particular embodiments and with reference to certain drawings but the invention is not limited thereto but only by the claims. Any reference signs in the claims shall not be construed as limiting the scope. Of course, it is to be understood that not necessarily all aspects or advantages may be achieved in accordance with any particular embodiment of the invention. Thus, for example those skilled in the art will recognize that the invention may be embodied or carried out in a manner that achieves or optimizes one advantage or group of advantages as taught herein without necessarily achieving other aspects or advantages as may be taught or suggested herein.

The invention, both as to organization and method of operation, together with features and advantages thereof, may best be understood by reference to the following detailed description when read in conjunction with the accompanying drawings. The aspects and advantages of the invention will be apparent from and elucidated with reference to the embodiment(s) described hereinafter. Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

It should be appreciated that "embodiments" of the disclosure can be specifically combined together unless the context indicates otherwise. The specific combinations of all disclosed embodiments (unless implied otherwise by the context) are further disclosed embodiments of the claimed invention.

In addition as used in this specification and the appended claims, the singular forms "a", "an", and "the" include plural referents unless the content clearly dictates otherwise. Thus, for example, reference to "an analyte" includes two or more analytes, reference to "a constituent" includes two or more such constituents, reference to "a polynucleotide binding protein" includes two or more such proteins, reference to "a monomer" refers to two or more monomers, reference to "a pore" includes two or more pores and the like.

All publications, patents and patent applications cited herein, whether supra or infra, are hereby incorporated by reference in their entirety.

Definitions

Where an indefinite or definite article is used when referring to a singular noun e.g. "a" or "an", "the", this includes a plural of that noun unless something else is specifically stated. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. The following terms or definitions are provided solely to aid in the understanding of the invention. Unless specifically defined herein, all terms used herein have the same meaning as they would to one skilled in the art of the present invention. Practitioners are particularly directed to Sambrook et al., Molecular Cloning: A Laboratory Manual, 4th ed., Cold Spring Harbor Press, Plainsview, New York (2012); and Ausubel et al., Current Protocols in Molecular Biology (Supplement 114), John Wiley & Sons, New York (2016), for definitions and terms of the art. The definitions provided herein should not be construed to have a scope less than understood by a person of ordinary skill in the art.

"About" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

"Nucleotide sequence", "DNA sequence" or "nucleic acid molecule(s)" as used herein refers to a polymeric form of nucleotides of any length, either ribonucleotides or deoxyribonucleotides. This term refers only to the primary structure of the molecule. Thus, this term includes double- and single-stranded DNA, and RNA. The term "nucleic acid" as used herein, is a single or double stranded covalently-linked sequence of nucleotides in which the 3' and 5' ends on each nucleotide are joined by phosphodiester bonds. The polynucleotide may be made up of deoxyribonucleotide bases or ribonucleotide bases. Nucleic acids may be manufactured synthetically in vitro or isolated from natural sources. Nucleic acids may further include modified DNA or RNA, for example DNA or RNA that has been methylated, or RNA that has been subject to post-translational modification, for example 5'-capping with 7-methylguanosine, 3'-processing such as cleavage and polyadenylation, and splicing. Nucleic acids may also include synthetic nucleic acids (XNA), such as hexitol nucleic acid (HNA), cyclohexene nucleic acid (CeNA), threose nucleic acid (TNA), glycerol nucleic acid (GNA), locked nucleic acid (LNA) and peptide nucleic acid (PNA). Sizes of nucleic acids, also referred to herein as "polynucleotides" are typically expressed as the number of base pairs (bp) for double stranded polynucleotides, or in the case of single stranded polynucleotides as the number of nucleotides (nt). One thousand bp or nt equal a kilobase (kb). Polynucleotides of less than around 40 nucleotides in length are typically called "oligonucleotides" and may comprise primers for use in manipulation of DNA such as via polymerase chain reaction (PCR).

The term "amino acid" in the context of the present disclosure is used in its broadest sense and is meant to include organic compounds containing amine ($NH_2$) and carboxyl (COOH) functional groups, along with a side chain (e.g., a R group) specific to each amino acid. In some embodiments, the amino acids refer to naturally occurring L α-amino acids or residues. The commonly used one and three letter abbreviations for naturally occurring amino acids are used herein: A=Ala; C=Cys; D=Asp; E=Glu; F=Phe; G=Gly; H=His; I=Ile; K=Lys; L=Leu; M=Met; N=Asn; P=Pro; Q=Gln; R=Arg; S=Ser; T=Thr; V=Val; W=Trp; and Y=Tyr (Lehninger, A. L., (1975) Biochemistry, 2d ed., pp. 71-92, Worth Publishers, New York). The general term "amino acid" further includes D-amino acids, retro-inverso amino acids as well as chemically modified amino acids such as amino acid analogues, naturally occurring amino acids that are not usually incorporated into proteins such as norleucine, and chemically synthesised compounds having properties known in the art to be characteristic of an amino acid, such as 3-amino acids. For example, analogues or mimetics of phenylalanine or proline, which allow the same conformational restriction of the peptide compounds as do natural Phe or Pro, are included within the definition of amino acid. Such analogues and mimetics are referred to herein as "functional equivalents" of the respective amino acid. Other examples of amino acids are listed by Roberts and Vellaccio, The Peptides: Analysis, Synthesis, Biology, Gross and Meiehofer, eds., Vol. 5 p. 341, Academic Press, Inc., N.Y. 1983, which is incorporated herein by reference.

The terms "polypeptide", and "peptide" are interchangeably used herein to refer to a polymer of amino acid residues and to variants and synthetic analogues of the same. Thus, these terms apply to amino acid polymers in which one or more amino acid residues is a synthetic non-naturally-occurring amino acid, such as a chemical analogue of a corresponding naturally occurring amino acid, as well as to naturally-occurring amino acid polymers. Polypeptides can also undergo maturation or post-translational modification processes that may include, but are not limited to: glycosylation, proteolytic cleavage, lipidization, signal peptide cleavage, propeptide cleavage, phosphorylation, and such like. A peptide can be made using recombinant techniques, e.g., through the expression of a recombinant or synthetic polynucleotide. A recombinantly produced peptide it typically substantially free of culture medium, e.g., culture medium represents less than about 20%, more preferably less than about 10%, and most preferably less than about 5% of the volume of the protein preparation.

The term "protein" is used to describe a folded polypeptide having a secondary or tertiary structure. The protein may be composed of a single polypeptide, or may comprise multiple polypeptides that are assembled to form a multimer. The multimer may be a homooligomer, or a heterooligomer. The protein may be a naturally occurring, or wild type protein, or a modified, or non-naturally, occurring protein. The protein may, for example, differ from a wild type protein by the addition, substitution or deletion of one or more amino acids.

A "variant" of a protein encompass peptides, oligopeptides, polypeptides, proteins and enzymes having amino acid substitutions, deletions and/or insertions relative to the unmodified or wild-type protein in question and having similar biological and functional activity as the unmodified protein from which they are derived. The term "amino acid identity" as used herein refers to the extent that sequences are identical on an amino acid-by-amino acid basis over a window of comparison. Thus, a "percentage of sequence identity" is calculated by comparing two optimally aligned sequences over the window of comparison, determining the number of positions at which the identical amino acid residue (e.g., Ala, Pro, Ser, Thr, Gly, Val, Leu, Ile, Phe, Tyr, Trp, Lys, Arg, His, Asp, Glu, Asn, Gln, Cys and Met) occurs in both sequences to yield the number of matched positions, dividing the number of matched positions by the total number of positions in the window of comparison (i.e., the window size), and multiplying the result by 100 to yield the percentage of sequence identity.

For all aspects and embodiments of the present invention, a "variant" has at least 50%, 60%, 70%, 80%, 90%, 95% or 99% complete sequence identity to the amino acid sequence of the corresponding wild-type protein. Sequence identity can also be to a fragment or portion of the full length polynucleotide or polypeptide. Hence, a sequence may have only 50% overall sequence identity with a full length reference sequence, but a sequence of a particular region, domain or subunit could share 80%, 90%, or as much as 99% sequence identity with the reference sequence.

The term "wild-type" refers to a gene or gene product isolated from a naturally occurring source. A wild-type gene is that which is most frequently observed in a population and is thus arbitrarily designed the "normal" or "wild-type" form of the gene. In contrast, the term "modified", "mutant" or "variant" refers to a gene or gene product that displays modifications in sequence (e.g., substitutions, truncations, or insertions), post-translational modifications and/or functional properties (e.g., altered characteristics) when compared to the wild-type gene or gene product. It is noted that naturally occurring mutants can be isolated; these are identified by the fact that they have altered characteristics when compared to the wild-type gene or gene product. Methods for introducing or substituting naturally-occurring amino acids are well known in the art. For instance, methionine (M) may be substituted with arginine (R) by replacing the codon for methionine (ATG) with a codon for arginine (CGT) at the relevant position in a polynucleotide encoding the mutant monomer. Methods for introducing or substituting non-naturally-occurring amino acids are also well known in the art. For instance, non-naturally-occurring amino acids may be introduced by including synthetic aminoacyl-tRNAs in the IVTT system used to express the mutant monomer. Alternatively, they may be introduced by expressing the mutant monomer in E. coli that are auxotrophic for specific amino acids in the presence of synthetic (i.e. non-naturally-occurring) analogues of those specific amino acids. They may also be produced by naked ligation if the mutant monomer is produced using partial peptide synthesis. Conservative substitutions replace amino acids with other amino acids of similar chemical structure, similar chemical properties or similar side-chain volume. The amino acids introduced may have similar polarity, hydrophilicity, hydrophobicity, basicity, acidity, neutrality or charge to the amino acids they replace. Alternatively, the conservative substitution may introduce another amino acid that is aromatic or aliphatic in the place of a pre-existing aromatic or aliphatic amino acid. Conservative amino acid changes are well-known in the art and may be selected in accordance with the properties of the 20 main amino acids as defined in Table 1 below. Where amino acids have similar polarity, this can also be determined by reference to the hydropathy scale for amino acid side chains in Table 2.

TABLE 1

| Chemical properties of amino acids | | | |
|---|---|---|---|
| Ala | aliphatic, hydrophobic, neutral | Met | (i)ydrophobic, neutral |
| Cys | polar, hydrophobic, neutral | Asn | polar, hydrophilic, neutral |
| Asp | polar, hydrophilic, charged (−) | Pro | hydrophobic, neutral |
| Glu | polar, hydrophilic, charged (−) | Gln | polar, hydrophilic, neutral |
| Phe | aromatic, hydrophobic, neutral | Arg | polar, hydrophilic, charged (+) |
| Gly | aliphatic, neutral | Ser | polar, hydrophilic, neutral |
| His | aromatic, polar, hydrophilic, charged (+) | Thr | polar, hydrophilic, neutral |
| Ile | aliphatic, hydrophobic, neutral | Val | aliphatic, hydrophobic, neutral |
| Lys | polar, hydrophilic, charged (+) | Trp | aromatic, hydrophobic, neutral |
| Leu | aliphatic, hydrophobic, neutral | Tyr | aromatic, polar, hydrophobic |

TABLE 2

| Hydropathy scale | |
|---|---|
| Side Chain | Hydropathy |
| Ile | 4.5 |
| Val | 4.2 |
| Leu | 3.8 |
| Phe | 2.8 |
| Cys | 2.5 |
| Met | 1.9 |
| Ala | 1.8 |
| Gly | −0.4 |
| Thr | −0.7 |
| Ser | −0.8 |
| Trp | −0.9 |
| Tyr | −1.3 |
| Pro | −1.6 |
| His | −3.2 |
| Glu | −3.5 |
| Gln | −3.5 |
| Asp | −3.5 |
| Asn | −3.5 |
| Lys | −3.9 |
| Arg | −4.5 |

A mutant or modified protein, monomer or peptide can also be chemically modified in any way and at any site. A mutant or modified monomer or peptide is preferably chemically modified by attachment of a molecule to one or more cysteines (cysteine linkage), attachment of a molecule to one or more lysines, attachment of a molecule to one or more non-natural amino acids, enzyme modification of an epitope or modification of a terminus. Suitable methods for carrying out such modifications are well-known in the art. The mutant of modified protein, monomer or peptide may be chemically modified by the attachment of any molecule. For instance, the mutant of modified protein, monomer or peptide may be chemically modified by attachment of a dye or a fluorophore.

Methods of Detecting Analytes

The disclosure relates to methods of detecting an analyte in a medium. As explained above, the method involves generating a flux of a light-scattering constituent through a nanopore and contacting the analyte with the nanopore such that the analyte influences the flux of the constituent through the nanopore. By illuminating the medium in the vicinity of the nanopore with one or more light sources, the light-scattering constituent in the vicinity of the nanopore causes the light to be scattered. By taking measurements of the light scattered by the constituent as the analyte moves with respect to the nanopore, the analyte is detected as it moves with respect to the nanopore.

It will be understood the light scattered by the light-scattering constituent refers to the scattering of the light by the flux of the light-scattering constituent through the nanopore. Thus, the light is scattered by the light-scattering constituent molecules which are present in the flux of the light-scattering constituent. Thus, embodiments of the claimed methods comprise taking one or more measurements of the light scattered by the flux of the light-scattering constituent in the vicinity of the nanopore.

The method addresses problems associated with known methods of detecting analytes as they move with respect to nanopores. For example, as explained above, established methods which comprise electrically detecting an ionic current through the nanopore require that each individual nanopore in an array is individually electrically addressable. By contrast, the provided methods comprise illuminating the vicinity of a nanopore and taking measurements of light scattered in the vicinity of the nanopore, and thus address each nanopore individually. Whilst in some embodiments, an electrical potential can be used to generate the flux of the light-scattering constituent through the nanopore, there is no requirement that each nanopore in an array is individually electrically addressable. Thus, the provided methods are more amenable to parallelisation and miniaturisation than previously known methods. There is further no requirement that the constituent used to generate the scattering signal is electrically charged such that the flux of the constituent can be driven by an applied electrical potential. Whilst the use of charged constituents (e.g. driven by a voltage potential) is within the scope of the provided methods, the methods are also amenable to the generation of flux by application of a chemical or physical potential and are suited to the use of uncharged molecules.

Another advantage arises by comparison with known methods which involve detecting fluorescence. In the methods provided herein, a scattering signal is detected which is identifiable with the flux of the constituent through the nanopore. The scattering signal is not subject to photo-bleaching and does not rely on, for example, the quantum yield of the constituent molecule. The methods are not subject to optical saturation. Furthermore, the provided methods have the potential to be much more sensitive than fluorescence-based methods. The provided methods also have the potential to be much quicker than fluorescence based measurements and can be used to record analytes on a time scale of micro-seconds (μs) rather than typically milli-seconds (ms) for fluorescence based measurements.

Yet another advantage arises from the simplicity of the equipment that is required to put the provided methods into practice. In theory, the only equipment needed is a suitable light source for scattering from the constituent, and a detector suitable for detecting the scattering signal. Whilst the invention is not limited to this, and embraces embodiments in which further optics and processers etc are used in order to measure the light scattered by the constituent and thus detect the analyte as it moves with respect to the pore, the simplicity of the technique means that it is well suited for parallelisation and miniaturisation.

Still further advantages will be apparent to those skilled in the art in view of the description of the provided methods that follows.

Detection of Analytes

The inventors have found that it is possible to detect an analyte as it moves with respect to a nanopore by taking one or more measurements of the light scattered by a light-scattering constituent in the vicinity of the nanopore.

Light scattering is physical phenomenon whereby incident light interacts with a molecule (known herein as a light scattering constituent) and causes output radiation which can be detected. The output radiation can be of the same or different wavelength to the incident radiation. The term "light" as used herein includes both visible light wavelengths, and also wavelengths in the infra-red and ultra-violet, particularly the near-infra-red and near-ultra-violet.

One example of light scattering is Rayleigh scattering. Rayleigh scattering is a predominantly elastic scattering caused by particles having a smaller dimension than the wavelength of the electromagnetic radiation used. In typical operation, the Rayleigh scattering generated is proportional to $1/\lambda^4$, wherein $\lambda$ is the wavelength of the scattering radiation.

The inventors have found that many molecules have an appropriate molecular cross section to cause significant scattering, e.g. significant Rayleigh scattering, when exposed to light radiation. In developing the claimed methods, the inventors found that generating a flux of such molecules through a nanopore and irradiating the vicinity of the nanopore with light radiation led to a scattering signal that reported on the status of the nanopore (e.g. the extent to which it is blocked by an analyte molecule) in much the same way as a flow of charged ions such as $K^+$ ions through the nanopore can generate an ionic current that reports on the status of the nanopore. Changes in the scattering signal generated by irradiating the flux of light-scattering molecules through the nanopore can be determined and correlated with the status of the nanopore; which in turn is associated with properties of analytes as they move with respect to the nanopore. In embodiments of the claimed methods, taking one or more measurements of the light scattered by the constituent thus comprises generating a scattering signal corresponding to the flux of the constituent through the nanopore.

For example, in some embodiments a decrease in the scattering signal indicates that the flux of the light-scattering constituent through the nanopore is being blocked by the analyte. Detecting a decrease in the scattering signal may therefore in some embodiments correspond to detecting the presence of the analyte. More subtle differences in the scattering signal can be identified with properties of the analyte. For example, changes in the scattering signal may arise from variation in the structure of the analyte, for example in the nucleotide sequence of a polynucleotide analyte or in the peptide sequence of a polypeptide analyte. By monitoring changes in the scattering signal as an analyte such as a polynucleotide or polypeptide moves with respect to the pore, the properties of the analyte (e.g. the sequence of the polynucleotide or the polypeptide or the presence or absence of modifications made to the sequence, etc) can be determined.

In more detail, as an analyte molecule passes through the channel of a nanopore, it causes a directly correlated reduction in the flux of the light-scattering constituent through the channel. The variation in the flux of the light-scattering constituent may be recorded as described above and correlated with the properties of the analyte. Through suitable calibration, the characteristic variation in the flux of the light-scattering constituent can be used to identify the analyte. For example, in embodiments of the claimed methods in which the analyte is a polynucleotide, variation in the flux of the light-scattering constituent can be correlated with the particular nucleotide and associated base traversing the channel in real-time.

In nanopore characterisation of analytes in accordance with the claimed methods, the open-channel flux of light-scattering constituent is typically reduced as individual molecules of the analyte sequentially pass through the channel of the nanopore due to the partial blockage of the channel by the analyte. When the analyte is a polymer (e.g. a polynucleotide or polypeptide), the open-channel flux of the light-scattering constituent is typically reduced as monomer units of the analyte (e.g. individual nucleotide units in a polynucleotide, or individual amino acids in a polypeptide) sequentially pass through the channel of the nanopore. It is this reduction in the flux of the light-scattering constituent which is measured using the scattering signal from the light-scattering constituent in the vicinity of the nanopore.

The reduction in flux of light-scattering constituent may be calibrated to the reduction in measured flux for known substances through the nanopore channel resulting in a means for determining which of a panel of analytes is passing through the channel. For example, the reduction in flux caused by known nucleotides can be correlated with the reduction in flux that arises as a nucleic acid sequence is passed through the nanopore. In this way, the nucleic acid sequence can be determined. When the analyte is a polynucleotide, it will be appreciated that sequencing may be performed upon the intact polynucleotide that is 'threaded' through the pore (e.g. via the action of an associated polynucleotide binding protein such as a polymerase or helicase). Alternatively, the sequences may be determined by passage of nucleotide triphosphate bases that have been sequentially removed from a target nucleic acid analyte in proximity to the pore (the process is thus analogous to that discussed in WO 2014/187924 except that the method of detection is in accordance with the methods provided herein). Similarly, the sequences of polypeptides may be determined by passage of the amino acids thorough the pore as the polypeptide is threaded through the pore.

Typically, the excitation wavelength of the light used to generate the scattering is the same as the wavelength of the scattering signal.

Scattering Signal

The methods provided herein are not limited to any specific scattering signal. It is within the scope of the methods provided herein to directly record the scattering signal from the flux of the light-scattering constituent through the nanopore. It is also within the scope of the methods provided herein to record a secondary scattering signal such as an interference signal between the scattering signal and a reference beam. Preferred embodiments of the methods provided herein comprise taking one or more measurements of the light scattered by the constituent by detecting interference between the scattering signal and a reference beam.

Any suitable reference beam can be used. For example, the reference beam may be a secondary light source. The reference beam may be a part of the light source that provides the scattering beam. For example, the light source for providing an illuminating beam may be divided using suitable optics to form the reference beam and a beam for illuminating the medium in the vicinity of the nanopore. Optics suitable for use in the claimed methods are described in more detail herein. Optics suitable for use in the claimed methods typically comprise one or more mirrors, one or more acousto-optical deflectors, one or more polarising beam splitters, and/or one or more quarter wave plates, and the like.

In the presence of reference and scattering beams, the interference signal between the scattering and reference beams can be detected using interferometry. Optical configurations capable of detecting the interference between these two beams are well known. For example, the interference may be detected using double or common path interferometry such as Michelson, Mach-Zehnder, or Sagnac configurations.

In some embodiments, the reference beam is provided as a reflected beam. The reflected beam can be reflected from any suitable surface or interface. For example, when the nanopore is present in a membrane the reference beam can be reflected from the surface of the membrane. The reference beam can be reflected from the surface of a solid support, e.g. a support for the membrane. The reference beam can be reflected from the surface of a droplet, e.g. a droplet forming a droplet interface bilayer.

The reference beam can be reflected from an interface. The interface may be between a membrane and the medium in which the analyte is present. The interface may be between a solid support and a membrane. The interface may be between a droplet and a solid support or another droplet, for example in a droplet interface bilayer.

Typically, the reference beam is focussed at or near the nanopore, e.g. the reference beam may be focussed at an interface, e.g. on a membrane in which the nanopore is present. Typically, the focus of the reference beam is unaffected by any fluid perturbance in the system, and means for minimising fluid perturbance may be used.

Illumination and Measurement

The methods provided herein comprise illuminating the medium in the vicinity of the nanopore with one or more light sources. As used herein, the terms "illuminating" and "irradiating" are synonymous unless implied otherwise by the context.

Any suitable light sources can be used according to e.g. the parameters and setup of the equipment used in the methods. The sensitivity of the disclosed methods is a parameter that can be controlled by selection of a light source having an appropriate spatial and temporal coherence.

The selection of appropriate light sources is routine to those skilled in the art. In some embodiments the one or more light sources each independently comprise a laser, a superluminescent diode and/or an incoherent source. In some embodiments a suitable incoherent light source for use in the claimed methods is an LED or a lamp. In some embodiments just one light source is used. In some embodiments more than one, e.g. 2, 3, or 4, such as 2 light sources may be used. In embodiments of the claimed methods which comprise the use of more than one light source the light sources may be the same or different. For example, the one or more light sources may comprise one or more lasers, one or more superluminescent diodes and/or one or more incoherent sources. For instance, the one or more light sources may comprise two or more lasers and optionally further light sources such as one or more superluminescent diodes and/or one or more incoherent sources.

In some embodiments, the light source comprises one or more lasers. Suitable lasers include diode lasers acting at wavelengths of from e.g. about 400 nm to about 800 nm, such as from about 450 nm to about 700 nm. Exemplary lasers operate may operate at, for example, 445 nm, 473 nm, 532 nm, 639 nm, 662 nm, etc. Suitable power densities of laser illumination include power densities of from about 1 $kW/cm^2$ to about 30 $kW/cm^2$, e.g. from about 5 $kW/cm^2$ to about 20 $kW/cm^2$ for example from about 10 $kW/cm^2$ to about 15 $kW/cm^2$ such as about 13 $kW/cm^2$. Suitable lasers are obtainable from companies such as Coherent, USA.

The scattering of light from the light-scattering constituent can be detected using any suitable method or apparatus. For example the scattering can be detected using a CCD (charge coupled device) camera, a CMOS (complementary metal-oxide-semiconductor) camera or point detector such as a photodiode. CCD and CMOS detectors and photodiodes are commercially widely available, e.g. from suppliers such as PhotonFocus AG, Switzerland. Those skilled in the art will be readily able to select appropriate detectors (e.g. CCD, CMOS or photodiode) detectors for detecting light scattering in accordance with the claimed methods.

Exemplary methods provided herein comprise detecting the interference between the scattering signal and the reference signal but not detecting the scattering signal and/or the reference signal per se. However, the methods provided herein also embrace detecting the scattering signal per se by the detector. In methods which comprise detecting the scattering signal per se, a reference signal may also optionally be detected per se. If present, the reference signal is typically detected by the same detector used to detect the scattering signal. For example, the scattering signal and if present the reference beam, and/or interference therebetween may be detected using a detector selected from a CCD, a CMOS camera, and a point detector such as a photodiode. Detected signals (e.g. signals arising from interference between the scattering signal and a reference signal, or the scattering signal per se and if present the reference signal) may be subsequently processed, e.g. by software.

In embodiments of the claimed methods which comprise detecting interference between the scattering signal and a reference beam, the interference can be detected by methods such as reflection interference contrast microscopy, digital holographic interference microscopy, interference scattering microscopy (iSCAT), or coherent brightfield interference microscopy (COBRI). Such techniques are familiar to those skilled in the art. iSCAT is described in, for example, de Wit et al, Proceedings of the National Academy of Sciences USA, 6 (2015) 12299-12303, which applies this technique to the dynamic label-free imaging of lipid nanodomains. Coherent brightfield interference microscopy (COBRI) is described in Cheng et al, Nanoscale, 11 (2019) 568-577. Reflection interference contrast microscopy is described in Weber, Methods in Enzymology, 361 (2003) 34-47. Digital holographic interference microscopy is described in Kim, "Digital Holographic Microscopy", 2011 (162), Springer-Verlag New York. The examples provided herein demonstrate the use of appropriate methods for detecting scattering from a light-scattering constituent.

In some embodiments the interference is detected by iSCAT. In some embodiments an apparatus suitable for taking iSCAT measurements comprises one or more lasers as described herein optionally passed through one or more, e.g. two acousto-optic deflectors (AODs) which may be scanned in sawtooth e.g. at 79 and 80 kHz, respectively. Relative and absolute frequencies may be chosen to minimise detectable fluctuations in background light intensity on the timescale of the camera exposure time. Beams deflected by the AODs may be imaged for example using telecentric lenses. Beams may be passed through polarizing beam splitters. P-polarised incident light can be converted to s-polarised light using a quarter wave plate (QWP).

The methods provided herein comprise generating a flux of the constituent through the nanopore. The nanopore is in contact with a medium comprising the light scattering constituent and the methods comprise taking one or more measurements of the light scattered by the constituent in the vicinity of the nanopore.

Typically the flux of the constituent through the nanopore is a flux from a first volume of medium to a second volume of medium. For example, the first volume of medium may be a "cis" volume and the second volume of medium may be a "trans" volume; the notation "cis" and "trans" is routine in the art and reflects the voltage that is typically applied across a nanopore in conventional methods (the cis volume is typically that comprising a negatively charged electrode and the trans chamber is that comprising a positively charged electrode such that a voltage potential can be applied across the nanopore). The medium in the first volume may be the same or different to the medium in the second volume. For example, the medium in the first volume may have a different pH, concentration, or comprise different components to the medium in the second volume.

In some embodiments the medium in the first volume may have a different refractive index to the medium in the second volume. In such embodiments the flux of medium from the first volume to the second volume allows a scattering signal to be recorded. Any suitable differences between the medium in the first and second volume which give rise to a change in refractive index between the media can be used. For example, the constituents comprising the medium in the first volume may differ from those in the second volume.

In some embodiments the concentration of the light-scattering constituent in the first volume is different to the concentration of the light-scattering constituent in the second volume, e.g. the concentration of the light-scattering constituent in the first volume may be higher than the concentration of the light-scattering constituent in the second volume. The difference in concentration may provide a gradient for generating the flux of the light-scattering constituent from the first volume to the second volume.

Typically, the flux of the light-scattering constituent is from a first volume of medium to a second volume of medium, and the one or more measurements of the light scattered by the constituent are one or more measurements of the second volume of medium in the vicinity of the nanopore. Typically in such embodiments the concentration of the light-scattering constituent in the first volume is in excess compared to the second volume. The flux of the light-scattering constituent from the first volume to the second volume thus typically does not appreciably alter the concentration of the light-scattering constituent in the first volume whereas the concentration in the second volume, particularly in the vicinity of the nanopore linking the first and second volumes, is significantly altered by the flux of the light-scattering constituent. The advantage of this is that the scattering signal generated by the light-scattering constituent is thus highly responsive to the flux of the light-scattering constituent from the first volume to the second volume. This allows the interaction of an analyte with the nanopore to be precisely monitored by monitoring the changes in the scattering signal arising from interference of the flux of the light-scattering constituent by the analyte.

In some embodiments, illuminating the medium in the vicinity of the nanopore comprises illuminating the first volume but not the second volume, or vice versa. In some embodiments, taking one or more measurements of the light scattered by the constituent in the vicinity of the nanopore comprises taking said one or more measurements of the light scattered in the first volume but not the second volume, or vice versa.

Those skilled in the art will appreciate that the reverse setup is also possible in which the flux of the light-scattering constituent is from a second volume of medium to a first volume of medium, and the one or more measurements of the light scattered by the constituent are one or more measurements of the first volume of medium in the vicinity of the nanopore.

The methods provided herein comprise illuminating the medium in the vicinity of the nanopore with one or more light sources, and taking one or more measurements of the light scattered by the light-scattering constituent in the vicinity of the nanopore as the analyte moves with respect to the nanopore. The appropriate volume to measure will be determined by those skilled in the art depending on the experimental parameters used, for example the diffusion coefficient of the light-scattering constituent and analyte in the medium, the wavelength of the light used to illuminate the medium in the vicinity of the nanopore, the characteristics of the analyte that are to be determined, etc.

By way of non-limiting example, in some embodiments, the methods comprise illuminating the medium in a volume extending less than 1000 μm from the nanopore, e.g. less than 100 μm from the nanopore such as less than 10 μm from the nanopore, e.g. less than 5 μm from the nanopore, such as less than 2 μm, e.g. about 1 μm from the nanopore. In some embodiments, the methods comprise illuminating the medium in a volume surrounding the nanopore wherein the volume is defined by the diffusion coefficient of the light-scattering constituent in the medium.

Typically, constituents which can be used to give rise to a scattering signal in accordance with the methods provided herein have a 3D diffusion coefficient of the order of $\sim \mu m^2/ms$. For example, the diffusion coefficient of sucrose in water is around 520 $\mu m^2/s$. The volume can be defined as having a square radius of, for example, at most 1×, e.g. at most 0.5×, such as at most 0.1×, e.g. at most 0.05×, such as at most 0.01× the diffusion coefficient of the light-scattering constituent in the medium. Selecting an appropriate volume for illumination is a parameter that can be optimised by the skilled person, according to the equipment and experimental set-up being used. Typically, an appropriate volume is selected to maximise sensitivity and temporal resolution, with sensitivity typically decreasing but temporal resolution increasing as the illuminated volume decreases.

Light-Scattering Constituent

As described in more detail herein, the methods provided herein comprise detecting an analyte in a medium by taking measurements of light scattered by a light-scattering constituent in the vicinity of a nanopore as the analyte moves with respect to the nanopore.

The light-scattering constituent has a refractive index. The medium has a refractive index. The refractive index of the light-scattering constituent and the medium are each determined by their respective components.

To enhance light-scattering it is useful that the light-scattering constituent has a refractive index different to the refractive index of the medium. Typically, in embodiments of the methods provided herein, the light-scattering constituent has a refractive index greater than the refractive index of the medium. However, in other embodiments the light-scattering constituent has a refractive index less than the refractive index of the medium.

Any suitable light-scattering constituent can be used in the methods provided herein, and the selection of suitable light-scattering constituents will be apparent to those skilled in the art.

Typically, in the methods provided herein, the light-scattering constituent is a hydrophilic water soluble molecule. Any suitable molecule can be used. Often, the light-scattering constituent is an uncharged hydrophilic water soluble molecule. In some embodiments, however, the light-scattering constituent is a non-water soluble molecule; such light-scattering constituents being particularly useful when the medium is non-aqueous, e.g. is an organic solvent.

Examples of suitable molecules for use as the light-scattering constituent include hydrocarbons, solvents, organic molecules such as carbohydrates, amino acids (including oligopeptides and polypeptides), saccharides (including oligosaccharides and polysaccharides), nucleic acids (e.g. polynucleic acids), non-biological polymers, salts and other electrolytes, amphiphiles and surfactants, and the like. For example, the light-scattering constituent may comprise or consist of liquid hydrocarbons like oils or other solvents (e.g. benzene), including alcohols (e.g. ethanol, isopropanol, etc), ketones (e.g. acetone), aldehydes, esters, perfluorocarbons etc. The light-scattering constituent may comprise or consist of polymers such as alkylene glycols (e.g. ethylene glycol) and fluoropolymers (e.g. CYTOP® available from AGC Chemicals Company). The light-scattering constituent may comprise or consist of linear or branched saccharides, such as monosaccharides, disaccharides, oligosaccharides, and polysaccharides. Examples include sucrose, lactose, maltose, dextrose, trehalose, glucose, ficoll etc. Sucrose is particularly suitable for use in the methods described herein. Other substances suitable for use as the light-scattering constituent include nucleic acids, silicone oils, amphiphiles and surfactants such as polysorbates (e.g. TWEENs, available from Sigma Aldrich), sterols and the like; the method extends to the use of light-scattering constituents such as supercritical $CO_2$. In some preferred embodiments the light-scattering constituent comprises or consists of a saccharide or a polyethylene glycol. In some embodiments the light-scattering constituent comprises sucrose.

Clearly the choice of light-scattering constituent will depend on the medium used. For example, the light-scattering constituent needs to be soluble in the medium used. Thus, in one embodiment the medium is an aqueous medium and the light-scattering constituent is a water-soluble molecule such as a molecule described above. In some embodiments the constituent is not fluorescent (i.e. is non-fluorescent). In some embodiments the light-scattering constituent does not consist of or comprise a fluorophore.

As described above, the claimed methods involve generating a flux of the light-scattering constituent through the nanopore. The flux of the light-scattering constituent may be driven by a free energy gradient, such as a physical or chemical potential across the nanopore. In some embodiments, the flux of the light-scattering constituent is driven directly by a physical force provided by an electrical (e.g. voltage) potential or indirectly by a temperature gradient, etc. In some embodiments the flux of the light-scattering constituent is driven indirectly by a chemical potential provided by a concentration (e.g. pH) gradient across the nanopore.

For example, in embodiments of the claimed methods in which a flux of the light-scattering constituent is generated between a first volume and a second volume, the concentration of the light-scattering constituent in the first volume may be higher than the concentration of the light-scattering constituent in the second volume thus providing a concentration gradient of the light-scattering constituent between the first and second volumes. When the first and second volumes are connected by a nanopore, a flux of the light-scattering constituent will arise from the first volume to the second volume.

In other embodiments in which a flux of the light-scattering constituent is generated between a first volume and a second volume, the light-scattering constituent may be charged and an electrical potential may be applied across a membrane separating the first and second volumes. The charge of the light-scattering constituent causes the light-scattering constituent to move under the electrical (e.g. voltage) potential applied. When the first and second volumes are connected by a nanopore, a flux of the light-scattering constituent will arise from the first volume to the second volume. For example, if a positive voltage potential is applied to the trans side of the nanopore relative to the cis side of the nanopore, then this will induce a negatively charged light-scattering constituent to move from the cis side of the nanopore to the trans side of the nanopore. Similarly, if a positive voltage potential is applied to the trans side of the nanopore relative to the cis side of the nanopore then this will impede the movement of a negatively charged light-scattering constituent from the trans side of the nanopore to the cis side of the nanopore. The opposite will occur if a negative voltage potential is applied to the trans side of the nanopore relative to the cis side of the nanopore. Apparatuses and methods of applying appropriate voltages are described in more detail herein.

Analyte

Detecting the presence of molecules such as biological molecules and characterising the detected (biological) molecules finds application in personalised drug development, medicine, diagnostics, life science research, environmental monitoring and in the security and/or the defence industry. As such, the methods described herein find application in at least these industries.

Any suitable analyte can be detected using the methods provided herein. Suitable analytes include, but are not limited to, metal ions, inorganic salts, polymers, such as a polymeric acids or bases, dyes, bleaches, pharmaceuticals, diagnostic agents, recreational drugs, explosives and environmental pollutants. Such analytes can be beneficially analysed or characterized using the methods described herein.

In some embodiments the analyte is secreted from cells. Alternatively, the analyte can be an analyte that is present inside cells such that the analyte must be extracted from cells. The analyte is typically a polymer. The analyte may be charged. The analyte may be positively or negatively charged, often negatively charged. The analyte may be uncharged, The analyte is often a biological polymer. The analyte is often a polynucleotide, a polypeptide or a polysaccharide, more often a polynucleotide or a polypeptide, most often a polynucleotide.

The analyte to be characterised in the methods described herein may be provided as an impure mixture of one or more target analytes and one or more impurities. Impurities may comprise truncated forms of target polynucleotide or polypeptide analytes which are distinct from the target analytes. For example the target analyte may be genomic DNA and impurities may comprise fractions of genomic DNA, plasmids, etc. The target polynucleotide may be a coding region of genomic DNA and undesired polynucleotides may comprise non-coding regions of DNA.

In one embodiment, the analyte is a polynucleotide (a macromolecule comprising two or more nucleotides). The naturally-occurring nucleic acid bases in DNA and RNA may be distinguished by their physical size.

A polynucleotide or nucleic acid may comprise any combination of any nucleotides. The nucleotides can be naturally occurring or artificial. One or more nucleotides in the polynucleotide can be oxidized or methylated. One or more nucleotides in the polynucleotide may be damaged. For instance, the polynucleotide may comprise a pyrimidine dimer. Such dimers are typically associated with damage by ultraviolet light and are the primary cause of skin melanomas.

One or more nucleotides in the polynucleotide may be modified, for instance with a label or a tag, for which suitable examples are known by a skilled person. The polynucleotide may comprise one or more spacers. An adapter, for example a sequencing adapter, may be comprised in the polynucleotide. Adapters, tags and spacers are described in more detail herein.

A nucleotide typically contains a nucleobase, a sugar and at least one phosphate group. The nucleobase and sugar form a nucleoside. The nucleobase is typically heterocyclic. Nucleobases include, but are not limited to, purines and pyrimidines and more specifically adenine (A), guanine (G), thymine (T), uracil (U) and cytosine (C). The sugar is typically a pentose sugar. Nucleotide sugars include, but are not limited to, ribose and deoxyribose. The sugar is preferably a deoxyribose. The polynucleotide preferably comprises the following nucleosides: deoxyadenosine (dA), deoxyuridine (dU) and/or thymidine (dT), deoxyguanosine (dG) and deoxycytidine (dC). The nucleotide is typically a ribonucleotide or deoxyribonucleotide. The nucleotide typically contains a monophosphate, diphosphate or triphosphate. The nucleotide may comprise more than three phosphates, such as 4 or 5 phosphates. Phosphates may be attached on the 5' or 3' side of a nucleotide. The nucleotides in the polynucleotide may be attached to each other in any manner. The nucleotides are typically attached by their sugar and phosphate groups as in nucleic acids. The nucleotides may be connected via their nucleobases as in pyrimidine dimers. The polynucleotide may be single stranded or double stranded. At least a portion of the polynucleotide is preferably double stranded. The polynucleotide is most preferably ribonucleic nucleic acid (RNA) or deoxyribonucleic acid (DNA). In particular, when the analyte assessed using the methods provided herein is a polynucleotide, the methods typically comprise determining one or more characteristics selected from (i) the length of the polynucleotide, (ii) the identity of the polynucleotide, (iii) the sequence of the polynucleotide, (iv) the secondary structure of the polynucleotide and (v) whether or not the polynucleotide is modified.

The polynucleotide can be any length (i). For example, the polynucleotide can be at least 10, at least 50, at least 100, at least 150, at least 200, at least 250, at least 300, at least 400 or at least 500 nucleotides or nucleotide pairs in length. The polynucleotide can be 1000 or more nucleotides or nucleotide pairs, 5000 or more nucleotides or nucleotide pairs in length or 100000 or more nucleotides or nucleotide pairs in length. Any number of polynucleotides can be investigated. For instance, the method may concern characterising 2, 3, 4, 5, 6, 7, 8, 9, 10, 20, 30, 50, 100 or more polynucleotides. If two or more polynucleotides are characterised, they may be different polynucleotides or two instances of the same polynucleotide. The polynucleotide can be naturally occurring or artificial. For instance, the method may be used to verify the sequence of a manufactured oligonucleotide. The method is typically carried out in vitro.

Nucleotides can have any identity (ii), and include, but are not limited to, adenosine monophosphate (AMP), guanosine monophosphate (GMP), thymidine monophosphate (TMP), uridine monophosphate (UMP), 5-methylcytidine monophosphate, 5-hydroxymethylcytidine monophosphate, cytidine monophosphate (CMP), cyclic adenosine monophosphate (cAMP), cyclic guanosine monophosphate (cGMP), deoxyadenosine monophosphate (dAMP), deoxyguanosine monophosphate (dGMP), deoxythymidine monophosphate (dTMP), deoxyuridine monophosphate (dUMP), deoxycytidine monophosphate (dCMP) and deoxymethylcytidine monophosphate. The nucleotides are preferably selected from AMP, TMP, GMP, CMP, UMP, dAMP, dTMP, dGMP, dCMP and dUMP. A nucleotide may be abasic (i.e. lack a nucleobase). A nucleotide may also lack a nucleobase and a sugar (i.e. is a C3 spacer). The sequence of the nucleotides (iii) is determined by the consecutive identity of following nucleotides attached to each other throughout the polynucleotide strain, in the 5' to 3' direction of the strand.

The target polynucleotide may comprise the products of a PCR reaction, genomic DNA, the products of an endonuclease digestion and/or a DNA library. The target polynucleotide may be obtained from or extracted from any organism or microorganism. The target polynucleotide is often obtained from a human or animal, e.g. from urine, lymph, saliva, mucus, seminal fluid or amniotic fluid, or from whole blood, plasma or serum. The target polynucleotide may be obtained from a plant e.g. a cereal, legume, fruit or vegetable. The target polynucleotide may comprise genomic DNA. The genomic DNA may be fragmented. The DNA may be fragmented by any suitable method. For example, methods of fragmenting DNA are known in the art, Such methods may use a transposase, such as a MuA transposase. Often the genomic DNA is not fragmented. In some embodiments, the target polynucleotide may be DNA, RNA and/or a DNA/RNA hybrid.

When the analyte is a polynucleotide, the polynucleotide may be single or double stranded. Usually, when the analyte is a polynucleotide, the polynucleotide is single stranded, such as cDNA or RNA.

The analyte may be a polypeptide. The polypeptide may be a protein or a fragment thereof. The polypeptide can be naturally-occurring or non-naturally-occurring. The polypeptide can include within it synthetic or modified amino acids. A number of different types of modification to amino acids are known in the art. Suitable amino acids and modifications thereof are discussed herein. For the purposes of the invention, it is to be understood that the polypeptide can be modified by any method available in the art. For example, the polypeptide can be modified by a post-translational modification or by sequence variation arising from alternative splicing of RNA during biological peptide synthesis.

When the analyte is a polypeptide, the polypeptide can be one that is secreted from cells. Alternatively, the polypeptide can be one that is present inside cells such that it must be extracted from the cells before the invention can be carried out. It can be extracted both by the use of antibodies or by the binding of an affinity tag introduced on the protein.

As used herein, a polypeptide may be a shorter peptide which is typically a polymer of from about 2 to about 50 amino acids or may be a longer polymer of amino acids.

Proteins are typically polypeptides that are folded into a functional conformation or form part of a functional complex.

When the analyte is a polypeptide, any polypeptide may be used. Suitable polypeptides include, but are not limited to, proteins such as enzymes, antibodies, hormones, growth factors or growth regulatory proteins, such as cytokines; or fragments of such proteins. The polypeptide may be bacterial, archaeal, fungal, viral or derived from a parasite. The polypeptide may be derived from a plant. The polypeptide is typically mammalian, more usually human.

The analyte may be a polysaccharide. A polysaccharide is a polymeric carbohydrate molecules composed of chains of monosaccharide units bound together by glycosidic linkages. A polysaccharide may be linear or branched. A polysaccharide may be homogeneous (comprising only one repeating unit) or heterogeneous (containing modifications of the repeating unit). Polysaccharides include callose or laminarin, chrysolaminarin, xylan, arabinoxylan, mannan, fucoidan and galactomannan.

The analyte may be a polysaccharide produced by a bacterium such as a pathogenic bacterium. The polysaccharide may be a capsular polysaccharide having a molecular weight of 100-2000 kDa. The polysaccharide may be synthesized from nucleotide-activated precursors (called nucleotide sugars). The polysaccharide may be a lipopolysaccharide. The polysaccharide may be a therapeutic polysaccharide. The polysaccharide may be a toxic polysaccharide. The polysaccharide may be suitable for use as a vaccine. The polysaccharide may be for example bacterial or derived from a plant. The polysaccharide may be useful as an antibiotic, such as streptomycin, neomycins, paromomycine, kanamycin, chalcomycin, erythromycin, magnamycin, spiramycin, oleandomycin, cinerubin and amicetin, or a derivative of any one of the preceding compounds.

It is within the scope of the methods provided herein that the analyte is labelled with a molecular label. A molecular label may be a modification to the analyte which promotes the detection of the analyte in the methods provided herein. For example the label may be a modification to the analyte which alters, e.g. increases the extent to which the analyte interferes with the flux of the light-scattering constituent through the nanopore. In such a manner, the label may improve the sensitivity of the methods.

In some embodiments the analyte comprises an optical label, such as a fluorescent label. However in other embodiments the analyte is not labelled, e.g. is not labelled with an optical label. In some embodiments the analyte does not comprise an optical label such as a fluorophore or chromophore. In some embodiments the analyte is not fluorescently labelled.

Adapters

In some embodiments of the methods provided herein, the analyte to be detected is a polynucleotide (a "target polynucleotide"). In some embodiments, a polynucleotide adapter can be attached to the target polynucleotide in order to characterise the target polynucleotide. An adapter typically comprises a polynucleotide strand capable of being attached to the end of a target polynucleotide.

An adapter may be attached to just one end of a target polynucleotide. A polynucleotide adapter may be added to both ends of a target polynucleotide. Alternatively, different adapters may be added to the two ends of a target polynucleotide.

An adapter may be added to both strands of a double stranded polynucleotide. An adapter may be added to just one strand of a polynucleotide. Methods of adding adapters to polynucleotides are known in the art. Adapters may be attached to polynucleotides, for example, by ligation, by click chemistry, by tagmentation, by topoisomerisation or by any other suitable method.

In one embodiment, the or each adapter is synthetic or artificial. Typically, the or each adapter comprises a polymer as described herein. In some embodiments, the or each adapter comprises a spacer as described herein. In some embodiments, the or each adapter comprises a polynucleotide. The or each polynucleotide adapter may comprise DNA, RNA, modified DNA (such as a basic DNA), RNA, PNA, LNA, BNA and/or PEG. Usually, the or each adapter comprises single stranded and/or double stranded DNA or RNA. The adapter may comprise the same type of polynucleotide as the polynucleotide strand to which it is attached. The adapter may comprise a different type of polynucleotide to the polynucleotide strand to which it is attached. In some embodiments the polynucleotide strand assessed and characterised in the methods described herein is a double stranded DNA strand and the adapter comprises DNA or RNA, e.g. double or single stranded DNA.

In some embodiments, an adapter may be a bridging moiety. A bridging moiety may be used to connect the two strands of a double-stranded polynucleotide. For example, in some embodiments a bridging moiety is used to connect the template strand of a double stranded polynucleotide to the complement strand of the double stranded polynucleotide.

A bridging moiety typically covalently links the two strands of the target polynucleotide. The bridging moiety can be anything that is capable of linking the two strands of the target polynucleotide, provided that the bridging moiety does not interfere with movement of the single stranded polynucleotide through the transmembrane pore. Suitable bridging moieties include, but are not limited to a polymeric linker, a chemical linker, a polynucleotide or a polypeptide. Preferably, the bridging moiety comprises DNA, RNA, modified DNA (such as abasic DNA), RNA, PNA, LNA or PEG. The bridging moiety is more preferably DNA or RNA.

In some embodiments a bridging moiety is a hairpin adapter. A hairpin adapter is an adapter comprising a single polynucleotide strand, wherein the ends of the polynucleotide strand are capable of hybridising to each other, or are hybridized to each other, and wherein the middle section of the polynucleotide forms a loop. Suitable hairpin adapters can be designed using methods known in the art. In some embodiments a hairpin loop is typically 4 to 100 nucleotides in length, e.g. from 4 to 50 such as from 4 to 20 e.g. from 4 to 8 nucleotides in length. In some embodiments the bridging moiety (e.g. hairpin adapter) is attached at one end of the target polynucleotide. A bridging moiety (e.g. hairpin adapter) is typically not attached at both ends of the target polynucleotide.

In some embodiments, an adapter is a linear adapter. A linear adapter may be bound to either or both ends of a single stranded polynucleotide. When the polynucleotide is a double stranded polynucleotide, a linear adapter may be bound to either or both ends of either or both strands of the double stranded polynucleotide. A linear adapter may comprise a leader sequence as described herein. A linear adapter may comprise a portion for hybridisation with a tag (such as a pore tag) as described herein. A linear adapter may be 10 to 150 nucleotides in length, such as from 20 to 120, e.g. 30 to 100, for example 40 to 80 such as 50 to 70 nucleotides in length. A linear adapter may be single stranded. A linear adapter may be double stranded.

In some embodiments, an adapter may be a Y adapter. A Y adapter is typically a polynucleotide adapter. A Y adapter is typically double stranded and comprises (a) at one end, a region where the two strands are hybridised together and (b), at the other end, a region where the two strands are not complementary. The non-complementary parts of the strands typically form overhangs. The presence of a non-complementary region in the Y adapter gives the adapter its Y shape since the two strands typically do not hybridise to each other unlike the double stranded portion. The two single-stranded portions of the Y adapter may be the same length, or may be different lengths. For example, one single-stranded portion of the Y adapter may be 10 to 150 nucleotides in length, such as from 20 to 120, e.g. 30 to 100, for example 40 to 80 such as 50 to 70 nucleotides in length and the other single stranded portion of the Y adapter may independently by 10 to 150 nucleotides in length, such as from 20 to 120, e.g. 30 to 100, for example 40 to 80 such as 50 to 70 nucleotides in length. The double-stranded "stem" portion of the Y adapter may be e.g. from 10 to 150 nucleotides in length, such as from 20 to 120, e.g. 30 to 100, for example 40 to 80 such as 50 to 70 nucleotides in length.

An adapter may be linked to the target polynucleotide by any suitable means known in the art. The adapter may be synthesized separately and chemically attached or enzymatically ligated to the target polynucleotide. Alternatively, the adapter may be generated in the processing of the target polynucleotide. In some embodiments, the adapter is linked to the target polynucleotide at or near one end of the target polynucleotide. In some embodiments, the adapter is linked to the target polynucleotide within 50, e.g. within 20 for example within 10 nucleotides of an end of the target polynucleotide. In some embodiments the adapter is linked to the target polynucleotide at a terminus of the target polynucleotide. When a adapter is linked to the target polynucleotide the adapter may comprise the same type of nucleotides as the target polynucleotide or may comprise different nucleotides to the target polynucleotide.

Tags

In some embodiments of the methods provided herein, the analyte to be detected is a polynucleotide (a "target polynucleotide"). In some embodiments, a tag on the nanopore can be used, e.g. to promote the capture of the analyte polynucleotide by the nanopore.

The interaction between a tag on a nanopore and the binding site on a polynucleotide (e.g., the binding site present in an adaptor attached to a polynucleotide, wherein the binding site can be provided by an anchor or a leader sequence of an adaptor or by a capture sequence within the duplex stem of an adaptor) may be reversible. For example, a polynucleotide can bind to a tag on a nanopore, e.g., via its adaptor, and release at some point, e.g., during characterization of the polynucleotide by the nanopore and/or during processing by the polymerase. A strong non-covalent bond (e.g., biotin/avidin) is still reversible and can be useful in some embodiments of the methods described herein. For example, to ensure processing of a complement of a double-stranded polynucleotide following the processing of a template, it may be desirable to design the pair of pore tag and polynucleotide adaptor to provide a sufficient interaction between the complement of a double stranded polynucleotide (or a portion of an adaptor that is attached to the complement) and the nanopore such that the complement is held close to the nanopore (without detaching from the nanopore and diffusing away) but is able to release from the nanopore as it is processed.

A pore tag and polynucleotide adaptor can be configured such that the binding strength or affinity of a binding site on the polynucleotide (e.g., a binding site provided by an anchor or a leader sequence of an adaptor or by a capture sequence within the duplex stem of an adaptor) to a tag on a nanopore is sufficient to maintain the coupling between the nanopore and polynucleotide until an applied force is placed on it to release the bound polynucleotide from the nanopore. In some embodiments where the analyte is a double stranded polynucleotide, the applied force may be processing of a complement strand by a polymerase.

In some embodiments, the tags or tethers are uncharged. This can ensure that the tags or tethers are not drawn into the nanopore under the influence of a potential difference if present.

One or more molecules that attract or bind the polynucleotide or adaptor may be linked to the detector (e.g. the pore). Any molecule that hybridizes to the adaptor and/or target polynucleotide may be used. The molecule attached to the pore may be selected from a PNA tag, a PEG linker, a short oligonucleotide, a positively charged amino acid and an aptamer. Pores having such molecules linked to them are known in the art. For example, pores having short oligonucleotides attached thereto are disclosed in Howarka et al (2001) Nature Biotech. 19: 636-639 and WO 2010/086620, and pores comprising PEG attached within the lumen of the pore are disclosed in Howarka et al (2000) J. Am. Chem. Soc. 122(11): 2411-2416.

A short oligonucleotide attached to the nanopore, which comprises a sequence complementary to a sequence in the leader sequence or another single stranded sequence in an adaptor may be used to enhance capture of the target polynucleotide in the methods described herein.

In some embodiments, the tag or tether may comprise or be an oligonucleotide (e.g., DNA, RNA, LNA, BNA, PNA, or morpholino). The oligonucleotide can have about 10-30 nucleotides in length or about 10-20 nucleotides in length. In some embodiments, the oligonucleotide can have at least one end (e.g., 3'- or 5'-end) modified for conjugation to other modifications or to a solid substrate surface including, e.g., a bead. The end modifiers may add a reactive functional group which can be used for conjugation. Examples of functional groups that can be added include, but are not limited to amino, carboxyl, thiol, maleimide, aminooxy, and any combinations thereof. The functional groups can be combined with different length of spacers (e.g., C3, C9, C12, Spacer 9 and 18) to add physical distance of the functional group from the end of the oligonucleotide sequence.

Examples of modifications on the 3' and/or 5' end of oligonucleotides include, but are not limited to 3' affinity tag and functional groups for chemical linkage (including, e.g., 3'-biotin, 3'-primary amine, 3'-disulfide amide, 3'-pyridyl dithio, and any combinations thereof); 5' end modifications (including, e.g., 5'-primary ammine, and/or 5'-dabcyl), modifications for click chemistry (including, e.g., 3'-azide, 3'-alkyne, 5'-azide, 5'-alkyne), and any combinations thereof.

In some embodiments, the tag or tether may further comprise a polymeric linker, e.g., to facilitate coupling to the nanopore. An exemplary polymeric linker includes, but is not limited to polyethylene glycol (PEG). The polymeric linker may have a molecular weight of about 500 Da to about 10 kDa (inclusive), or about 1 kDa to about 5 kDa (inclusive). The polymeric linker (e.g., PEG) can be functionalized with different functional groups including, e.g., but not limited to maleimide, NHS ester, dibenzocyclooctyne (DBCO), azide, biotin, amine, alkyne, aldehyde, and any combinations thereof.

Other examples of a tag or tether include, but are not limited to His tags, biotin or streptavidin, antibodies that bind to analytes, aptamers that bind to analytes, analyte binding domains such as DNA binding domains (including, e.g., peptide zippers such as leucine zippers, single-stranded DNA binding proteins (SSB)), and any combinations thereof.

The tag or tether may be attached to the external surface of a nanopore, e.g., on the cis side of a membrane, using any methods known in the art. For example, one or more tags or tethers can be attached to the nanopore via one or more cysteines (cysteine linkage), one or more primary amines such as lysines, one or more non-natural amino acids, one or more histidines (His tags), one or more biotin or streptavidin, one or more antibody-based tags, one or more enzyme modification of an epitope (including, e.g., acetyl transferase), and any combinations thereof. Suitable methods for carrying out such modifications are well-known in the art. Suitable non-natural amino acids include, but are not limited to, 4-azido-L-phenylalanine (Faz) and any one of the amino acids numbered 1-71 in FIG. 1 of Liu C. C. and Schultz P. G., Annu. Rev. Biochem., 2010, 79, 413-444.

In some embodiments where one or more tags or tethers are attached to a nanopore via cysteine linkage(s), the one or more cysteines can be introduced to one or more monomers that form the nanopore by substitution. In some embodiments, the nanopore may be chemically modified by attachment of (i) Maleimides including diabromomaleimides such as: 4-phenylazomaleinanil, 1.N-(2-Hydroxyethyl)maleimide, N-Cyclohexylmaleimide, 1.3-Maleimidopropionic Acid, 1.1-4-Aminophenyl-1H-pyrrole,2,5,dione, 1.1-4-Hydroxyphenyl-1H-pyrrole,2,5,dione, N-Ethylmaleimide, N-Methoxycarbonylmaleimide, N-tert-Butylmaleimide, N-(2-Aminoethyl)maleimide, 3-Maleimido-PROXYL, N-(4-Chlorophenyl)maleimide, 1-[4-(dimethylamino)-3,5-dinitrophenyl]-1H-pyrrole-2,5-dione, N-[4-(2-Benzimidazolyl)phenyl]maleimide, N-[4-(2-benzoxazolyl)phenyl]maleimide, N-(1-naphthyl)-maleimide, N-(2,4-xylyl) maleimide, N-(2,4-difluorophenyl)maleimide, N-(3-chloro-para-tolyl)-maleimide, 1-(2-amino-ethyl)-pyrrole-2,5-dione hydrochloride, 1-cyclopentyl-3-methyl-2,5-dihydro-1H-pyrrole-2,5-dione, 1-(3-aminopropyl)-2,5-dihydro-1H-pyrrole-2,5-dione hydrochloride, 3-methyl-1-[2-oxo-2-(piperazin-1-yl)ethyl]-2,5-dihydro-1H-pyrrole-2,5-dione hydrochloride, 1-benzyl-2,5-dihydro-1H-pyrrole-2,5-dione, 3-methyl-1-(3,3,3-trifluropropyl)-2,5-dihydro-1H-pyrrole-2,5-dione, 1-[4-(methylamino)cyclohexyl]-2,5-dihydro-1H-pyrrole-2,5-dione trifluroacetic acid, SMILES O=C1C=CC(=O)N1CC=2C=CN=CC2, SMILES O=C1C=CC(=O)N1CN2CCNCC2, 1-benzyl-3-methyl-2,5-dihydro-1H-pyrrole-2,5-dione, 1-(2-fluorophenyl)-3-methyl-2,5-dihydro 1H-pyrrole-2,5-dione, N-(4-phenoxyphenyl)maleimide, N-(4-nitrophenyl)maleimide (ii) Iodocetamides such as: 3-(2-Iodoacetamido)-proxyl, N-(cyclopropylmethyl)-2-iodoacetamide, 2-iodo-N-(2-phenylethyl)acetamide, 2-iodo-N-(2,2,2-trifluoroethyl)acetamide, N-(4-acetylphenyl)-2-iodoacetamide, N-(4-(aminosulfonyl) phenyl)-2-iodoacetamide, N-(1,3-benzothiazol-2-yl)-2-iodoacetamide, N-(2,6-diethylphenyl)-2-iodoacetamide, N-(2-benzoyl-4-chlorophenyl)-2-iodoacetamide, (iii) Bromoacetamides: such as N-(4-(acetylamino)phenyl)-2-bromoacetamide, N-(2-acetylphenyl)-2-bromoacetamide, 2-bromo-n-(2-cyanophenyl)acetamide, 2-bromo-N-(3-(trifluoromethyl)phenyl)acetamide, N-(2-benzoylphenyl)-2-bromoacetamide, 2-bromo-N-(4-fluorophenyl)-3-methylbutanamide, N-Benzyl-2-bromo-N-phenylpropionamide, N-(2-bromo-butyryl)-4-chloro-benzenesulfonamide, 2-Bromo-N-methyl-N-phenylacetamide, 2-bromo-N-phenethyl-acetamide,2-adamantan-1-yl-2-bromo-N-cyclohexylacetamide, 2-bromo-N-(2-methylphenyl)butanamide, Monobromoacetanilide, (iv) Disulphides such as: aldrithiol-2, aldrithiol-4, isopropyl disulfide, 1-(Isobutyldisulfanyl)-2-methylpropane, Dibenzyl disulfide, 4-aminophenyl disulfide, 3-(2-Pyridyldithio)propionic acid, 3-(2-Pyridyldithio) propionic acid hydrazide, 3-(2-Pyridyldithio)propionic acid N-succinimidyl ester, am6amPDP1-PCD and (v) Thiols such as: 4-Phenylthiazole-2-thiol, Purpald, 5,6,7,8-tetra-hydro-quinazoline-2-thiol.

In some embodiments, the tag or tether may be attached directly to a nanopore or via one or more linkers. The tag or tether may be attached to the nanopore using the hybridization linkers described in WO 2010/086602. Alternatively, peptide linkers may be used. Peptide linkers are amino acid sequences. The length, flexibility and hydrophilicity of the peptide linker are typically designed such that it does not to disturb the functions of the monomer and pore. Preferred flexible peptide linkers are stretches of 2 to 20, such as 4, 6, 8, 10 or 16, serine and/or glycine amino acids. More preferred flexible linkers include $(SG)_1$, $(SG)_2$, $(SG)_3$, $(SG)_4$, $(SG)_5$ and $(SG)_8$ wherein S is serine and G is glycine. Preferred rigid linkers are stretches of 2 to 30, such as 4, 6, 8, 16 or 24, proline amino acids. More preferred rigid linkers include $(P)_{12}$ wherein P is proline.

Spacers

In some embodiments of the methods provided herein, the analyte to be detected is a polynucleotide (a "target polynucleotide"). In some embodiments, the polynucleotide, or an adapter as described herein, may comprise a spacer. For example, one or more spacers may be present in the polynucleotide adapter. For example, the polynucleotide adapter may comprise from one to about 10 spacers, e.g. from 1 to about 5 spacers, e.g. 1, 2, 3, 4 or 5 spacers. The spacer may comprise any suitable number of spacer units. A spacer provides an energy barrier which impedes movement of a motor protein. For example, a spacer may stall a motor protein by reducing the traction of the motor protein on the polynucleotide. This may be achieved for instance by using an abasic spacer i.e. a spacer in which the bases are removed from one or more nucleotides in the polynucleotide adapter. A spacer may physically block movement of a motor protein, for instance by introducing a bulky chemical group to physically impede the movement of the motor protein.

In some embodiments, one or more spacers are included in the polynucleotide or in an adapter as used in the methods claimed herein in order to provide a distinctive signal when they pass through or across the nanopore, i.e. as thy move with respect to the nanopore.

In some embodiments, a spacer may comprise a linear molecule, such as a polymer. Typically, such a spacer has a different structure from the target polynucleotide. For instance, if the target polynucleotide is DNA, the or each spacer typically does not comprise DNA. In particular, if the target polynucleotide is deoxyribonucleic acid (DNA) or ribonucleic acid (RNA), the or each spacer preferably comprises peptide nucleic acid (PNA), glycerol nucleic acid (GNA), threose nucleic acid (TNA), locked nucleic acid (LNA) or a synthetic polymer with nucleotide side chains. In some embodiments, a spacer may comprise one or more nitroindoles, one or more inosines, one or more acridines, one or more 2-aminopurines, one or more 2-6-diaminopurines, one or more 5-bromo-deoxyuridines, one or more inverted thymidines (inverted dTs), one or more inverted dideoxy-thymidines (ddTs), one or more dideoxy-cytidines (ddCs), one or more 5-methylcytidines, one or more 5-hydroxymethylcytidines, one or more 2'-O-Methyl RNA bases, one or more Iso-deoxycytidines (Iso-dCs), one or more Iso-deoxyguanosines (Iso-dGs), one or more C3 $(OC_3H_6OPO_3)$ groups, one or more photo-cleavable (PC) $[OC_3H_6\text{—}C(O)NHCH_2\text{—}C_6H_3NO_2\text{—}CH(CH_3)OPO_3]$ groups, one or more hexandiol groups, one or more spacer 9 (iSp9) $[(OCH_2CH_2)_3OPO_3]$ groups, or one or more spacer 18 (iSp18) $[(OCH_2CH_2)_6OPO_3]$ groups; or one or more thiol connections. A spacer may comprise any combination of these groups. Many of these groups are commercially available from IDT® (Integrated DNA Technologies®). For example, C3, iSp9 and iSp18 spacers are all available from IDT®. A spacer may comprise any number of the above groups as spacer units.

In some embodiments, a spacer may comprise one or more chemical groups which cause a motor protein to stall. In some embodiments, suitable chemical groups are one or more pendant chemical groups. The one or more chemical groups may be attached to one or more nucleobases in the polynucleotide adapter. The one or more chemical groups may be attached to the backbone of the polynucleotide adapter. Any number of appropriate chemical groups may be present, such as 2, 3, 4, 5, 6, 7, 8, 9, 10, 11, 12 or more. Suitable groups include, but are not limited to, fluorophores, streptavidin and/or biotin, cholesterol, methylene blue, dinitrophenols (DNPs), digoxigenin and/or anti-digoxigenin and dibenzylcyclooctyne groups. In some embodiments, a spacer may comprise a polymer. In some embodiments the spacer may comprise a polymer which is a polypeptide or a polyethylene glycol (PEG).

In some embodiments, a spacer may comprise one or more abasic nucleotides (i.e. nucleotides lacking a nucleobase), such as 2, 3, 4, 5, 6, 7, 8, 9, 10, 11, 12 or more abasic nucleotides. The nucleobase can be replaced by —H (idSp) or —OH in the abasic nucleotide. Abasic spacers can be inserted into target polynucleotides by removing the nucleobases from one or more adjacent nucleotides. For instance, polynucleotides may be modified to include 3-methyladenine, 7-methylguanine, 1,N6-ethenoadenine inosine or hypoxanthine and the nucleobases may be removed from these nucleotides using Human Alkyladenine DNA Glycosylase (hAAG). Alternatively, polynucleotides may be modified to include uracil and the nucleobases removed with Uracil-DNA Glycosylase (UDG). In one embodiment, the one or more spacers do not comprise any abasic nucleotides.

Anchors

In one embodiment, the analyte is a polynucleotide and the analyte polynucleotide or an adapter attached thereto comprises a membrane anchor or a transmembrane pore anchor e.g. attached to the adapter. In one embodiment the anchor aids in characterisation of a target polynucleotide in accordance with the methods disclosed herein. For example, a membrane anchor or transmembrane pore anchor may promote localisation of the selected polynucleotides around the nanopore.

The anchor may be a polypeptide anchor and/or a hydrophobic anchor that can be inserted into the membrane. In one embodiment, the hydrophobic anchor is a lipid, fatty acid, sterol, carbon nanotube, polypeptide, protein or amino acid, for example cholesterol, palmitate or tocopherol. The anchor may comprise thiol, biotin or a surfactant.

In one aspect the anchor may be biotin (for binding to streptavidin), amylose (for binding to maltose binding protein or a fusion protein), Ni-NTA (for binding to poly-histidine or poly-histidine tagged proteins) or peptides (such as an antigen).

In one embodiment, the anchor comprises a linker, or 2, 3, 4 or more linkers. Preferred linkers include, but are not limited to, polymers, such as polynucleotides, polyethylene glycols (PEGs), polysaccharides and polypeptides. These linkers may be linear, branched or circular. For instance, the linker may be a circular polynucleotide. The adapter may hybridise to a complementary sequence on a circular polynucleotide linker. The one or more anchors or one or more linkers may comprise a component that can be cut or broken down, such as a restriction site or a photolabile group. The linker may be functionalised with maleimide groups to attach to cysteine residues in proteins. Suitable linkers are described in WO 2010/086602.

In one embodiment, the anchor is cholesterol or a fatty acyl chain. For example, any fatty acyl chain having a length of from 6 to 30 carbon atom, such as hexadecanoic acid, may be used. Examples of suitable anchors and methods of attaching anchors to adapters are disclosed in WO 2012/164270 and WO 2015/150786.

Controlling Movement of the Analyte with Respect to the Nanopore

The methods provided herein comprise taking one or more measurements of the light scattered by the light-scattering constituent in the vicinity of the nanopore as the analyte being detected in the methods moves with respect to the nanopore.

The movement of the analyte with respect to the nanopore may be driven by any suitable means. In some embodiments, the movement of the analyte with respect to the nanopore is driven by a physical or chemical force (potential). In some embodiments the physical force is provided by an electrical (e.g. voltage) potential or a temperature gradient, etc.

In some embodiments, the analyte moves with respect to the nanopore as an electrical potential is applied across the nanopore. For example, polynucleotides are exemplary negatively charged analytes, and so applying a voltage potential across a nanopore will cause the polynucleotides to move with respect to the nanopore under the influence of the applied voltage potential. For example, if a positive voltage potential is applied to the trans side of the nanopore relative to the cis side of the nanopore, then this will induce a negatively charged analyte to move from the cis side of the nanopore to the trans side of the nanopore. Similarly, if a positive voltage potential is applied to the trans side of the nanopore relative to the cis side of the nanopore then this will impede the movement of a negatively charged analyte from the trans side of the nanopore to the cis side of the nanopore. The opposite will occur if a negative voltage potential is applied to the trans side of the nanopore relative to the cis side of the nanopore. Apparatuses and methods of applying appropriate voltages are described in more detail herein.

In some embodiments the chemical force is provided by a concentration (e.g. pH) gradient.

In some embodiments, the movement of the analyte is driven by an analyte-handling enzyme. For example, in embodiments wherein the analyte is a biological polymer such as a polynucleotide or polypeptide, the movement of the polymer may be controlled by polynucleotide-handling or polypeptide-handling enzyme.

Suitable polynucleotide handling enzymes, also known as motor proteins, are known in the art. In some embodiments, therefore, the provided methods comprise contacting the analyte with a motor protein, wherein the motor protein controls the movement of the analyte with respect to the nanopore.

When the analyte is a polynucleotide, for example, a motor protein can be present on the polynucleotide prior to its contact with the nanopore. For example, a motor protein can be present on an adapter comprising part of the polynucleotide analyte, or can be otherwise present on a portion of the polynucleotide.

In some embodiments, the motor protein is modified to prevent the motor protein disengaging from the polynucleotide or adapter (other than by passing off the end of the polynucleotide/adapter). The motor protein can be adapted in any suitable way. For example, the motor protein can be loaded onto the adapter or polynucleotide and then modified in order to prevent it from disengaging. Alternatively, the motor protein can be modified to prevent it from disengaging before it is loaded onto the adapter or polynucleotide. Modification of a motor protein in order to prevent it from disengaging from a polynucleotide or adapter can be achieved using methods known in the art, such as those discussed in WO 2014/013260, which is hereby incorporated by reference in its entirety, and with particular reference to passages describing the modification of motor proteins (polynucleotide binding proteins) such as helicases in order to prevent them from disengaging with polynucleotide strands.

For example, the motor protein may have a polynucleotide-unbinding opening; e.g. a cavity, cleft or void through which a polynucleotide strand may pass when the motor protein disengages from the strand. In some embodiments, the polynucleotide-unbinding opening for a given motor protein (polynucleotide binding protein) can be determined by reference to its structure, e.g. by reference to its X-ray crystal structure. The X-ray crystal structure may be obtained in the presence and/or the absence of a polynucleotide substrate. In some embodiments, the location of a polynucleotide-unbinding opening in a given motor protein may be deduced or confirmed by molecular modelling using standard packages known in the art. In some embodiments, the polynucleotide-unbinding opening may be transiently produced by movement of one or more parts e.g. one or more domains of the motor protein.

The motor protein may be modified by closing the polynucleotide-unbinding opening. Closing the polynucleotide-unbinding opening may therefore prevent the motor protein from disengaging from the polynucleotide or adapter. For example, the motor protein may be modified by covalently closing the polynucleotide-unbinding opening. In some embodiments, a motor protein for addressing in this way is a helicase, as described herein.

In one embodiment, a motor protein is or is derived from a polynucleotide handling enzyme. A polynucleotide handling enzyme is a polypeptide that is capable of interacting with and modifying at least one property of a polynucleotide. The enzyme may modify the polynucleotide by cleaving it to form individual nucleotides or shorter chains of nucleotides, such as di- or trinucleotides. The enzyme may modify the polynucleotide by orienting it or moving it to a specific position.

In one embodiment, the motor protein is derived from a member of any of the Enzyme Classification (EC) groups 3.1.11, 3.1.13, 3.1.14, 3.1.15, 3.1.16, 3.1.21, 3.1.22, 3.1.25, 3.1.26, 3.1.27, 3.1.30 and 3.1.31.

In some embodiments of the claimed methods, the motor protein is a helicase, a polymerase, an exonuclease, a topoisomerase, an unfoldase, or a variant thereof.

In one embodiment, the motor protein is an exonuclease. Suitable enzymes include, but are not limited to, exonuclease I from *E. coli* (SEQ ID NO: 1), exonuclease III enzyme from *E. coli* (SEQ ID NO: 2), RecJ from *T. thermophilus* (SEQ ID NO: 3) and bacteriophage lambda exonuclease (SEQ ID NO: 4), TatD exonuclease and variants thereof. Three subunits comprising the sequence shown in SEQ ID NO: 3 or a variant thereof interact to form a trimer exonuclease.

In one embodiment, the motor protein is a polymerase. The polymerase may be PyroPhage® 3173 DNA Polymerase (which is commercially available from Lucigen® Corporation), SD Polymerase (commercially available from Bioron®), Klenow from NEB or variants thereof. In one embodiment, the enzyme is Phi29 DNA polymerase (SEQ ID NO: 5) or a variant thereof. Modified versions of Phi29 polymerase that may be used in the invention are disclosed in U.S. Pat. No. 5,576,204.

In one embodiment the motor protein is a topoisomerase. In one embodiment, the topoisomerase is a member of any of the Moiety Classification (EC) groups 5.99.1.2 and 5.99.1.3. The topoisomerase may be a reverse transcriptase, which are enzymes capable of catalysing the formation of cDNA from a RNA template. They are commercially available from, for instance, New England Biolabs® and Invitrogen®.

In one embodiment, the motor protein is a helicase. Any suitable helicase can be used in accordance with the methods provided herein. For example, the or each motor protein used in accordance with the present disclosure may be independently selected from a Hel308 helicase, a RecD helicase, a TraI helicase, a TrwC helicase, an XPD helicase, and a Dda helicase, or a variant thereof. Monomeric helicases may comprise several domains attached together. For instance, TraI helicases and TraI subgroup helicases may contain two RecD helicase domains, a relaxase domain and a C-terminal domain. The domains typically form a monomeric helicase that is capable of functioning without forming oligomers. Particular examples of suitable helicases include Hel308, NS3, Dda, UvrD, Rep, PcrA, Pif1 and TraI. These helicases typically work on single stranded DNA. Examples of helicases that can move along both strands of a double stranded DNA include FtfK and hexameric enzyme complexes, or multisubunit complexes such as RecBCD.

Hel308 helicases are described in publications such as WO 2013/057495, the entire contents of which are incorporated by reference. RecD helicases are described in publications such as WO 2013/098562, the entire contents of which are incorporated by reference. XPD helicases are described in publications such as WO 2013/098561, the entire contents of which are incorporated by reference. Dda helicases are described in publications such as WO 2015/055981 and WO 2016/055777, the entire contents of each of which are incorporated by reference.

In one embodiment the helicase comprises the sequence shown in SEQ ID NO: 6 (Trwc Cba) or a variant thereof, the sequence shown in SEQ ID NO: 7 (Hel308 Mbu) or a variant thereof or the sequence shown in SEQ ID NO: 8 (Dda) or a variant thereof. Variants may differ from the native sequences in any of the ways discussed herein. An example variant of SEQ ID NO: 8 comprises E94C/A360C. A further example variant of SEQ ID NO: 8 comprises E94C/A360C and then (ΔM1)G1G2 (i.e. deletion of M1 and then addition of G1 and G2).

In some embodiments a motor protein (e.g. a helicase) can control the movement of polynucleotides in at least two active modes of operation (when the motor protein is provided with all the necessary components to facilitate movement, e.g. fuel and cofactors such as ATP and $Mg^{2+}$ discussed herein) and one inactive mode of operation (when the motor protein is not provided with the necessary components to facilitate movement).

When provided with all the necessary components to facilitate movement (i.e. in the active modes), the motor protein (e.g. helicase) moves along the polynucleotide in a 5' to 3' or a 3' to 5' direction (depending on the motor protein). In embodiments in which the motor protein is used to control the movement of a polynucleotide strand with respect to a nanopore, the motor protein can be used to either move the polynucleotide away from (e.g. out of) the pore (e.g. against an applied force) or the polynucleotide towards (e.g. into) the pore (e.g. with an applied force). For example, when the end of the polynucleotide towards which the motor protein moves is captured by a pore, the motor protein works against the direction of the force and pulls the threaded polynucleotide out of the pore (e.g. into the cis chamber). However, when the end away from which the motor protein moves is captured in the pore, the motor protein works with the direction of the force and pushes the threaded polynucleotide into the pore (e.g. into the trans chamber).

When the motor protein (e.g. helicase) is not provided with the necessary components to facilitate movement (i.e. in the inactive mode) it can bind to the polynucleotide and act as a brake slowing the movement of the polynucleotide when it is moved with respect to a nanopore, e.g. by being pulled into the pore by a force. In the inactive mode, it does not matter which end of the polynucleotide is captured, it is the applied force which determines the movement of the polynucleotide with respect to the pore, and the polynucleotide binding protein acts as a brake. When in the inactive mode, the movement control of the polynucleotide by the polynucleotide binding protein can be described in a number of ways including ratcheting, sliding and braking.

A motor protein typically requires fuel in order to handle the processing of polynucleotides. Fuel is typically free nucleotides or free nucleotide analogues. The free nucleotides may be one or more of, but are not limited to, adenosine monophosphate (AMP), adenosine diphosphate (ADP), adenosine triphosphate (ATP), guanosine monophosphate (GMP), guanosine diphosphate (GDP), guanosine triphosphate (GTP), thymidine monophosphate (TMP), thymidine diphosphate (TDP), thymidine triphosphate (TTP), uridine monophosphate (UMP), uridine diphosphate (UDP), uridine triphosphate (UTP), cytidine monophosphate (CMP), cytidine diphosphate (CDP), cytidine triphosphate (CTP), cyclic adenosine monophosphate (cAMP), cyclic guanosine monophosphate (cGMP), deoxyadenosine monophosphate (dAMP), deoxyadenosine diphosphate (dADP), deoxyadenosine triphosphate (dATP), deoxyguanosine monophosphate (dGMP), deoxyguanosine diphosphate (dGDP), deoxyguanosine triphosphate (dGTP), deoxythymidine monophosphate (dTMP), deoxythymidine diphosphate (dTDP), deoxythymidine triphosphate (dTTP), deoxyuridine monophosphate (dUMP), deoxyuridine diphosphate (dUDP), deoxyuridine triphosphate (dUTP), deoxycytidine monophosphate (dCMP), deoxycytidine diphosphate (dCDP) and deoxycytidine triphosphate (dCTP). The free nucleotides are usually selected from AMP, TMP, GMP, CMP, UMP, dAMP, dTMP, dGMP or dCMP. The free nucleotides are typically adenosine triphosphate (ATP).

A cofactor for the motor protein is a factor that allows the motor protein to function. The cofactor is preferably a divalent metal cation. The divalent metal cation is preferably $Mg^{2+}$, $Mn^{2+}$, $Ca^{2+}$ or $Co^{2+}$. The cofactor is most preferably $Mg^{2+}$.

Motor proteins suitable for controlling the movement of polypeptide analytes are also known in the art. For example, unfoldase enzymes or variants thereof can be used to control the movement of polypeptides with respect to nanopores. Unfoldase enzymes include AAA+ enzymes such as the ClpX enzyme from *E. coli*.

Nanopores

Any suitable transmembrane nanopore can be used in the methods disclosed herein.

A transmembrane nanopore is a structure that crosses the membrane to some degree. It permits hydrated ions driven by an applied potential to flow across or within the membrane. The transmembrane nanopore typically crosses the entire membrane so that hydrated ions may flow from one side of the membrane to the other side of the membrane. However, the transmembrane nanopore does not have to cross the membrane. It may be closed at one end. For instance, the nanopore may be a well, gap, channel, trench or slit in the membrane along which or into which hydrated ions may flow.

Any transmembrane nanopore may be used in the methods provided herein. The nanopore may be biological or artificial. Suitable pores include, but are not limited to, protein pores, polynucleotide pores and solid state pores. The nanopore may be a nucleic acid nanopore, e.g. a DNA origami pore (Langecker et al., Science, 2012; 338: 932-936). Suitable DNA origami pores are disclosed in WO 2013/083983. The nanopore may be a polymer nanopore.

In one embodiment, the nanopore is a transmembrane protein pore. A transmembrane protein pore is a polypeptide or a collection of polypeptides that permits hydrated ions, such as polynucleotides, to flow from one side of a membrane to the other side of the membrane. In the methods provided herein, the transmembrane protein pore is capable of forming a pore that permits hydrated ions driven by an applied potential to flow from one side of the membrane to the other. The transmembrane protein pore preferably permits polynucleotides to flow from one side of the membrane, such as a triblock copolymer membrane, to the other. The transmembrane protein pore typically allows a polynucleotide to be moved through the pore.

In one embodiment, the nanopore is a transmembrane protein pore which is a monomer or an oligomer. The pore is preferably made up of several repeating subunits, such as at least 6, at least 7, at least 8, at least 9, at least 10, at least 11, at least 12, at least 13, at least 14, at least 15, or at least 16 subunits. The pore is preferably a hexameric, heptameric, octameric or nonameric pore. The pore may be a homo-oligomer or a hetero-oligomer.

In one embodiment, the transmembrane protein pore comprises a barrel or channel through which the ions may flow. The subunits of the pore typically surround a central axis and contribute strands to a transmembrane β-barrel or channel or a transmembrane α-helix bundle or channel.

Typically, the barrel or channel of the transmembrane protein pore comprises amino acids that facilitate interaction with an analyte, such as a target polynucleotide (as described herein). These amino acids are preferably located near a constriction of the barrel or channel. The transmembrane protein pore typically comprises one or more positively charged amino acids, such as arginine, lysine or histidine, or aromatic amino acids, such as tyrosine or tryptophan. These amino acids typically facilitate the interaction between the pore and nucleotides, polynucleotides or nucleic acids.

In one embodiment, the nanopore is a transmembrane protein pore derived from β-barrel pores or α-helix bundle pores. β-barrel pores comprise a barrel or channel that is formed from β-strands. Suitable β-barrel pores include, but are not limited to, β-toxins, such as α-hemolysin, anthrax toxin and leukocidins, and outer membrane proteins/porins of bacteria, such as *Mycobacterium smegmatis* porin (Msp), for example MspA, MspB, MspC or MspD, CsgG, outer membrane porin F (OmpF), outer membrane porin G (OmpG), outer membrane phospholipase A and *Neisseria* autotransporter lipoprotein (NalP) and other pores, such as lysenin. α-helix bundle pores comprise a barrel or channel that is formed from α-helices. Suitable α-helix bundle pores include, but are not limited to, inner membrane proteins and a outer membrane proteins, such as WZA and ClyA toxin.

In one embodiment the nanopore is a transmembrane pore derived from or based on Msp, α-hemolysin (α-HL), lysenin, CsgG, ClyA, Sp1 or haemolytic protein fragacea-toxin C (FraC).

In one embodiment, the nanopore is a transmembrane protein pore derived from CsgG, e.g. from CsgG from *E. coli* Str. K-12 substr. MC4100. Such a pore is oligomeric and typically comprises 7, 8, 9 or 10 monomers derived from CsgG. The pore may be a homo-oligomeric pore derived from CsgG comprising identical monomers. Alternatively, the pore may be a hetero-oligomeric pore derived from CsgG comprising at least one monomer that differs from the others. Examples of suitable pores derived from CsgG are disclosed in WO 2016/034591.

In one embodiment, the nanopore is a transmembrane pore derived from lysenin. Examples of suitable pores derived from lysenin are disclosed in WO 2013/153359.

In one embodiment, the nanopore is a transmembrane pore derived from or based on α-hemolysin (α-HL). The wild type α-hemolysin pore is formed of 7 identical monomers or sub-units (i.e., it is heptameric). An α-hemolysin pore may be α-hemolysin-NN or a variant thereof. The variant preferably comprises N residues at positions E111 and K147.

In one embodiment, the nanopore is a transmembrane protein pore derived from Msp, e.g. from MspA. Examples of suitable pores derived from MspA are disclosed in WO 2012/107778.

In one embodiment, the nanopore is a transmembrane pore derived from or based on ClyA.

Medium

The methods provided herein comprise detecting an analyte in a medium comprising an light-scattering constituent. Any suitable medium can be used.

In some embodiments the medium is an aqueous or non-aqueous (e.g. organic) solvent. An ionic liquid may also be used. Aqueous solutions are preferred.

The medium is a solvent for the analyte and light-scattering constituent. Thus the choice of medium will depend on the analyte to be detected and the light-scattering constituent for use. Typically water-based aqueous media optionally comprising one or more buffering agents, electrolytes, etc are suitable.

The methods may be carried out in the presence of charge carriers, such as metal salts, for example alkali metal salts, halide salts, for example chloride salts, such as alkali metal chloride salt. Charge carriers are particularly suitable when the movement of the analyte is driven by an electrical (e.g. voltage) potential as described herein.

Charge carriers may include ionic liquids or organic salts, for example tetramethyl ammonium chloride, trimethylphenyl ammonium chloride, phenyltrimethyl ammonium chloride, or 1-ethyl-3-methyl imidazolium chloride. Potassium chloride (KCl), sodium chloride (NaCl) or caesium chloride (CsCl) is typically used. KCl is preferred. The salt may be an alkaline earth metal salt such as calcium chloride ($CaCl_2$). The salt concentration may be at saturation. The salt concentration may be 3 M or lower and is typically from 0.1 to 2.5 M, e.g. from 0.3 to 1.9 M, such as from 0.5 to 1.8 M, e.g. from 0.7 to 1.7 M, for example from 0.9 to 1.6 M e.g. from 1 M to 1.4 M. In some embodiments lower salt concentrations are useful, for example these can stabilise the membrane or promote the solubility of only sparingly soluble light-scattering constituents or analytes. In some embodiments higher salt concentrations are useful, e.g. when the movement of the light-scattering constituent and/or analyte is driven by an applied electrical force.

The characterisation methods are typically carried out in the presence of a buffer. Any suitable buffer may be used. Typically, the buffer is HEPES. Another suitable buffer is Tris-HCl buffer. The methods are typically carried out at a pH of from 4.0 to 12.0, from 4.5 to 10.0, from 5.0 to 9.0, from 5.5 to 8.8, from 6.0 to 8.7 or from 7.0 to 8.8 or 7.5 to 8.5. The pH used is preferably about 7.5.

Membrane

In the methods provided herein, the transmembrane nanopore is typically present in a membrane. Any suitable membrane may be used.

The membrane is preferably an amphiphilic layer. An amphiphilic layer is a layer formed from amphiphilic molecules, such as phospholipids, which have both hydrophilic and lipophilic properties. The amphiphilic molecules may be synthetic or naturally occurring. Non-naturally occurring amphiphiles and amphiphiles which form a monolayer are known in the art and include, for example, block copolymers (Gonzalez-Perez et al., Langmuir, 2009, 25, 10447-10450). Block copolymers are polymeric materials in which two or more monomer sub-units that are polymerized together to create a single polymer chain. Block copolymers typically have properties that are contributed by each monomer sub-unit. However, a block copolymer may have unique properties that polymers formed from the individual sub-units do not possess. Block copolymers can be engineered such that one of the monomer sub-units is hydrophobic (i.e. lipophilic), whilst the other sub-unit(s) are hydrophilic whilst in aqueous media. In this case, the block copolymer may possess amphiphilic properties and may form a structure that mimics a biological membrane. The block copolymer may be a diblock (consisting of two monomer sub-units), but may also be constructed from more than two monomer sub-units to form more complex arrangements that behave as amphipiles. The copolymer may be a triblock, tetrablock or pentablock copolymer. The membrane is preferably a triblock copolymer membrane.

Archaebacterial bipolar tetraether lipids are naturally occurring lipids that are constructed such that the lipid forms a monolayer membrane. These lipids are generally found in extremophiles that survive in harsh biological environments, thermophiles, halophiles and acidophiles. Their stability is believed to derive from the fused nature of the final bilayer. It is straightforward to construct block copolymer materials that mimic these biological entities by creating a triblock polymer that has the general motif hydrophilic-hydrophobic-hydrophilic. This material may form monomeric membranes that behave similarly to lipid bilayers and encompass a range of phase behaviours from vesicles through to laminar membranes. Membranes formed from these triblock copolymers hold several advantages over biological lipid membranes. Because the triblock copolymer is synthesised, the exact construction can be carefully controlled to provide the correct chain lengths and properties required to form membranes and to interact with pores and other proteins.

Block copolymers may also be constructed from sub-units that are not classed as lipid sub-materials; for example a hydrophobic polymer may be made from siloxane or other non-hydrocarbon based monomers. The hydrophilic sub-section of block copolymer can also possess low protein binding properties, which allows the creation of a membrane that is highly resistant when exposed to raw biological samples. This head group unit may also be derived from non-classical lipid head-groups.

Triblock copolymer membranes also have increased mechanical and environmental stability compared with biological lipid membranes, for example a much higher operational temperature or pH range. The synthetic nature of the block copolymers provides a platform to customise polymer based membranes for a wide range of applications.

In some embodiments, the membrane is one of the membranes disclosed in International Application No. WO 2014/064443 or WO 2014/064444.

The amphiphilic molecules may be chemically-modified or functionalised to facilitate coupling of the polynucleotide. The amphiphilic layer may be a monolayer or a bilayer. The amphiphilic layer is typically planar. The amphiphilic layer may be curved. The amphiphilic layer may be supported.

Amphiphilic membranes are typically naturally mobile, essentially acting as two dimensional fluids with lipid diffusion rates of approximately $10^{-8}$ cm s$^{-1}$. This means that the pore and coupled polynucleotide can typically move within an amphiphilic membrane.

The membrane may be a lipid bilayer. Lipid bilayers are models of cell membranes and serve as excellent platforms for a range of experimental studies. For example, lipid bilayers can be used for in vitro investigation of membrane proteins by single-channel recording. Alternatively, lipid bilayers can be used as biosensors to detect the presence of a range of substances. The lipid bilayer may be any lipid bilayer. Suitable lipid bilayers include, but are not limited to, a planar lipid bilayer, a supported bilayer or a liposome. The lipid bilayer is preferably a planar lipid bilayer. Suitable lipid bilayers are disclosed in WO 2008/102121, WO 2009/077734 and WO 2006/100484.

Methods for forming lipid bilayers are known in the art. Lipid bilayers are commonly formed by the method of Montal and Mueller (Proc. Natl. Acad. Sci. USA., 1972; 69: 3561-3566), in which a lipid monolayer is carried on aqueous solution/air interface past either side of an aperture which is perpendicular to that interface. The lipid is normally added to the surface of an aqueous electrolyte solution by first dissolving it in an organic solvent and then allowing a drop of the solvent to evaporate on the surface of the aqueous solution on either side of the aperture. Once the organic solvent has evaporated, the solution/air interfaces on either side of the aperture are physically moved up and down past the aperture until a bilayer is formed. Planar lipid bilayers may be formed across an aperture in a membrane or across an opening into a recess.

The method of Montal & Mueller is popular because it is a cost-effective and relatively straightforward method of forming good quality lipid bilayers that are suitable for protein pore insertion. Other common methods of bilayer formation include tip-dipping, painting bilayers and patch-clamping of liposome bilayers.

Tip-dipping bilayer formation entails touching the aperture surface (for example, a pipette tip) onto the surface of a test solution that is carrying a monolayer of lipid. Again, the lipid monolayer is first generated at the solution/air interface by allowing a drop of lipid dissolved in organic solvent to evaporate at the solution surface. The bilayer is then formed by the Langmuir-Schaefer process and requires mechanical automation to move the aperture relative to the solution surface.

For painted bilayers, a drop of lipid dissolved in organic solvent is applied directly to the aperture, which is submerged in an aqueous test solution. The lipid solution is spread thinly over the aperture using a paintbrush or an equivalent. Thinning of the solvent results in formation of a lipid bilayer. However, complete removal of the solvent from the bilayer is difficult and consequently the bilayer formed by this method is less stable and more prone to noise during electrochemical measurement.

Patch-clamping is commonly used in the study of biological cell membranes. The cell membrane is clamped to the end of a pipette by suction and a patch of the membrane becomes attached over the aperture. The method has been adapted for producing lipid bilayers by clamping liposomes which then burst to leave a lipid bilayer sealing over the aperture of the pipette. The method requires stable, giant and unilamellar liposomes and the fabrication of small apertures in materials having a glass surface.

Liposomes can be formed by sonication, extrusion or the Mozafari method (Colas et al. (2007) Micron 38:841-847).

In some embodiments, a lipid bilayer is formed as described in International Application No. WO 2009/077734. Advantageously in this method, the lipid bilayer is formed from dried lipids. In a most preferred embodiment, the lipid bilayer is formed across an opening as described in WO2009/077734.

A lipid bilayer is formed from two opposing layers of lipids. The two layers of lipids are arranged such that their hydrophobic tail groups face towards each other to form a hydrophobic interior. The hydrophilic head groups of the lipids face outwards towards the aqueous environment on each side of the bilayer. The bilayer may be present in a number of lipid phases including, but not limited to, the liquid disordered phase (fluid lamellar), liquid ordered phase, solid ordered phase (lamellar gel phase, interdigitated gel phase) and planar bilayer crystals (lamellar sub-gel phase, lamellar crystalline phase).

Any lipid composition that forms a lipid bilayer may be used. The lipid composition is chosen such that a lipid bilayer having the required properties, such surface charge, ability to support membrane proteins, packing density or mechanical properties, is formed. The lipid composition can comprise one or more different lipids. For instance, the lipid composition can contain up to 100 lipids. The lipid composition preferably contains 1 to 10 lipids. The lipid composition may comprise naturally-occurring lipids and/or artificial lipids.

The lipids typically comprise a head group, an interfacial moiety and two hydrophobic tail groups which may be the same or different. Suitable head groups include, but are not limited to, neutral head groups, such as diacylglycerides (DG) and ceramides (CM); zwitterionic head groups, such as phosphatidylcholine (PC), phosphatidylethanolamine (PE) and sphingomyelin (SM); negatively charged head groups, such as phosphatidylglycerol (PG); phosphatidylserine (PS), phosphatidylinositol (PI), phosphatic acid (PA) and cardiolipin (CA); and positively charged headgroups, such as trimethylammonium-Propane (TAP). Suitable interfacial moieties include, but are not limited to, naturally-occurring interfacial moieties, such as glycerol-based or ceramide-based moieties. Suitable hydrophobic tail groups include, but are not limited to, saturated hydrocarbon chains, such as lauric acid (n-Dodecanolic acid), myristic acid (n-Tetradecanonic acid), palmitic acid (n-Hexadecanoic acid), stearic acid (n-Octadecanoic) and arachidic (n-Eicosanoic); unsaturated hydrocarbon chains, such as oleic acid (cis-9-Octadecanoic); and branched hydrocarbon chains, such as phytanoyl. The length of the chain and the position and number of the double bonds in the unsaturated hydrocarbon chains can vary. The length of the chains and the position and number of the branches, such as methyl groups, in the branched hydrocarbon chains can vary. The hydrophobic tail groups can be linked to the interfacial moiety as an ether or an ester. The lipids may be mycolic acid.

The lipids can also be chemically-modified. The head group or the tail group of the lipids may be chemically-modified. Suitable lipids whose head groups have been chemically-modified include, but are not limited to, PEG-modified lipids, such as 1,2-Diacyl-sn-Glycero-3-Phospho-ethanolamine-N-[Methoxy(Polyethylene glycol)-2000]; functionalised PEG Lipids, such as 1,2-Distearoyl-sn-Glyc-ero-3 Phosphoethanolamine-N-[Biotinyl(Polyethylene Gly-col)2000]; and lipids modified for conjugation, such as 1,2-Dioleoyl-sn-Glycero-3-Phosphoethanolamine-N-(succi-nyl) and 1,2-Dipalmitoyl-sn-Glycero-3-Phosphoetha-nolamine-N-(Biotinyl). Suitable lipids whose tail groups have been chemically-modified include, but are not limited to, polymerisable lipids, such as 1,2-bis(10,12-tri-cosadiynoyl)-sn-Glycero-3-Phosphocholine; fluorinated lip-ids, such as 1-Palmitoyl-2-(16-Fluoropalmitoyl)-sn-Glyc-ero-3-Phosphocholine; deuterated lipids, such as 1,2-Dipalmitoyl-D62-sn-Glycero-3-Phosphocholine; and ether linked lipids, such as 1,2-Di-O-phytanyl-sn-Glycero-3-Phosphocholine. The lipids may be chemically-modified or functionalised to facilitate coupling of the polynucleotide.

The amphiphilic layer, for example the lipid composition, typically comprises one or more additives that will affect the properties of the layer. Suitable additives include, but are not limited to, fatty acids, such as palmitic acid, myristic acid and oleic acid; fatty alcohols, such as palmitic alcohol, myristic alcohol and oleic alcohol; sterols, such as choles-terol, ergosterol, lanosterol, sitosterol and stigmasterol; lyso-phospholipids, such as 1-Acyl-2-Hydroxy-sn-Glycero-3-Phosphocholine; and ceramides.

In another embodiment, the membrane comprises a solid state layer. Solid state layers can be formed from both organic and inorganic materials including, but not limited to, microelectronic materials, insulating materials such as $Si_3N_4$, $Al_2O_3$, and SiO, organic and inorganic polymers such as polyamide, plastics such as Teflon® or elastomers such as two-component addition-cure silicone rubber, and glasses. The solid state layer may be formed from graphene. Suitable graphene layers are disclosed in WO 2009/035647. If the membrane comprises a solid state layer, the pore is typically present in an amphiphilic membrane or layer contained within the solid state layer, for instance within a hole, well, gap, channel, trench or slit within the solid state layer. The skilled person can prepare suitable solid state/amphiphilic hybrid systems. Suitable systems are disclosed in WO 2009/020682 and WO 2012/005857. Any of the amphiphilic membranes or layers discussed above may be used.

In some embodiments of the methods described herein, the nanopore is present in a droplet interface bilayer (DIB).

Droplet interface bilayers may be formed by bring into contact two or more droplets each comprising an amphi-philic coating. The contact of the amphiphilic coating on the droplets displaces any surrounding medium (e.g. an oil in which the droplets may be formed) and leads to the creation of a bilayer between the amphiphiles. Droplet interface bilayers are known in the art and are described in, for example, WO 2014/064444, the entire contents of which are incorporated by reference. In some embodiments of the claimed methods, the nanopore is present in a DIB. Such embodiments comprise generating a flux of the light-scattering constituent from a first droplet to a second droplet through a nanopore connecting the first and second droplets and taking one or more measurements of the lights scattered by the light-scattering constituent in the vicinity of the nanopore as the analyte moves with respect to the nanopore, e.g. as the analyte moves from the first droplet to the second droplet through the nanopore. The droplets can be of any appropriate size, and are amenable to miniaturisation e.g. by being of nanolitre volume. For example, the volume of a droplet in a DIB may be from about 50 nL to about 5000 nL such as from about 100 nL to about 1000 nL e.g. from about 200 nL to about 600 nL, e.g. from about 250 nL to about 500 nL such as from about 300 nL to about 400 nL e.g. about about 350 nL.

In other embodiments, the DIB may be formed between a droplet and a support such as a lipid-coated solid support. One example of a suitable support is a solid material coated with a polymeric coating. For example, a glass substrate may be used. A suitable polymeric coating is a polysaccha-ride coating such as agarose. Substrates such as glass substrates can be provided e.g. in the form of a "coverslip" which can be coated with the polymeric coating e.g. by spin coating. The polymeric coating is typically a thin layer of from about 50 nm to about 500 nm such as from about 100 nm to about 300 nm e.g. about 200 nm. Lipid coated supports can be obtained by incubating or otherwise con-tacting polymeric coated substrates with a suitable lipid, such as DPhPC.

The methods disclosed herein are typically carried out using (i) an artificial amphiphilic layer comprising a pore, (ii) an isolated, naturally-occurring lipid bilayer comprising a pore, or (iii) a cell having a pore inserted therein. The methods are typically carried out using an artificial amphi-philic layer, such as an artificial triblock copolymer layer. The layer may comprise other transmembrane and/or intramembrane proteins as well as other molecules in addi-tion to the pore. Suitable apparatus and conditions are discussed below. The methods provided herein are typically carried out in vitro.

In some embodiments of the methods provided herein, the nanopore is present in an array of a plurality of nanopores. The nanopore may be present in an array of droplet interface bilayers; e.g. an array of droplets may be formed. Each droplet may comprise one nanopore or a plurality of nan-opores in an array within each droplet.

An array of nanopores may be produced in a silicon-based array of wells. For example, in some embodiments each array comprises 128, 256, 512, 1024, 2000, 3000, 4000, 6000, 10000, 12000, 15000 or more wells.

Measurements and Characteristics that can be Determined

In one embodiment, the presence, absence or one or more characteristics of a target analyte are determined. The meth-ods may be for determining the presence, absence or one or more characteristics of at least one target analyte. The methods may concern determining the presence, absence or one or more characteristics of two or more target analyte. The methods may comprise determining the presence, absence or one or more characteristics of any number of target analyte, such as 2, 5, 10, 15, 20, 30, 40, 50, 100 or more target analyte. Any number of characteristics of the one or more target analyte may be determined, such as 1, 2, 3, 4, 5, 10 or more characteristics.

Accordingly, also provided herein is a method of charac-terising an analyte, comprising carrying out a method described herein; and taking one or more measurements as the analyte moves with respect to the nanopore, wherein the one or more measurements are indicative of one or more characteristics of the analyte, and thereby characterising the analyte as it moves with respect to the pore.

In more detail, provided herein is a method of characterising an analyte, wherein the analyte is present in a medium comprising a light-scattering constituent, the method comprising:

contacting the medium with a nanopore;

generating a flux of the constituent through the nanopore;

contacting the analyte with the nanopore so that the analyte influences the flux of the constituent through the nanopore;

illuminating the medium in the vicinity of the nanopore with one or more light sources; and taking one or more measurements of the light scattered by the constituent in the vicinity of the nanopore as the analyte moves with respect to the nanopore, wherein the one or more measurements are indicative of one or more characteristics of the analyte, and thereby characterising the analyte as it moves with respect to the pore.

In such methods, the analyte, medium, light-scattering constituent, nanopore, light source, and measurements taken etc are typically as described in more detail herein.

As explained above, an analyte is typically a polynucleotide or peptide, particularly a polynucleotide. When the analyte is a polynucleotide or polypeptide, one characteristic that can be preferably determined is the sequence of the polynucleotide or polypeptide. Other characteristics that can be determined include whether or not the polynucleotide or polypeptide is modified and the extent and/or number of any such modifications that may be present; the identity of the polynucleotide or polypeptide, and the secondary structure of the polynucleotide or polypeptide. Modifications that may be characterised in the methods of the invention include whether and to what extend the polynucleotide or polypeptide is modified (e.g. by methylation, by oxidation, by damage, with one or more proteins or with one or more labels, tags or spacers).

It will be apparent in view of the above discussion that in some embodiments, provided herein is a method of detecting a polynucleotide or polypeptide analyte in an aqueous medium, the medium comprising a hydrophilic water-soluble light-scattering constituent, the method comprising:

contacting the medium with a transmembrane protein nanopore;

generating a flux of the constituent through the nanopore by applying an electrical potential and/or a concentration gradient of the light-scattering constituent across the nanopore;

contacting the analyte with the nanopore so that the analyte influences the flux of the constituent through the nanopore;

illuminating the medium in the vicinity of the nanopore with one or more light sources; and taking one or more measurements of the light scattered by the constituent in the vicinity of the nanopore as the analyte moves with respect to the nanopore, and thereby detecting the analyte as it moves with respect to the nanopore;

wherein taking one or more measurements of the light scattered by the constituent comprises detecting interference between the scattering signal and a reference beam.

In some other embodiments, provided herein is a method of detecting a polynucleotide analyte in an aqueous medium, the medium comprising a saccharide or polymeric light-scattering constituent (e.g. sucrose or polyethylene glycol), the method comprising:

contacting the medium with a transmembrane β-barrel protein nanopore;

generating a flux of the constituent through the nanopore by providing a concentration gradient of the light-scattering constituent across the nanopore;

contacting the analyte with the nanopore so that the analyte influences the flux of the constituent through the nanopore;

illuminating the medium in the vicinity of the nanopore with one or more light sources, wherein said one or more light sources optionally comprise at least one laser; and taking one or more iSCAT measurements of the light scattered by the constituent in the vicinity of the nanopore as the analyte moves with respect to the nanopore, and thereby detecting the analyte as it moves with respect to the nanopore;

wherein taking one or more measurements of the light scattered by the constituent comprises detecting interference between the scattering signal and a reference beam provided by a reflected beam from an interface;

wherein optionally the nanopore is present in a droplet interface bilayer.

Apparatus

Also provided are apparatuses for conducting the methods provided herein. Accordingly, in one embodiment, provided herein is an apparatus, comprising:

a chamber having a volume, said volume containing a medium comprising a light-scattering constituent;

a membrane comprising a nanopore, wherein said nanopore is in contact with said medium;

one or more light sources for illuminating the volume in the vicinity of the nanopore; and a detector for detecting light scattered by the constituent.

In some embodiments, the detector is configured to detect interference between a scattering signal corresponding to flux of the constituent through the nanopore and a reference beam. The detector may be any of the detectors described herein.

In some embodiments, the medium comprises an analyte for detection using said apparatus. The medium and analyte are typically as described in more detail herein.

The apparatus may further comprise a motor protein for controlling the movement of the analyte with respect to the nanopore. The motor protein may be for example any of the motor proteins described herein.

The apparatus may be a microfluidic apparatus. Thus, the apparatus may be miniaturised. In some embodiments, a minimum detection apparatus could comprise a single LED, a photodiode and the scattering signal generated may correspond to a flux of a light-scattering constituent such as sucrose through a single nanopore, e.g. located in a droplet interface bilayer between two droplets of nanolitre volume or between a droplet of nanolitre volume and a solid support as described herein. The apparatus may comprise a further reference beam.

In more detail, the apparatus may comprise a chamber comprising an aqueous solution and a barrier that separates the chamber into two sections. The barrier may have an aperture in which a membrane containing a transmembrane nanopore is formed. Transmembrane pores are described herein.

In other embodiments, the apparatus may comprise a chamber comprising a plurality of droplets connected by one or more droplet interface bilayers. A nanopore may be present in at least one droplet interface bilayer thereby connecting the droplets. The droplets may be supported by a hydrogel layer as described in WO 2009/024775.

Whilst the present methods do not rely on electrical detection of ionic currents, features of the apparatuses described in WO 2008/102120, WO 2010/122293 or WO 00/28312 may be useful.

The methods herein may involve applying an electrical (e.g. potential) gradient across the nanopore e.g. to drive the flux of the light-scattering constituent and/or the analyte to be detected. Therefore the apparatus may also comprise an electrical circuit capable of applying a potential and optionally measuring an electrical signal across the membrane and pore. The potential may be applied by using a patch clamp or a voltage clamp.

The apparatus may apply a voltage across the membrane and pore. The voltage used is typically from +2 V to –2 V, typically –400 mV to +400 mV. The voltage used is preferably in a range having a lower limit selected from –400 mV, –300 mV, –200 mV, –150 mV, –100 mV, –50 mV, –20 mV and 0 mV and an upper limit independently selected from +10 mV, +20 mV, +50 mV, +100 mV, +150 mV, +200 mV, +300 mV and +400 mV. The voltage used is more preferably in the range 100 mV to 240 mV and most preferably in the range of 120 mV to 220 mV. If the voltage is used to drive the movement of the analyte with respect to the nanopore, it is in some embodiments possible to improve resolution (e.g. increase discrimination between different nucleotides in a polynucleotide analyte) by using an increased applied potential.

The characterisation methods may be carried out at from 0° C. to 100° C., from 15° C. to 95° C., from 16° C. to 90° C., from 17° C. to 85° C., from 18° C. to 80° C., 19° C. to 70° C., or from 20° C. to 60° C. The characterisation methods are typically carried out at room temperature. The characterisation methods are optionally carried out at a temperature that supports enzyme function, such as about 37° C.

The apparatus may comprise a silicon-based array of wells where each array comprises 128, 256, 512, 1024, 2000, 3000, 4000, 6000, 10000, 12000, 15000 or more wells.

System

Also provided are systems for conducting the methods provided herein. Accordingly, in one embodiment, provided herein is a system, comprising:
a medium comprising a light-scattering constituent;
a nanopore in contact with the medium;
the medium in the vicinity of the nanopore being illuminated by one or more light sources; and
a reference light source.
In another embodiment, provided is a system, comprising:
a medium comprising a light-scattering constituent;
a nanopore in contact with the medium;
the medium in the vicinity of the nanopore being illuminated by one or more light sources; and
a detector for detecting light scattered by the light-scattering constituent in the vicinity of the nanopore.
In another embodiment, provided is a system, comprising:
a medium comprising a light-scattering constituent selected from a carbohydrate, an amino acid, a polymer and an electrolyte;
a nanopore in contact with the medium; and
the medium in the vicinity of the nanopore being illuminated by one or more light sources.
In another embodiment, provided is a system, comprising:

a medium comprising a light-scattering constituent;
a nanopore in contact with the medium;
the medium in the vicinity of the nanopore being illuminated by one or more light sources; and
a motor protein for controlling the movement of the analyte with respect to the nanopore.

Typically, in such systems, the light-scattering constituent is non-fluorescent. In some embodiments, the system comprises a flux of said constituent through the nanopore. Typically, the constituent is a hydrophilic non-charged molecule such as hydrocarbons, solvents, organic molecules such as carbohydrates, amino acids (including oligopeptides and polypeptides), saccharides (including oligosaccharides and polysaccharides), nucleic acids (e.g. polynucleic acids) non-biological polymers, salts and other electrolytes, amphiphiles and surfactants, and the like. The light-scattering constituent typically does not comprise a fluorophore.

In some embodiments, the system further comprises an analyte for detection using the system. The analyte may for example be any analyte as described in more detail herein.

In some embodiments, the system may further comprise additional components, such as a detector for detecting light scattered by the constituent in the vicinity of the nanopore and/or a motor protein for controlling the movement of the analyte with respect to the nanopore. The detector and/or motor protein may be as described in more detail herein.

In the claimed systems, the analyte, medium, light-scattering constituent, nanopore, light source, reference light source, and measurements taken etc are typically as described in more detail herein.

It is to be understood that although particular embodiments, specific configurations as well as materials and/or molecules, have been discussed herein for methods according to the present invention, various changes or modifications in form and detail may be made without departing from the scope and spirit of this invention. The following examples are provided to better illustrate particular embodiments, and they should not be considered limiting the application. The application is limited only by the claims.

EXAMPLES

Example 1

This example describes an apparatus and system useful for carrying out the claimed methods.

A droplet interface bilayer (DIB) was generated according to the protocols described in Wit, G. de, Danial, J. S. H., Kukura, P. & Wallace, M. I. "*Dynamic label-free imaging of lipid nanodomains.*" Proceedings of the National Academy of Sciences, USA, 112, 12299-12303 (2015); and Leptihn S., Castell O. K., Cronin B., Lee E. H., Gross L. C. M., Marshall D. P., Thompson J. R., Holden M., & Wallace M. I. "*Constructing Droplet Interface Bilayers from the Contact of Aqueous Droplets in Oil*". Nature Protocols (2013) 8, 1048.

*S. aureus* alpha-hemolysin (αHL) WT heptamer protein was expressed in *E. coli* following conventional protocols and purified.

1.2 nM αHL and analytes (described below) were placed in a 200-350 nl droplet (1.32 M KCl, 8.8 mM HEPES, pH 7.0), and incubated in 3 mM 1,2-diphytanoyl-sn-glycero-3-phosphocholine (DPhPC) in hexadecane to form a lipid monolayer. The droplet was transferred by pipetting onto a coverslip in a micro machined PMMA (polymethylmethacrylate) device (FIG. 1).

The coverslip was spin-coated (3,000 r.p.m., 30 s) with a thin layer (~200 nm) of agarose (0.8M KCl, 1M sucrose, 8.8 mM HEPES, pH 7.0) and subsequently incubated with 3 mM DPhPC in hexadecane. On contact with the monolayer on the agarose, the lipid-coated droplet spontaneously formed a DIB.

An applied electrical potential (e.g. 80 mV) via electrodes inserted into the agarose layer and into the droplet was found to be suitable to control the flux through the αHL pore. Alternatively, an osmotic gradient could be used to indirectly control the flux. Here, the KCl was omitted from the droplet and no electrodes were inserted.

Figure 2:
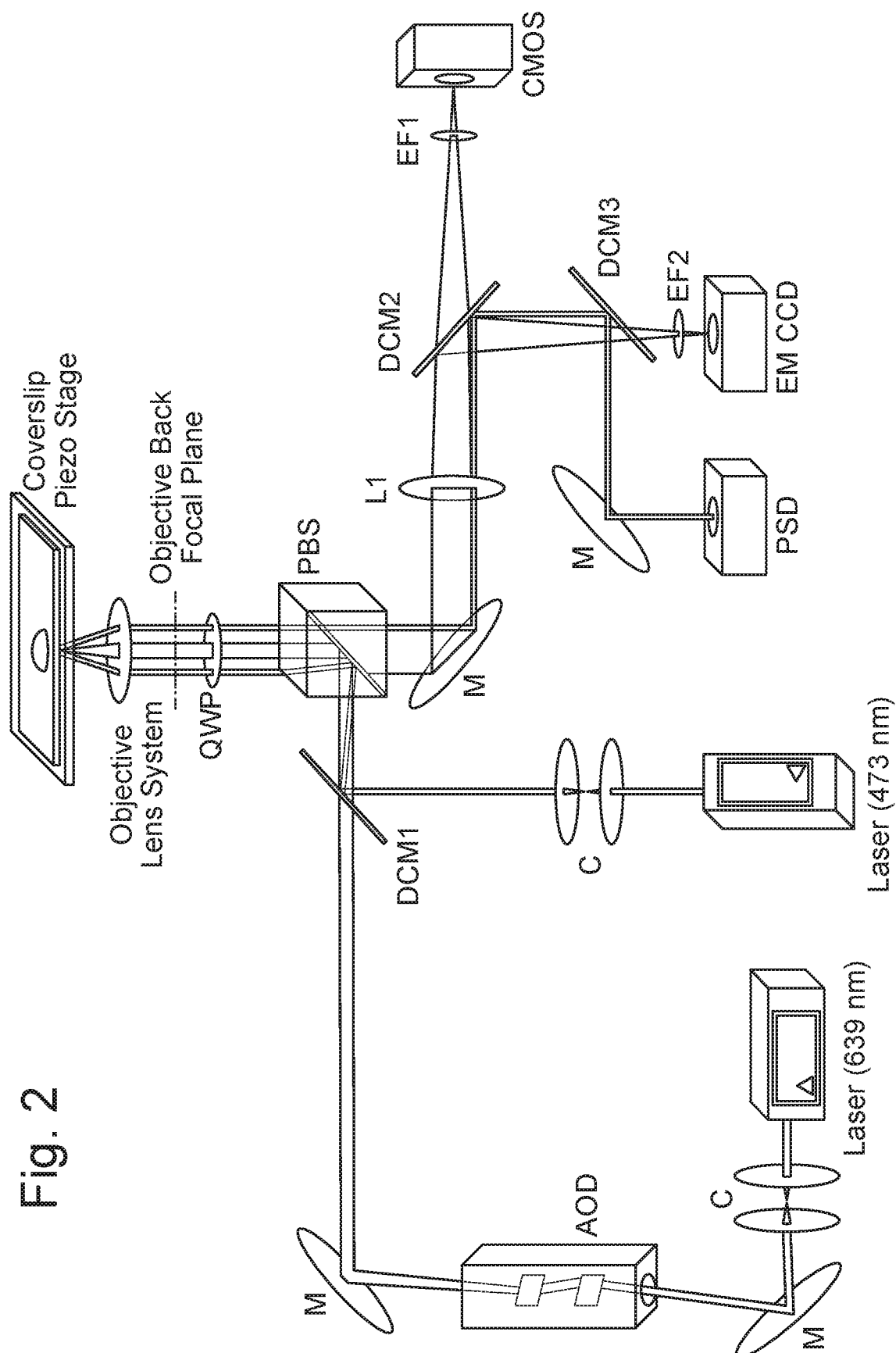
FIG. 2. Schematic of interferometric microscope useful for conducting the claimed methods, as described in the Example.

The DIB and device were placed on an interferometric microscope with AOD (acoustic-optic deflector)-assisted laser illumination and CMOS detection, as described in detail in H. L. E. Coker, M. R. Cheetham, D. R. Kattnig, Y. J. Wang, S. Garcia-Manyes, & M. I. Wallace, "Controlling Anomalous Diffusion in Lipid Membranes", arXiv: 1709.04698; accessible at https://arxiv.org/pdf/1709.04698.pdf. A schematic of the interferometric microscope setup is shown in FIG. 2.

Figure 3:
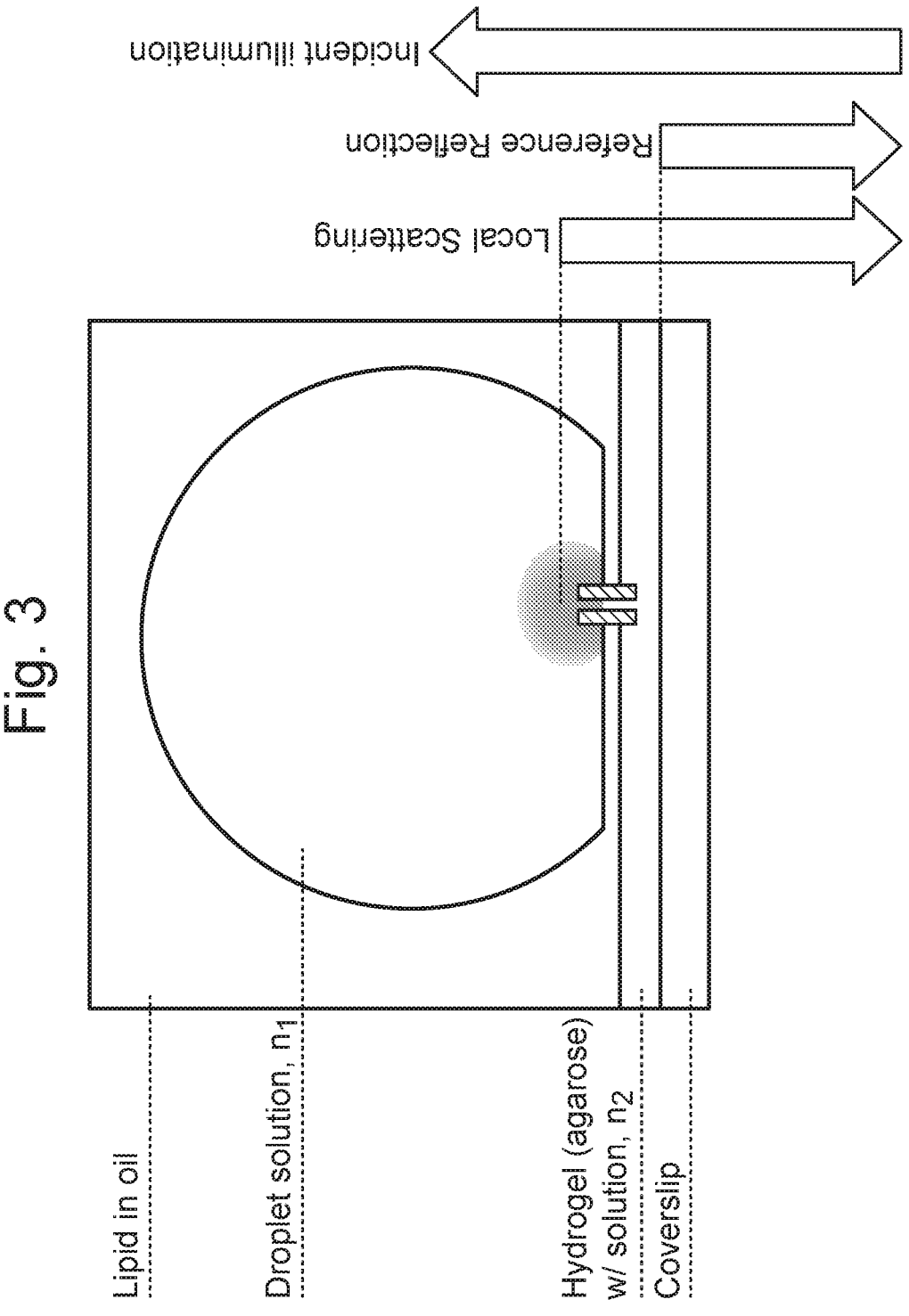
FIG. 3. Schematic of a droplet interface bilayer comprising a nanopore and the detection of scattering from an light-scattering constituent in the vicinity of the nanopore, as described in the Example.

Flux of liquid of a differing refractive index than the surroundings was caused to flow into the droplet from the agarose layer and provided a source of differential scattering relative to the surrounding medium. Interference between this scattered light and a reference beam, provided by the reflection from the glass coverslip, gave rise to a signal detectable using the CMOS camera (FIG. 3).

Figure 4:
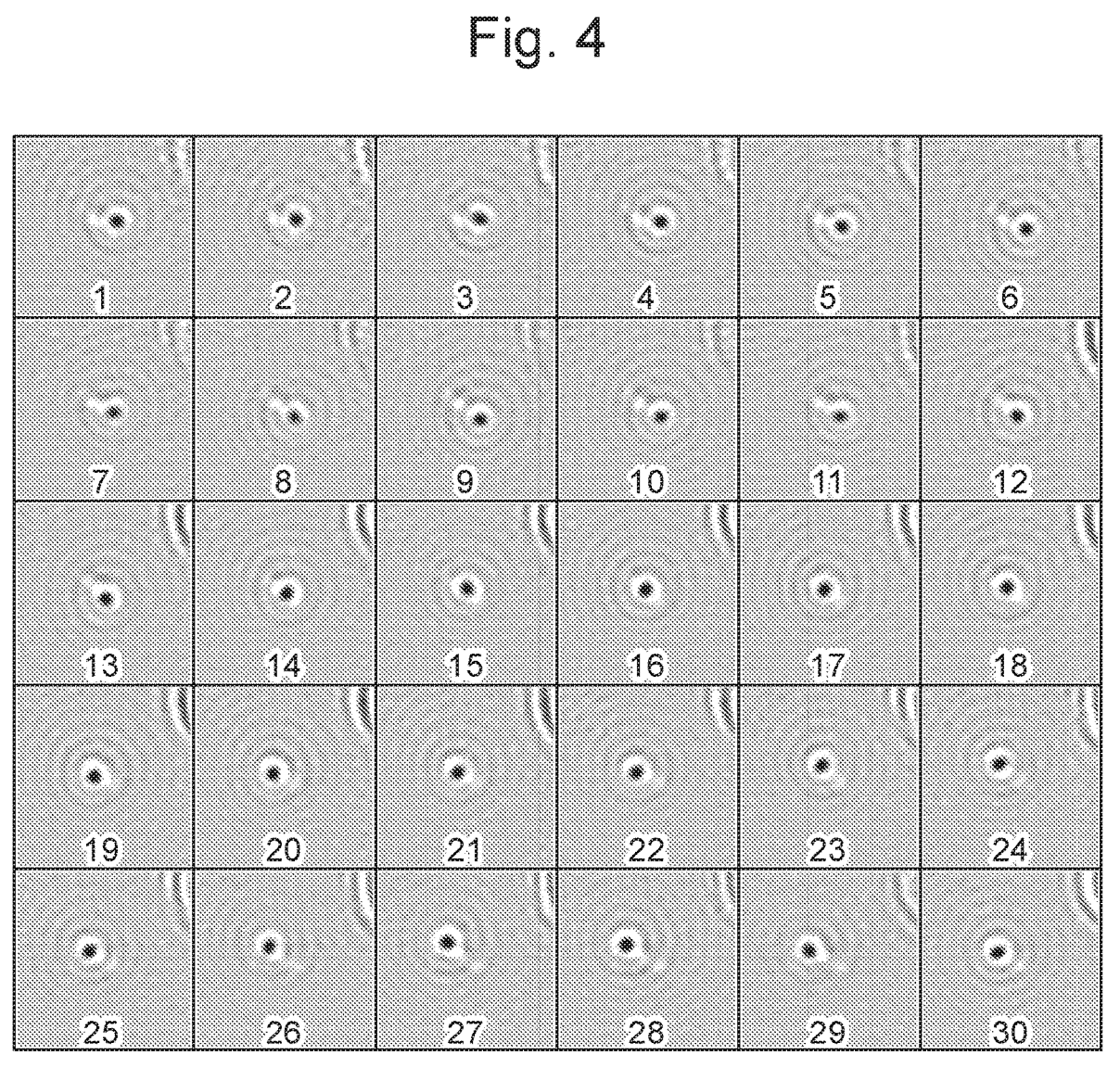

Using a 1M Sucrose gradient in the absence of analytes stable diffusing signals were detected in the presence of αHL nanopores. Results are shown in FIG. 4 (20 ms per frame, montage of diffusing αHL; images were processed by dividing by the median image). In the absence of sucrose, no signals were detected.

Figure 5A:
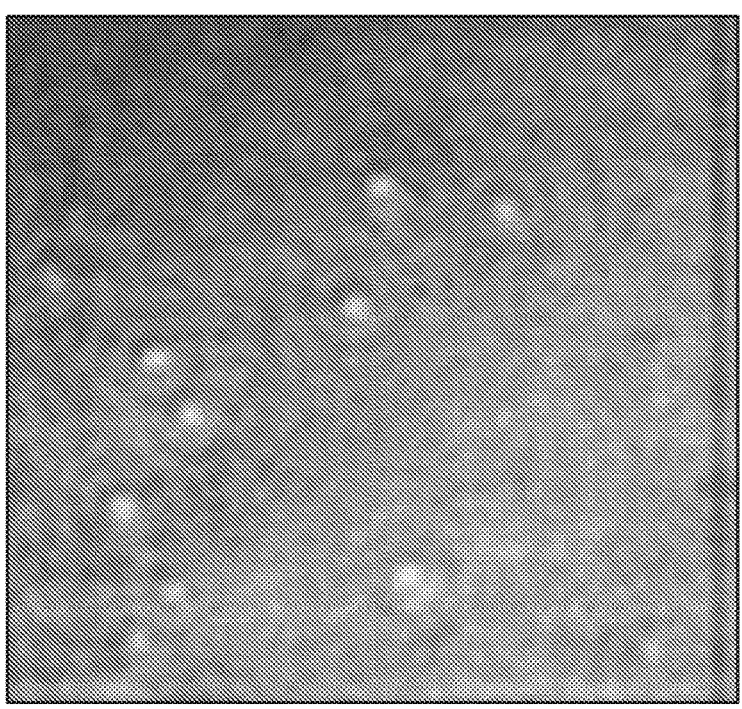
FIG. 5. Droplet interface bilayers showing the punctate diffraction-limited diffusion of voltage-dependent flux (80 mV) of a DNA analyte through an α-hemolysin nanopore. 5A: multiple nanopores. 5B: time sequence (50 ms/fr) from a single nanopore in the presence of DNA.
Figure 5B:
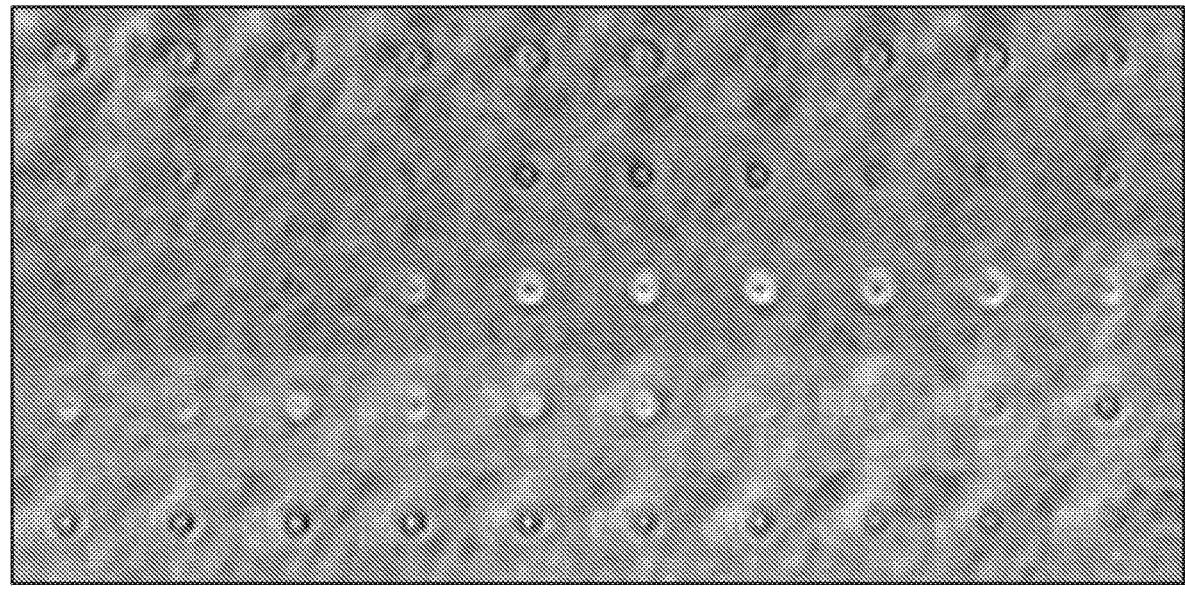

DIBs with a refractive index gradient showed punctate diffraction-limited diffusing sites of voltage dependent flux. Results obtained at 80 mV are shown in FIG. 5. (FIG. 5A: multiple nanopores. FIG. 5B: time sequence (50 ms/fr) from a single nanopore in the presence of a poly-$C_{40}$ DNA). Changes in intensity were dependent on applied potential and the presence of both αHL nanopores and the poly-$C_{40}$ DNA analyte, demonstrating the ability of the methods provided herein to detect movement of DNA with respect to the nanopore.

Figure 6:
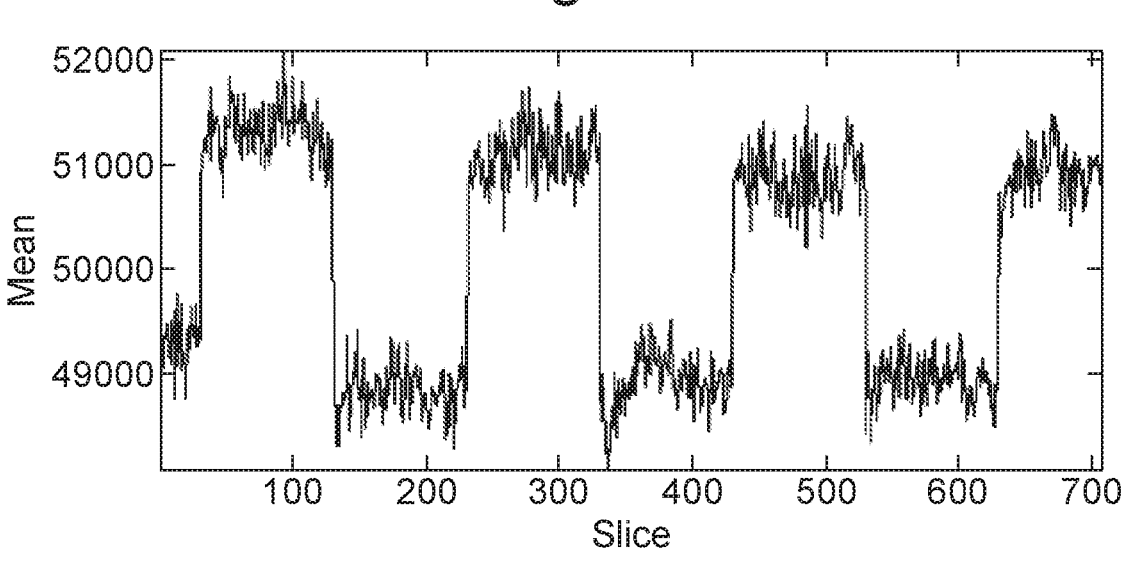
FIG. 6. Optical signals arising from the interference scattering signal through three individual nanopores under the influence of applied square wave potential (+/−80 mV); each slice corresponds to a 20 ms frame.
Figure 6:
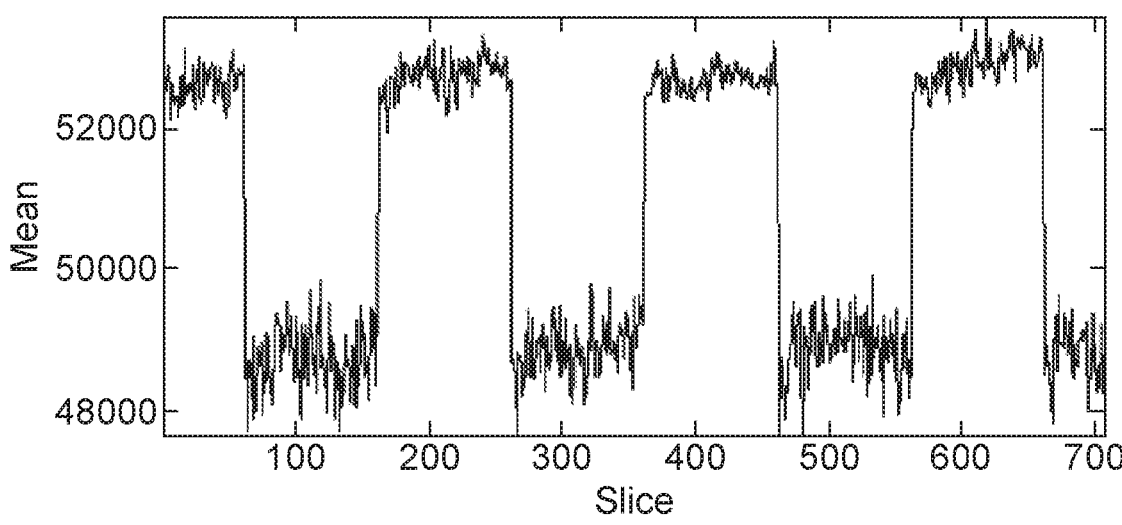
Figure 6:
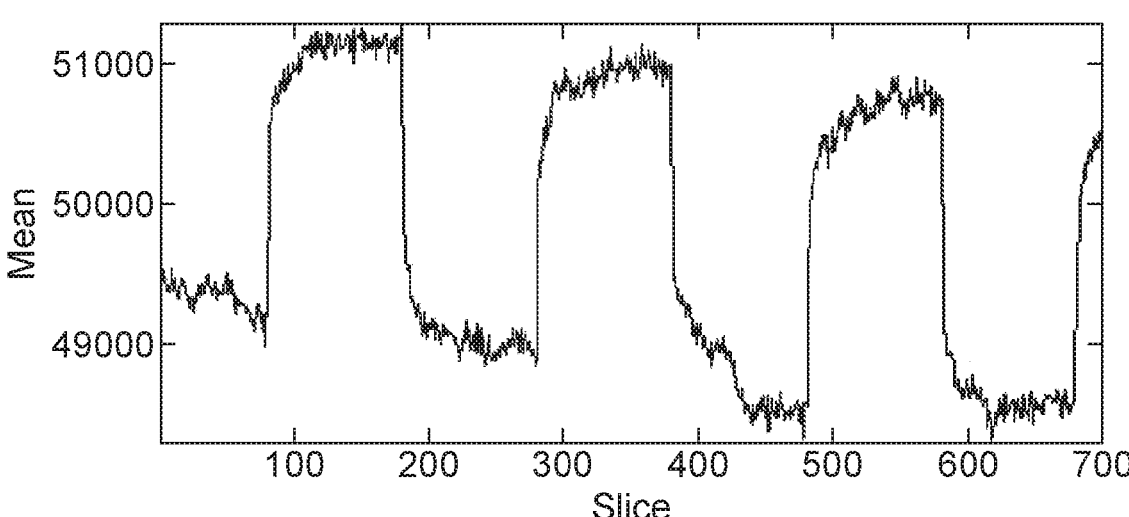

In the presence of an applied square wave potential (+/−80 mV), corresponding switching in the optical signal from an individual pore were detected, FIG. 6 (each slice independently corresponds to a frame of 20 ms; each slice shows data recorded for separate pores).

Example 2

This example further illustrates detection of an interferometric signal at the site of a single alpha-hemolysin nanopore diffusing in a droplet interface bilayer.

A droplet interface bilayer (DIB) was generated according to the protocols described in Leptihn S., Castell O. K., Cronin B., Lee E. H., Gross L. C. M., Marshall D. P., Thompson J. R., Holden M., & Wallace M. I. "*Constructing Droplet Interface Bilayers from the Contact of Aqueous Droplets in Oil*". Nature Protocols (2013) 8, 1048.

*S. aureus* alpha-hemolysin (αHL) WT heptamer protein was expressed in *E. coli* following conventional protocols and purified.

22 nM αHL was placed in droplet containing 300 mM KCl, 20 mM HEPES, pH 7.0) and 2M sucrose and incubated in 9.5 mg/mL DPhPC containing $2 \times 10^{-8}$ mol % cap biotin- DHPE (N-(Biotinoyl)-1,2-dihexadecanoyl-sn-glycero-3-phosphoethanolamine) C16:Ar-20 [9:1] in hexadecane to form a lipid monolayer. The droplet was transferred by pipetting onto plasma-cleaned coverslip.

The coverslip was spin-coated (3,000 r.p.m., 30 s) with a thin layer of agarose (substrate agarose: 0.5 wt % ultra-low melting point agarose; product code: A5030, Sigma Aldrich; rehydrating agarose: 1.2 wt % agarose, product code: A9414, Sigma Aldrich; 300 mM KCl, 2.44M glucose, 20 mM HEPES, pH 7.0) and subsequently incubated with the lipid mixture in hexadecane. On contact with the monolayer on the agarose, the lipid-coated droplet spontaneously formed a DIB.

The DIB and device were placed on an interferometric microscope as described in example 1. An electrical potential was applied via electrodes inserted into the agarose layer. Interference scattering caused by flux through single αHL nanopores in response to the applied potential was detected using imaging conditions as below:

Imaging conditions: 700 mW illumination at 650 nm. 150 FPS imaging was captured with a CMOS camera.

Image processing: Subtract median Z-stack. Min/max pixel shown: 0.96-1.03 contrast.

Z projection: Mean contrast of circular region drawn around each spot.

Figure 7:
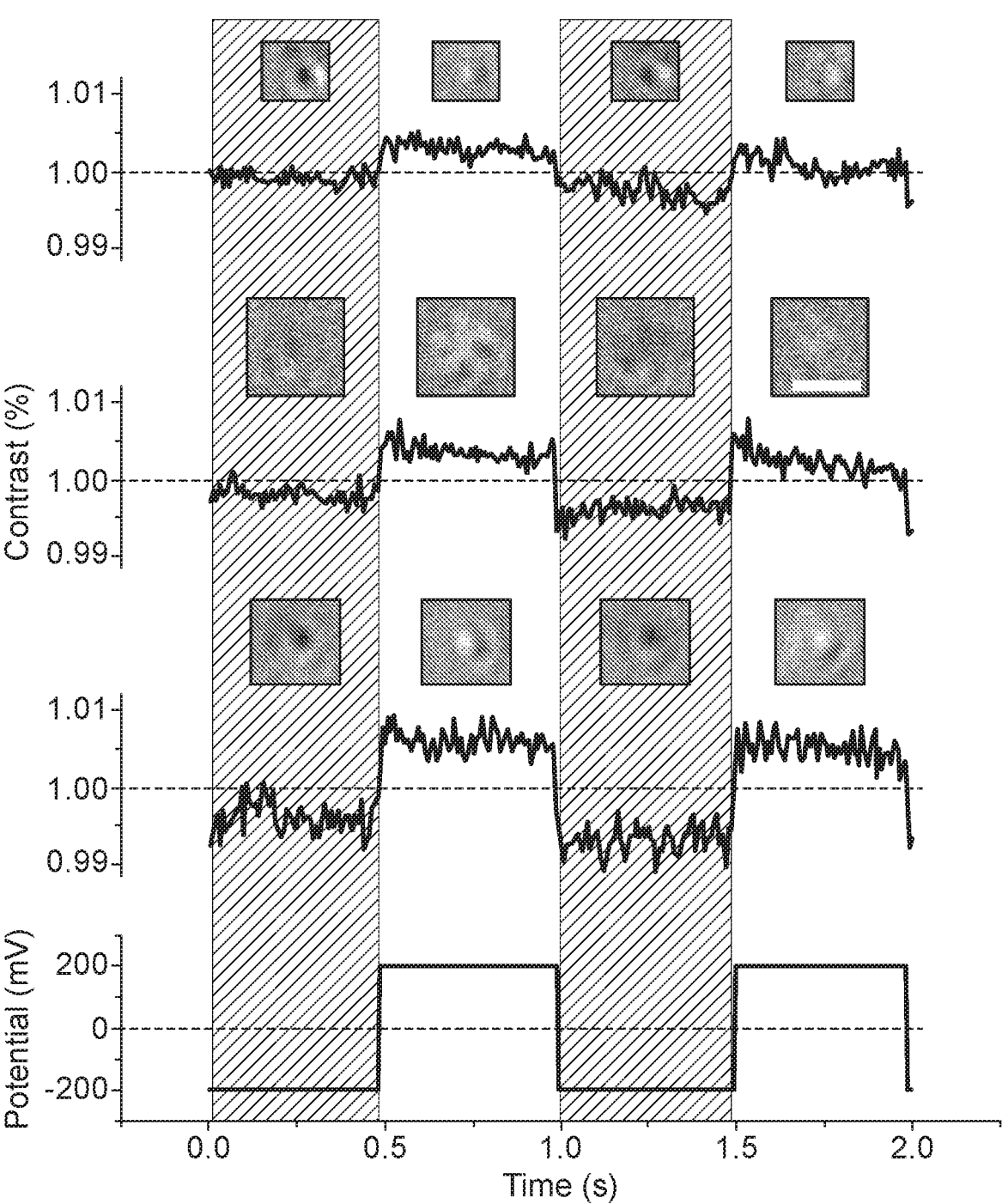
FIG. 7. Optical signals arising from the interference scattering signal through three individual nanopores under the influence of an applies square wave potential (+/−200 mV). Data are described in Example 2.

Results are shown in FIG. 7. In response to the applied square wave potential (+/−200 mV) changes in contrast were recorded corresponding to the interferometric scattering caused by flux of sucrose through the pore. The contrast signal responds rapidly and reproducibly in response to the applied potential. Each trace corresponds to a different nanopore.

SEQUENCE LISTING exonuclease I from *E. coli*

SEQ ID NO: 1

MMNDGKQQSTFLFHDYETFGTHPALDRPAQFAAIRTDSEFNVIGEPEVF

YCKPADDYLPQPGAVLITGITPQEARAKGENEAAFAARIHSLFTVPKTC

ILGYNNVRFDDEVTRNIFYRNFYDPYAWSWQHDNSRWDLLDVMRACYAL

RPEGINWPENDDGLPSFRLEHLTKANGIEHSNAHDAMADVYATIAMAKL

VKTRQPRLFDYLFTHRNKHKLMALIDVPQMKPLVHVSGMFGAWRGNTSW

VAPLAWHPENRNAVIMVDLAGDISPLLELDSDTLRERLYTAKTDLGDNA

AVPVKLVHINKCPVLAQANTLRPEDADRLGINRQHCLDNLKILRENPQV

REKVVAIFAEAEPFTPSDNVDAQLYNGFFSDADRAAMKIVLETEPRNLP

ALDITFVDKRIEKLLFNYRARNFPGTLDYAEQQRWLEHRROVFTPEFLQ

GYADELQMLVQQYADDKEKVALLKALWQYAEEIVSGSGHHHHHH exonuclease III enzyme from *E. coli*

SEQ ID NO: 2

MKFVSFNINGLRARPHQLEAIVEKHQPDVIGLQETKVHDDMFPLEEVAK

LGYNVFYHGQKGHYGVALLTKETPIAVRRGFPGDDEEAQRRIIMAEIPS

LLGNVTVINGYFPQGESRDHPIKFPAKAQFYQNLQNYLETELKRDNPVL

IMGDMNISPTDLDIGIGEENRKRWLRTGKCSFLPEEREWMDRLMSWGLV

DTFRHANPQTADRFSWFDYRSKGFDDNRGLRIDLLLASQPLAECCVETG

IDYEIRSMEKPSDHAPVWATFRR

RecJ enzyme from T. thermophilus

SEQ ID NO: 3

MFRRKEDLDPPLALLPLKGLREAAALLEEALRQGKRIRVHGDYDADGLT

GTAILVRGLAALGADVHPFIPHRLEEGYGVLMERVPEHLEASDLFLTVD

CGITNHAELRELLENGVEVIVTDHHTPGKTPPPGLVVHPALTPDLKEKP

TGAGVAFLLLWALHERLGLPPPLEYADLAAVGTIADVAPLWGWNRALVK

EGLARIPASSWVGLRLLAEAVGYTGKAVEVAFRIAPRINAASRLGEAEK

ALRLLLTDDAAEAQALVGELHRLNARRQTLEEAMLRKLLPQADPEAKAI

VLLDPEGHPGVMGIVASRILEATLRPVFLVAQGKGTVRSLAPISAVEAL

RSAEDLLLRYGGHKEAAGFAMDEALFPAFKARVEAYAARFPDPVREVAL

LDLLPEPGLLPQVFRELALLEPYGEGNPEPLFL bacteriophage lambda exonuclease

SEQ ID NO: 4

MTPDIILQRTGIDVRAVEQGDDAWHKLRLGVITASEVHNVIAKPRSGKK

WPDMKMSYFHTLLAEVCTGVAPEVNAKALAWGKQYENDARTLFEFTSGV

NVTESPIIYRDESMRTACSPDGLCSDGNGLELKCPFTSRDFMKFRLGGF

EAIKSAYMAQVQYSMWVTRKNAWYFANYDPRMKREGLHYVVIERDEKYM

ASFDEIVPEFIEKMDEALAEIGFVFGEQWR

Phi29 DNA polymerase

SEQ ID NO: 5

MKHMPRKMYSCAFETTTKVEDCRVWAYGYMNIEDHSEYKIGNSLDEFMA

WVLKVQADLYFHNLKFDGAFIINWLERNGFKWSADGLPNTYNTIISRMG

QWYMIDICLGYKGKRKIHTVIYDSLKKLPFPVKKIAKDFKLTVLKGDID

YHKERPVGYKITPEEYAYIKNDIQIIAEALLIQFKQGLDRMTAGSDSLK

GFKDIITTKKFKKVFPTLSLGLDKEVRYAYRGGFTWLNDRFKEKEIGEG

MVFDVNSLYPAQMYSRLLPYGEPIVFEGKYVWDEDYPLHIQHIRCEFEL

KEGYIPTIQIKRSRFYKGNEYLKSSGGEIADLWLSNVDLELMKEHYDLY

NVEYISGLKFKATTGLFKDFIDKWTYIKTTSEGAIKQLAKLMLNSLYGK

FASNPDVTGKVPYLKENGALGFRLGEEETKDPVYTPMGVFITAWARYTT

ITAAQACYDRIIYCDTDSIHLTGTEIPDVIKDIVDPKKLGYWAHESTFK

RAKYLRQKTYIQDIYMKEVDGKLVEGSPDDYTDIKFSVKCAGMTDKIKK

EVTFENFKVGFSRKMKPKPVQVPGGVVLVDDTFTIKSGGSAWSHPQFEK

GGGSGGGSGGSAWSHPQFEK

Trwc Cba helicase

SEQ ID NO: 6

MLSVANVRSPSAAASYFASDNYYASADADRSGQWIGDGAKRLGLEGKVE

ARAFDALLRGELPDGSSVGNPGQAHRPGTDLTFSVPKSWSLLALVGKDE

RIIAAYREAVVEALHWAEKNAAETRVVEKGMVVTQATGNLAIGLFQHDT

NRNQEPNLHFHAVIANVTQGKDGKWRTLKNDRLWQLNTTLNSIAMARFR

VAVEKLGYEPGPVLKHGNFEARGISREQVMAFSTRRKEVLEARRGPLD

AGRIAALDTRASKEGIEDRATLSKQWSEAAQSIGLDLKPLVDRARTKAL

GQGMEATRIGSLVERGRAWLSRFAAHVRGDPADPLVPPSVLKQDRQTIA

AAQAVASAVRHLSQREAAFERTALYKAALDFGLPTTIADVEKRTRALVR

SGDLIAGKGEHKGWLASRDAVVTEQRILSEVAAGKGDSSPAITPQKAAA

SVQAAALTGQGFRLNEGQLAAARLILISKDRTIAVQGIAGAGKSSVLKP

VAEVLRDEGHPVIGLAIQNTLVQMLERDTGIGSQTLARFLGGWNKLLDD

PGNVALRAEAQASLKDHVLVLDEASMVSNEDKEKLVRLANLAGVHRLVL

IGDRKQLGAVDAGKPFALLQRAGIARAEMATNLRARDPVVREAQAAAQA

GDVRKALRHLKSHTVEARGDGAQVAAETWLALDKETRARTSIYASGRAI

RSAVNAAVQQGLLASREIGPAKMKLEVLDRVNTTREELRHLPAYRAGRV

LEVSRKQQALGLFIGEYRVIGQDRKGKLVEVEDKRGKRFRFDPARIRAG

KGDDNLTLLEPRKLEIHEGDRIRWTRNDHRRGLFNADQARVVEIANGKV

TFETSKGDLVELKKDDPMLKRIDLAYALNVHMAQGLTSDRGIAVMDSRE

RNLSNQKTFLVTVTRLRDHLTLVVDSADKLGAAVARNKGEKASAIEVTG

SVKPTATKGSGVDQPKSVEANKAEKELTRSKSKTLDFGI

Hel308 Mbu helicase

SEQ ID NO: 7

MMIRELDIPRDIIGFYEDSGIKELYPPQAEAIEMGLLEKKNLLAAIPTA

SGKTLLAELAMIKAIREGGKALYIVPLRALASEKFERFKELAPFGIKVG

ISTGDLDSRADWLGVNDIIVATSEKTDSLLRNGTSWMDEITTVVVDEIH

LLDSKNRGPTLEVTITKLMRLNPDVQVVALSATVGNAREMADWLGAALV

LSEWRPTDLHEGVLFGDAINFPGSQKKIDRLEKDDAVNLVLDTIKAEGQ

CLVFESSRRNCAGFAKTASSKVAKILDNDIMIKLAGIAEEVESTGETDT

AIVLANCIRKGVAFHHAGLNSNHRKLVENGFRQNLIKVISSTPTLAAGL

NLPARRVIIRSYRRFDSNFGMQPIPVLEYKQMAGRAGRPHLDPYGESVL

LAKTYDEFAQLMENYVEADAEDIWSKLGTENALRTHVLSTIVNGFASTR

QELFDFFGATFFAYQQDKWMLEEVINDCLEFLIDKAMVSETEDIEDASK

LFLRGTRLGSLVSMLYIDPLSGSKIVDGFKDIGKSTGGNMGSLEDDKGD

DITVTDMTLLHLVCSTPDMRQLYLRNTDYTIVNEYIVAHSDEFHEIPDK

LKETDYEWFMGEVKTAMLLEEWVTEVSAEDITRHFNVGEGDIHALADTS

EWLMHAAAKLAELLGVEYSSHAYSLEKRIRYGSGLDLMELVGIRGVGRV

RARKLYNAGFVSVAKLKGADISVLSKLVGPKVAYNILSGIGVRVNDKHF

NSAPISSNTLDTLLDKNQKTFNDFQ

Dda helicase

SEQ ID NO: 8

MTFDDLTEGQKNAFNIVMKAIKEKKHHVTINGPAGTGKTTLTKFIIEAL

ISTGETGIILAAPTHAAKKILSKLSGKEASTIHSILKINPVTYEENVLF

EQKEVPDLAKCRVLICDEVSMYDRKLFKILLSTIPPWCTIIGIGDNKQI

RPVDPGENTAYISPFFTHKDFYQCELTEVKRSNAPIIDVATDVRNGKWI

YDKVVDGHGVRGFTGDTALRDFMVNYFSIVKSLDDLFENRVMAFTNKSV

DKLNSIIRKKIFETDKDFIVGEIIVMQEPLFKTYKIDGKPVSEIIFNNG

QLVRIIEAEYTSTFVKARGVPGEYLIRHWDLTVETYGDDEYYREKIKII

SSDEELYKFNLFLGKTAETYKNWNKGGKAPWSDFWDAKSQFSKVKALPA

STFHKAQGMSVDRAFIYTPCIHYADVELAQQLLYVGVTRGRYDVFYV

The invention claimed is:

1. A method of detecting an analyte in a medium, the medium comprising a light-scattering constituent, the method comprising:

contacting the medium with a nanopore;

generating a flux of the constituent through the nanopore;

contacting the analyte with the nanopore so that the analyte influences the flux of the constituent through the nanopore;

illuminating the medium in the vicinity of the nanopore with one or more light sources; and taking one or more measurements of the light scattered by the constituent in the vicinity of the nanopore as the analyte moves with respect to the nanopore, and thereby detecting the analyte as it moves with respect to the nanopore.

2. A method according to claim 1, wherein taking one or more measurements of the light scattered by the constituent comprises generating a scattering signal corresponding to the flux of the constituent through the nanopore.

3. A method according to claim 2, wherein taking one or more measurements of the light scattered by the constituent comprises detecting interference between the scattering signal and a reference beam.

4. A method according to claim 3, wherein the interference is detected by reflection interference contrast microscopy, digital holographic interference microscopy, interference scattering microscopy (iSCAT), or coherent brightfield interference microscopy (COBRI).

5. A method according to claim 3, wherein the reference beam is reflected from an interface.

6. A method according to claim 1, wherein the flux of the constituent is from a first volume of medium to a second volume of medium, and wherein the one or more measurements of the light scattered by the constituent are one or more measurements of the second volume of medium in the vicinity of the nanopore.

7. A method according to claim 1, wherein the light-scattering constituent has a refractive index different to the refractive index of the medium; optionally wherein the light-scattering constituent has a refractive index greater than the refractive index of the medium.

8. A method according to claim 1, wherein the constituent comprises a hydrophilic water-soluble molecule.

9. A method according to claim 1, wherein the constituent is uncharged.

10. A method according to claim 1, wherein the constituent comprises a saccharide or a polyethylene glycol.

11. A method according to claim 1, wherein the flux of the constituent through the nanopore is driven by a physical or chemical potential.

12. A method according to claim 1, wherein the flux of the constituent through the nanopore is driven by an electrical potential or by a chemical concentration gradient across the nanopore.

13. A method according to claim 1, wherein the analyte is a biological polymer; optionally wherein the analyte is a polynucleotide or a polypeptide.

14. A method according to claim 1, wherein the movement of the analyte with respect to the nanopore is driven by a physical or chemical potential.

15. A method according to claim 1, comprising contacting the analyte with a motor protein, wherein the motor protein controls the movement of the analyte with respect to the nanopore; optionally wherein the motor protein is a helicase, a polymerase, an exonuclease, a topoisomerase, an unfoldase, or a variant thereof.

16. A method according to claim 1, wherein the medium comprises an aqueous or non-aqueous solvent.

17. A method according to claim 1, wherein the nanopore is a protein nanopore, a solid-state nanopore, a nucleic acid nanopore, or a polymer nanopore; optionally wherein the nanopore is a beta-barrel protein nanopore.

18. A method according to claim 1, wherein the nanopore is present in a membrane.

19. A method according to claim 1, wherein the nanopore is present in a droplet interface bilayer.

20. A method of characterising an analyte, comprising carrying out a method according to claim 1; and taking one or more measurements as the analyte moves with respect to the nanopore, wherein the one or more measurements are indicative of one or more characteristics of the analyte, and thereby characterising the analyte as it moves with respect to the nanopore.

21. A system, comprising:

a medium comprising a light-scattering constituent;

a nanopore in contact with the medium;

the medium in the vicinity of the nanopore being illuminated by one or more light sources; and a reference light source.

22. An apparatus for detecting an analyte, comprising:

a chamber having a volume, said volume containing a medium comprising a light-scattering constituent;

a membrane comprising a nanopore, wherein said nanopore is in contact with said medium;

one or more light sources for illuminating the volume in the vicinity of the nanopore; and a detector for detecting light scattered by the constituent.

* * * * *

SEQUENCE LISTING

<160> NUMBER OF SEQ ID NOS: 8

<210> SEQ ID NO 1
<211> LENGTH: 485
<212> TYPE: PRT
<213> ORGANISM: Escherichia coli

<400> SEQUENCE: 1

```
Met Met Asn Asp Gly Lys Gln Gln Ser Thr Phe Leu Phe His Asp Tyr
1               5                   10                  15

Glu Thr Phe Gly Thr His Pro Ala Leu Asp Arg Pro Ala Gln Phe Ala
            20                  25                  30

Ala Ile Arg Thr Asp Ser Glu Phe Asn Val Ile Gly Glu Pro Glu Val
        35                  40                  45

Phe Tyr Cys Lys Pro Ala Asp Asp Tyr Leu Pro Gln Pro Gly Ala Val
    50                  55                  60

Leu Ile Thr Gly Ile Thr Pro Gln Glu Ala Arg Ala Lys Gly Glu Asn
65                  70                  75                  80

Glu Ala Ala Phe Ala Ala Arg Ile His Ser Leu Phe Thr Val Pro Lys
                85                  90                  95

Thr Cys Ile Leu Gly Tyr Asn Asn Val Arg Phe Asp Asp Glu Val Thr
            100                 105                 110

Arg Asn Ile Phe Tyr Arg Asn Phe Tyr Asp Pro Tyr Ala Trp Ser Trp
            115                 120                 125

Gln His Asp Asn Ser Arg Trp Asp Leu Leu Asp Val Met Arg Ala Cys
    130                 135                 140

Tyr Ala Leu Arg Pro Glu Gly Ile Asn Trp Pro Glu Asn Asp Asp Gly
145                 150                 155                 160

Leu Pro Ser Phe Arg Leu Glu His Leu Thr Lys Ala Asn Gly Ile Glu
                165                 170                 175

His Ser Asn Ala His Asp Ala Met Ala Asp Val Tyr Ala Thr Ile Ala
            180                 185                 190

Met Ala Lys Leu Val Lys Thr Arg Gln Pro Arg Leu Phe Asp Tyr Leu
            195                 200                 205

Phe Thr His Arg Asn Lys His Lys Leu Met Ala Leu Ile Asp Val Pro
    210                 215                 220

Gln Met Lys Pro Leu Val His Val Ser Gly Met Phe Gly Ala Trp Arg
225                 230                 235                 240

Gly Asn Thr Ser Trp Val Ala Pro Leu Ala Trp His Pro Glu Asn Arg
                245                 250                 255

Asn Ala Val Ile Met Val Asp Leu Ala Gly Asp Ile Ser Pro Leu Leu
            260                 265                 270

Glu Leu Asp Ser Asp Thr Leu Arg Glu Arg Leu Tyr Thr Ala Lys Thr
            275                 280                 285

Asp Leu Gly Asp Asn Ala Ala Val Pro Val Lys Leu Val His Ile Asn
    290                 295                 300

Lys Cys Pro Val Leu Ala Gln Ala Asn Thr Leu Arg Pro Glu Asp Ala
305                 310                 315                 320

Asp Arg Leu Gly Ile Asn Arg Gln His Cys Leu Asp Asn Leu Lys Ile
                325                 330                 335

Leu Arg Glu Asn Pro Gln Val Arg Glu Lys Val Val Ala Ile Phe Ala
            340                 345                 350

Glu Ala Glu Pro Phe Thr Pro Ser Asp Asn Val Asp Ala Gln Leu Tyr
            355                 360                 365
```

-continued

```
Asn Gly Phe Phe Ser Asp Ala Asp Arg Ala Ala Met Lys Ile Val Leu
    370                 375                 380

Glu Thr Glu Pro Arg Asn Leu Pro Ala Leu Asp Ile Thr Phe Val Asp
385                 390                 395                 400

Lys Arg Ile Glu Lys Leu Leu Phe Asn Tyr Arg Ala Arg Asn Phe Pro
                405                 410                 415

Gly Thr Leu Asp Tyr Ala Glu Gln Gln Arg Trp Leu Glu His Arg Arg
                420                 425                 430

Gln Val Phe Thr Pro Glu Phe Leu Gln Gly Tyr Ala Asp Glu Leu Gln
            435                 440                 445

Met Leu Val Gln Gln Tyr Ala Asp Asp Lys Glu Lys Val Ala Leu Leu
    450                 455                 460

Lys Ala Leu Trp Gln Tyr Ala Glu Glu Ile Val Ser Gly Ser Gly His
465                 470                 475                 480

His His His His His
                485

<210> SEQ ID NO 2
<211> LENGTH: 268
<212> TYPE: PRT
<213> ORGANISM: Escherichia coli

<400> SEQUENCE: 2

Met Lys Phe Val Ser Phe Asn Ile Asn Gly Leu Arg Ala Arg Pro His
1               5                   10                  15

Gln Leu Glu Ala Ile Val Glu Lys His Gln Pro Asp Val Ile Gly Leu
            20                  25                  30

Gln Glu Thr Lys Val His Asp Asp Met Phe Pro Leu Glu Glu Val Ala
        35                  40                  45

Lys Leu Gly Tyr Asn Val Phe Tyr His Gly Gln Lys Gly His Tyr Gly
    50                  55                  60

Val Ala Leu Leu Thr Lys Glu Thr Pro Ile Ala Val Arg Arg Gly Phe
65                  70                  75                  80

Pro Gly Asp Asp Glu Glu Ala Gln Arg Arg Ile Ile Met Ala Glu Ile
                85                  90                  95

Pro Ser Leu Leu Gly Asn Val Thr Val Ile Asn Gly Tyr Phe Pro Gln
            100                 105                 110

Gly Glu Ser Arg Asp His Pro Ile Lys Phe Pro Ala Lys Ala Gln Phe
            115                 120                 125

Tyr Gln Asn Leu Gln Asn Tyr Leu Glu Thr Glu Leu Lys Arg Asp Asn
    130                 135                 140

Pro Val Leu Ile Met Gly Asp Met Asn Ile Ser Pro Thr Asp Leu Asp
145                 150                 155                 160

Ile Gly Ile Gly Glu Glu Asn Arg Lys Arg Trp Leu Arg Thr Gly Lys
                165                 170                 175

Cys Ser Phe Leu Pro Glu Glu Arg Glu Trp Met Asp Arg Leu Met Ser
            180                 185                 190

Trp Gly Leu Val Asp Thr Phe Arg His Ala Asn Pro Gln Thr Ala Asp
            195                 200                 205

Arg Phe Ser Trp Phe Asp Tyr Arg Ser Lys Gly Phe Asp Asp Asn Arg
    210                 215                 220

Gly Leu Arg Ile Asp Leu Leu Leu Ala Ser Gln Pro Leu Ala Glu Cys
225                 230                 235                 240

Cys Val Glu Thr Gly Ile Asp Tyr Glu Ile Arg Ser Met Glu Lys Pro
                245                 250                 255
```

-continued

Ser Asp His Ala Pro Val Trp Ala Thr Phe Arg Arg
        260                 265

<210> SEQ ID NO 3
<211> LENGTH: 425
<212> TYPE: PRT
<213> ORGANISM: Thermus thermophilus

<400> SEQUENCE: 3

Met Phe Arg Arg Lys Glu Asp Leu Asp Pro Pro Leu Ala Leu Leu Pro
1               5                   10                  15

Leu Lys Gly Leu Arg Glu Ala Ala Ala Leu Leu Glu Glu Ala Leu Arg
            20                  25                  30

Gln Gly Lys Arg Ile Arg Val His Gly Asp Tyr Asp Ala Asp Gly Leu
        35                  40                  45

Thr Gly Thr Ala Ile Leu Val Arg Gly Leu Ala Ala Leu Gly Ala Asp
    50                  55                  60

Val His Pro Phe Ile Pro His Arg Leu Glu Glu Gly Tyr Gly Val Leu
65                  70                  75                  80

Met Glu Arg Val Pro Glu His Leu Glu Ala Ser Asp Leu Phe Leu Thr
                85                  90                  95

Val Asp Cys Gly Ile Thr Asn His Ala Glu Leu Arg Glu Leu Leu Glu
            100                 105                 110

Asn Gly Val Glu Val Ile Val Thr Asp His His Thr Pro Gly Lys Thr
        115                 120                 125

Pro Pro Pro Gly Leu Val Val His Pro Ala Leu Thr Pro Asp Leu Lys
    130                 135                 140

Glu Lys Pro Thr Gly Ala Gly Val Ala Phe Leu Leu Leu Trp Ala Leu
145                 150                 155                 160

His Glu Arg Leu Gly Leu Pro Pro Pro Leu Glu Tyr Ala Asp Leu Ala
                165                 170                 175

Ala Val Gly Thr Ile Ala Asp Val Ala Pro Leu Trp Gly Trp Asn Arg
            180                 185                 190

Ala Leu Val Lys Glu Gly Leu Ala Arg Ile Pro Ala Ser Ser Trp Val
        195                 200                 205

Gly Leu Arg Leu Leu Ala Glu Ala Val Gly Tyr Thr Gly Lys Ala Val
    210                 215                 220

Glu Val Ala Phe Arg Ile Ala Pro Arg Ile Asn Ala Ala Ser Arg Leu
225                 230                 235                 240

Gly Glu Ala Glu Lys Ala Leu Arg Leu Leu Leu Thr Asp Asp Ala Ala
                245                 250                 255

Glu Ala Gln Ala Leu Val Gly Glu Leu His Arg Leu Asn Ala Arg Arg
            260                 265                 270

Gln Thr Leu Glu Glu Ala Met Leu Arg Lys Leu Leu Pro Gln Ala Asp
        275                 280                 285

Pro Glu Ala Lys Ala Ile Val Leu Leu Asp Pro Glu Gly His Pro Gly
    290                 295                 300

Val Met Gly Ile Val Ala Ser Arg Ile Leu Glu Ala Thr Leu Arg Pro
305                 310                 315                 320

Val Phe Leu Val Ala Gln Gly Lys Gly Thr Val Arg Ser Leu Ala Pro
                325                 330                 335

Ile Ser Ala Val Glu Ala Leu Arg Ser Ala Glu Asp Leu Leu Leu Arg
            340                 345                 350

Tyr Gly Gly His Lys Glu Ala Ala Gly Phe Ala Met Asp Glu Ala Leu

-continued

```
            355                 360                 365

Phe Pro Ala Phe Lys Ala Arg Val Glu Ala Tyr Ala Ala Arg Phe Pro
        370                 375                 380

Asp Pro Val Arg Glu Val Ala Leu Leu Asp Leu Leu Pro Glu Pro Gly
385                 390                 395                 400

Leu Leu Pro Gln Val Phe Arg Glu Leu Ala Leu Leu Glu Pro Tyr Gly
                405                 410                 415

Glu Gly Asn Pro Glu Pro Leu Phe Leu
            420                 425

<210> SEQ ID NO 4
<211> LENGTH: 226
<212> TYPE: PRT
<213> ORGANISM: Bacteriophage lambda

<400> SEQUENCE: 4

Met Thr Pro Asp Ile Ile Leu Gln Arg Thr Gly Ile Asp Val Arg Ala
1               5                   10                  15

Val Glu Gln Gly Asp Asp Ala Trp His Lys Leu Arg Leu Gly Val Ile
            20                  25                  30

Thr Ala Ser Glu Val His Asn Val Ile Ala Lys Pro Arg Ser Gly Lys
        35                  40                  45

Lys Trp Pro Asp Met Lys Met Ser Tyr Phe His Thr Leu Leu Ala Glu
    50                  55                  60

Val Cys Thr Gly Val Ala Pro Glu Val Asn Ala Lys Ala Leu Ala Trp
65                  70                  75                  80

Gly Lys Gln Tyr Glu Asn Asp Ala Arg Thr Leu Phe Glu Phe Thr Ser
                85                  90                  95

Gly Val Asn Val Thr Glu Ser Pro Ile Ile Tyr Arg Asp Glu Ser Met
            100                 105                 110

Arg Thr Ala Cys Ser Pro Asp Gly Leu Cys Ser Asp Gly Asn Gly Leu
        115                 120                 125

Glu Leu Lys Cys Pro Phe Thr Ser Arg Asp Phe Met Lys Phe Arg Leu
    130                 135                 140

Gly Gly Phe Glu Ala Ile Lys Ser Ala Tyr Met Ala Gln Val Gln Tyr
145                 150                 155                 160

Ser Met Trp Val Thr Arg Lys Asn Ala Trp Tyr Phe Ala Asn Tyr Asp
                165                 170                 175

Pro Arg Met Lys Arg Glu Gly Leu His Tyr Val Val Ile Glu Arg Asp
            180                 185                 190

Glu Lys Tyr Met Ala Ser Phe Asp Glu Ile Val Pro Glu Phe Ile Glu
        195                 200                 205

Lys Met Asp Glu Ala Leu Ala Glu Ile Gly Phe Val Phe Gly Glu Gln
    210                 215                 220

Trp Arg
225

<210> SEQ ID NO 5
<211> LENGTH: 608
<212> TYPE: PRT
<213> ORGANISM: Bacillus subtilis phage Phi 29

<400> SEQUENCE: 5

Met Lys His Met Pro Arg Lys Met Tyr Ser Cys Ala Phe Glu Thr Thr
1               5                   10                  15

Thr Lys Val Glu Asp Cys Arg Val Trp Ala Tyr Gly Tyr Met Asn Ile
```

-continued

```
                 20                25                30
Glu Asp His Ser Glu Tyr Lys Ile Gly Asn Ser Leu Asp Glu Phe Met
             35                40                45
Ala Trp Val Leu Lys Val Gln Ala Asp Leu Tyr Phe His Asn Leu Lys
     50                55                60
Phe Asp Gly Ala Phe Ile Ile Asn Trp Leu Glu Arg Asn Gly Phe Lys
65                70                75                80
Trp Ser Ala Asp Gly Leu Pro Asn Thr Tyr Asn Thr Ile Ile Ser Arg
                 85                90                95
Met Gly Gln Trp Tyr Met Ile Asp Ile Cys Leu Gly Tyr Lys Gly Lys
                 100               105               110
Arg Lys Ile His Thr Val Ile Tyr Asp Ser Leu Lys Lys Leu Pro Phe
             115               120               125
Pro Val Lys Lys Ile Ala Lys Asp Phe Lys Leu Thr Val Leu Lys Gly
         130               135               140
Asp Ile Asp Tyr His Lys Glu Arg Pro Val Gly Tyr Lys Ile Thr Pro
145               150               155               160
Glu Glu Tyr Ala Tyr Ile Lys Asn Asp Ile Gln Ile Ile Ala Glu Ala
                 165               170               175
Leu Leu Ile Gln Phe Lys Gln Gly Leu Asp Arg Met Thr Ala Gly Ser
             180               185               190
Asp Ser Leu Lys Gly Phe Lys Asp Ile Ile Thr Thr Lys Lys Phe Lys
             195               200               205
Lys Val Phe Pro Thr Leu Ser Leu Gly Leu Asp Lys Glu Val Arg Tyr
         210               215               220
Ala Tyr Arg Gly Gly Phe Thr Trp Leu Asn Asp Arg Phe Lys Glu Lys
225               230               235               240
Glu Ile Gly Glu Gly Met Val Phe Asp Val Asn Ser Leu Tyr Pro Ala
                 245               250               255
Gln Met Tyr Ser Arg Leu Leu Pro Tyr Gly Glu Pro Ile Val Phe Glu
             260               265               270
Gly Lys Tyr Val Trp Asp Glu Asp Tyr Pro Leu His Ile Gln His Ile
             275               280               285
Arg Cys Glu Phe Glu Leu Lys Glu Gly Tyr Ile Pro Thr Ile Gln Ile
     290               295               300
Lys Arg Ser Arg Phe Tyr Lys Gly Asn Glu Tyr Leu Lys Ser Ser Gly
305               310               315               320
Gly Glu Ile Ala Asp Leu Trp Leu Ser Asn Val Asp Leu Glu Leu Met
             325               330               335
Lys Glu His Tyr Asp Leu Tyr Asn Val Glu Tyr Ile Ser Gly Leu Lys
             340               345               350
Phe Lys Ala Thr Thr Gly Leu Phe Lys Asp Phe Ile Asp Lys Trp Thr
             355               360               365
Tyr Ile Lys Thr Thr Ser Glu Gly Ala Ile Lys Gln Leu Ala Lys Leu
     370               375               380
Met Leu Asn Ser Leu Tyr Gly Lys Phe Ala Ser Asn Pro Asp Val Thr
385               390               395               400
Gly Lys Val Pro Tyr Leu Lys Glu Asn Gly Ala Leu Gly Phe Arg Leu
             405               410               415
Gly Glu Glu Glu Thr Lys Asp Pro Val Tyr Thr Pro Met Gly Val Phe
             420               425               430
Ile Thr Ala Trp Ala Arg Tyr Thr Thr Ile Thr Ala Ala Gln Ala Cys
             435               440               445
```

-continued

```
Tyr Asp Arg Ile Ile Tyr Cys Asp Thr Asp Ser Ile His Leu Thr Gly
    450             455             460

Thr Glu Ile Pro Asp Val Ile Lys Asp Ile Val Asp Pro Lys Lys Leu
465             470             475             480

Gly Tyr Trp Ala His Glu Ser Thr Phe Lys Arg Ala Lys Tyr Leu Arg
                485             490             495

Gln Lys Thr Tyr Ile Gln Asp Ile Tyr Met Lys Glu Val Asp Gly Lys
            500             505             510

Leu Val Glu Gly Ser Pro Asp Asp Tyr Thr Asp Ile Lys Phe Ser Val
            515             520             525

Lys Cys Ala Gly Met Thr Asp Lys Ile Lys Lys Glu Val Thr Phe Glu
    530             535             540

Asn Phe Lys Val Gly Phe Ser Arg Lys Met Lys Pro Lys Pro Val Gln
545             550             555             560

Val Pro Gly Gly Val Val Leu Val Asp Asp Thr Phe Thr Ile Lys Ser
            565             570             575

Gly Gly Ser Ala Trp Ser His Pro Gln Phe Glu Lys Gly Gly Gly Ser
            580             585             590

Gly Gly Gly Ser Gly Gly Ser Ala Trp Ser His Pro Gln Phe Glu Lys
            595             600             605
```

```
<210> SEQ ID NO 6
<211> LENGTH: 970
<212> TYPE: PRT
<213> ORGANISM: Citromicrobium bathyomarinum

<400> SEQUENCE: 6
```

```
Met Leu Ser Val Ala Asn Val Arg Ser Pro Ser Ala Ala Ala Ser Tyr
1               5               10              15

Phe Ala Ser Asp Asn Tyr Tyr Ala Ser Ala Asp Ala Asp Arg Ser Gly
            20              25              30

Gln Trp Ile Gly Asp Gly Ala Lys Arg Leu Gly Leu Glu Gly Lys Val
            35              40              45

Glu Ala Arg Ala Phe Asp Ala Leu Leu Arg Gly Glu Leu Pro Asp Gly
    50              55              60

Ser Ser Val Gly Asn Pro Gly Gln Ala His Arg Pro Gly Thr Asp Leu
65              70              75              80

Thr Phe Ser Val Pro Lys Ser Trp Ser Leu Leu Ala Leu Val Gly Lys
                85              90              95

Asp Glu Arg Ile Ile Ala Ala Tyr Arg Glu Ala Val Val Glu Ala Leu
            100             105             110

His Trp Ala Glu Lys Asn Ala Ala Glu Thr Arg Val Val Glu Lys Gly
            115             120             125

Met Val Val Thr Gln Ala Thr Gly Asn Leu Ala Ile Gly Leu Phe Gln
    130             135             140

His Asp Thr Asn Arg Asn Gln Glu Pro Asn Leu His Phe His Ala Val
145             150             155             160

Ile Ala Asn Val Thr Gln Gly Lys Asp Gly Lys Trp Arg Thr Leu Lys
                165             170             175

Asn Asp Arg Leu Trp Gln Leu Asn Thr Thr Leu Asn Ser Ile Ala Met
            180             185             190

Ala Arg Phe Arg Val Ala Val Glu Lys Leu Gly Tyr Glu Pro Gly Pro
            195             200             205

Val Leu Lys His Gly Asn Phe Glu Ala Arg Gly Ile Ser Arg Glu Gln
```

```
           210               215               220
Val Met Ala Phe Ser Thr Arg Arg Lys Glu Val Leu Glu Ala Arg Arg
225               230               235               240

Gly Pro Gly Leu Asp Ala Gly Arg Ile Ala Ala Leu Asp Thr Arg Ala
                  245               250               255

Ser Lys Glu Gly Ile Glu Asp Arg Ala Thr Leu Ser Lys Gln Trp Ser
                  260               265               270

Glu Ala Ala Gln Ser Ile Gly Leu Asp Leu Lys Pro Leu Val Asp Arg
                  275               280               285

Ala Arg Thr Lys Ala Leu Gly Gln Gly Met Glu Ala Thr Arg Ile Gly
         290               295               300

Ser Leu Val Glu Arg Gly Arg Ala Trp Leu Ser Arg Phe Ala Ala His
305               310               315               320

Val Arg Gly Asp Pro Ala Asp Pro Leu Val Pro Pro Ser Val Leu Lys
                  325               330               335

Gln Asp Arg Gln Thr Ile Ala Ala Ala Gln Ala Val Ala Ser Ala Val
                  340               345               350

Arg His Leu Ser Gln Arg Glu Ala Ala Phe Glu Arg Thr Ala Leu Tyr
         355               360               365

Lys Ala Ala Leu Asp Phe Gly Leu Pro Thr Thr Ile Ala Asp Val Glu
         370               375               380

Lys Arg Thr Arg Ala Leu Val Arg Ser Gly Asp Leu Ile Ala Gly Lys
385               390               395               400

Gly Glu His Lys Gly Trp Leu Ala Ser Arg Asp Ala Val Val Thr Glu
                  405               410               415

Gln Arg Ile Leu Ser Glu Val Ala Ala Gly Lys Gly Asp Ser Ser Pro
                  420               425               430

Ala Ile Thr Pro Gln Lys Ala Ala Ala Ser Val Gln Ala Ala Ala Leu
         435               440               445

Thr Gly Gln Gly Phe Arg Leu Asn Glu Gly Gln Leu Ala Ala Ala Arg
         450               455               460

Leu Ile Leu Ile Ser Lys Asp Arg Thr Ile Ala Val Gln Gly Ile Ala
465               470               475               480

Gly Ala Gly Lys Ser Ser Val Leu Lys Pro Val Ala Glu Val Leu Arg
                  485               490               495

Asp Glu Gly His Pro Val Ile Gly Leu Ala Ile Gln Asn Thr Leu Val
                  500               505               510

Gln Met Leu Glu Arg Asp Thr Gly Ile Gly Ser Gln Thr Leu Ala Arg
         515               520               525

Phe Leu Gly Gly Trp Asn Lys Leu Leu Asp Asp Pro Gly Asn Val Ala
         530               535               540

Leu Arg Ala Glu Ala Gln Ala Ser Leu Lys Asp His Val Leu Val Leu
545               550               555               560

Asp Glu Ala Ser Met Val Ser Asn Glu Asp Lys Glu Lys Leu Val Arg
                  565               570               575

Leu Ala Asn Leu Ala Gly Val His Arg Leu Val Leu Ile Gly Asp Arg
                  580               585               590

Lys Gln Leu Gly Ala Val Asp Ala Gly Lys Pro Phe Ala Leu Leu Gln
         595               600               605

Arg Ala Gly Ile Ala Arg Ala Glu Met Ala Thr Asn Leu Arg Ala Arg
         610               615               620

Asp Pro Val Val Arg Glu Ala Gln Ala Ala Ala Gln Ala Gly Asp Val
625               630               635               640
```

-continued

```
Arg Lys Ala Leu Arg His Leu Lys Ser His Thr Val Glu Ala Arg Gly
                645             650             655

Asp Gly Ala Gln Val Ala Ala Glu Thr Trp Leu Ala Leu Asp Lys Glu
            660             665             670

Thr Arg Ala Arg Thr Ser Ile Tyr Ala Ser Gly Arg Ala Ile Arg Ser
        675             680             685

Ala Val Asn Ala Ala Val Gln Gln Gly Leu Leu Ala Ser Arg Glu Ile
    690             695             700

Gly Pro Ala Lys Met Lys Leu Glu Val Leu Asp Arg Val Asn Thr Thr
705             710             715             720

Arg Glu Glu Leu Arg His Leu Pro Ala Tyr Arg Ala Gly Arg Val Leu
                725             730             735

Glu Val Ser Arg Lys Gln Gln Ala Leu Gly Leu Phe Ile Gly Glu Tyr
            740             745             750

Arg Val Ile Gly Gln Asp Arg Lys Gly Lys Leu Val Glu Val Glu Asp
        755             760             765

Lys Arg Gly Lys Arg Phe Arg Phe Asp Pro Ala Arg Ile Arg Ala Gly
    770             775             780

Lys Gly Asp Asp Asn Leu Thr Leu Leu Glu Pro Arg Lys Leu Glu Ile
785             790             795             800

His Glu Gly Asp Arg Ile Arg Trp Thr Arg Asn Asp His Arg Arg Gly
                805             810             815

Leu Phe Asn Ala Asp Gln Ala Arg Val Val Glu Ile Ala Asn Gly Lys
            820             825             830

Val Thr Phe Glu Thr Ser Lys Gly Asp Leu Val Glu Leu Lys Lys Asp
            835             840             845

Asp Pro Met Leu Lys Arg Ile Asp Leu Ala Tyr Ala Leu Asn Val His
    850             855             860

Met Ala Gln Gly Leu Thr Ser Asp Arg Gly Ile Ala Val Met Asp Ser
865             870             875             880

Arg Glu Arg Asn Leu Ser Asn Gln Lys Thr Phe Leu Val Thr Val Thr
                885             890             895

Arg Leu Arg Asp His Leu Thr Leu Val Val Asp Ser Ala Asp Lys Leu
            900             905             910

Gly Ala Ala Val Ala Arg Asn Lys Gly Glu Lys Ala Ser Ala Ile Glu
            915             920             925

Val Thr Gly Ser Val Lys Pro Thr Ala Thr Lys Gly Ser Gly Val Asp
    930             935             940

Gln Pro Lys Ser Val Glu Ala Asn Lys Ala Glu Lys Glu Leu Thr Arg
945             950             955             960

Ser Lys Ser Lys Thr Leu Asp Phe Gly Ile
                965             970
```

```
<210> SEQ ID NO 7
<211> LENGTH: 760
<212> TYPE: PRT
<213> ORGANISM: Methanococcoides burtonii

<400> SEQUENCE: 7

Met Met Ile Arg Glu Leu Asp Ile Pro Arg Asp Ile Ile Gly Phe Tyr
1               5               10              15

Glu Asp Ser Gly Ile Lys Glu Leu Tyr Pro Pro Gln Ala Glu Ala Ile
            20              25              30

Glu Met Gly Leu Leu Glu Lys Lys Asn Leu Leu Ala Ala Ile Pro Thr
```

-continued

```
              35                    40                    45
Ala Ser Gly Lys Thr Leu Leu Ala Glu Leu Ala Met Ile Lys Ala Ile
    50                    55                    60

Arg Glu Gly Gly Lys Ala Leu Tyr Ile Val Pro Leu Arg Ala Leu Ala
65                    70                    75                    80

Ser Glu Lys Phe Glu Arg Phe Lys Glu Leu Ala Pro Phe Gly Ile Lys
                  85                    90                    95

Val Gly Ile Ser Thr Gly Asp Leu Asp Ser Arg Ala Asp Trp Leu Gly
                  100                   105                   110

Val Asn Asp Ile Ile Val Ala Thr Ser Glu Lys Thr Asp Ser Leu Leu
                  115                   120                   125

Arg Asn Gly Thr Ser Trp Met Asp Glu Ile Thr Thr Val Val Val Asp
                  130                   135                   140

Glu Ile His Leu Leu Asp Ser Lys Asn Arg Gly Pro Thr Leu Glu Val
145                   150                   155                   160

Thr Ile Thr Lys Leu Met Arg Leu Asn Pro Asp Val Gln Val Val Ala
                  165                   170                   175

Leu Ser Ala Thr Val Gly Asn Ala Arg Glu Met Ala Asp Trp Leu Gly
                  180                   185                   190

Ala Ala Leu Val Leu Ser Glu Trp Arg Pro Thr Asp Leu His Glu Gly
                  195                   200                   205

Val Leu Phe Gly Asp Ala Ile Asn Phe Pro Gly Ser Gln Lys Lys Ile
                  210                   215                   220

Asp Arg Leu Glu Lys Asp Asp Ala Val Asn Leu Val Leu Asp Thr Ile
225                   230                   235                   240

Lys Ala Glu Gly Gln Cys Leu Val Phe Glu Ser Ser Arg Arg Asn Cys
                  245                   250                   255

Ala Gly Phe Ala Lys Thr Ala Ser Ser Lys Val Ala Lys Ile Leu Asp
                  260                   265                   270

Asn Asp Ile Met Ile Lys Leu Ala Gly Ile Ala Glu Glu Val Glu Ser
                  275                   280                   285

Thr Gly Glu Thr Asp Thr Ala Ile Val Leu Ala Asn Cys Ile Arg Lys
                  290                   295                   300

Gly Val Ala Phe His His Ala Gly Leu Asn Ser Asn His Arg Lys Leu
305                   310                   315                   320

Val Glu Asn Gly Phe Arg Gln Asn Leu Ile Lys Val Ile Ser Ser Thr
                  325                   330                   335

Pro Thr Leu Ala Ala Gly Leu Asn Leu Pro Ala Arg Arg Val Ile Ile
                  340                   345                   350

Arg Ser Tyr Arg Arg Phe Asp Ser Asn Phe Gly Met Gln Pro Ile Pro
                  355                   360                   365

Val Leu Glu Tyr Lys Gln Met Ala Gly Arg Ala Gly Arg Pro His Leu
                  370                   375                   380

Asp Pro Tyr Gly Glu Ser Val Leu Leu Ala Lys Thr Tyr Asp Glu Phe
385                   390                   395                   400

Ala Gln Leu Met Glu Asn Tyr Val Glu Ala Asp Ala Glu Asp Ile Trp
                  405                   410                   415

Ser Lys Leu Gly Thr Glu Asn Ala Leu Arg Thr His Val Leu Ser Thr
                  420                   425                   430

Ile Val Asn Gly Phe Ala Ser Thr Arg Gln Glu Leu Phe Asp Phe Phe
                  435                   440                   445

Gly Ala Thr Phe Phe Ala Tyr Gln Gln Asp Lys Trp Met Leu Glu Glu
450                   455                   460
```

-continued

```
Val Ile Asn Asp Cys Leu Glu Phe Leu Ile Asp Lys Ala Met Val Ser
465                 470                 475                 480

Glu Thr Glu Asp Ile Glu Asp Ala Ser Lys Leu Phe Leu Arg Gly Thr
                    485                 490                 495

Arg Leu Gly Ser Leu Val Ser Met Leu Tyr Ile Asp Pro Leu Ser Gly
                500                 505                 510

Ser Lys Ile Val Asp Gly Phe Lys Asp Ile Gly Lys Ser Thr Gly Gly
                515                 520                 525

Asn Met Gly Ser Leu Glu Asp Asp Lys Gly Asp Asp Ile Thr Val Thr
                530                 535                 540

Asp Met Thr Leu Leu His Leu Val Cys Ser Thr Pro Asp Met Arg Gln
545                 550                 555                 560

Leu Tyr Leu Arg Asn Thr Asp Tyr Thr Ile Val Asn Glu Tyr Ile Val
                565                 570                 575

Ala His Ser Asp Glu Phe His Glu Ile Pro Asp Lys Leu Lys Glu Thr
                580                 585                 590

Asp Tyr Glu Trp Phe Met Gly Glu Val Lys Thr Ala Met Leu Leu Glu
                595                 600                 605

Glu Trp Val Thr Glu Val Ser Ala Glu Asp Ile Thr Arg His Phe Asn
                610                 615                 620

Val Gly Glu Gly Asp Ile His Ala Leu Ala Asp Thr Ser Glu Trp Leu
625                 630                 635                 640

Met His Ala Ala Ala Lys Leu Ala Glu Leu Leu Gly Val Glu Tyr Ser
                645                 650                 655

Ser His Ala Tyr Ser Leu Glu Lys Arg Ile Arg Tyr Gly Ser Gly Leu
                660                 665                 670

Asp Leu Met Glu Leu Val Gly Ile Arg Gly Val Gly Arg Val Arg Ala
                675                 680                 685

Arg Lys Leu Tyr Asn Ala Gly Phe Val Ser Val Ala Lys Leu Lys Gly
                690                 695                 700

Ala Asp Ile Ser Val Leu Ser Lys Leu Val Gly Pro Lys Val Ala Tyr
705                 710                 715                 720

Asn Ile Leu Ser Gly Ile Gly Val Arg Val Asn Asp Lys His Phe Asn
                725                 730                 735

Ser Ala Pro Ile Ser Ser Asn Thr Leu Asp Thr Leu Leu Asp Lys Asn
                740                 745                 750

Gln Lys Thr Phe Asn Asp Phe Gln
        755                 760
```

```
<210> SEQ ID NO 8
<211> LENGTH: 439
<212> TYPE: PRT
<213> ORGANISM: Enterobacteria phage T4

<400> SEQUENCE: 8

Met Thr Phe Asp Asp Leu Thr Glu Gly Gln Lys Asn Ala Phe Asn Ile
1               5                   10                  15

Val Met Lys Ala Ile Lys Glu Lys Lys His Val Thr Ile Asn Gly
                20                  25                  30

Pro Ala Gly Thr Gly Lys Thr Thr Leu Thr Lys Phe Ile Ile Glu Ala
            35                  40                  45

Leu Ile Ser Thr Gly Glu Thr Gly Ile Ile Leu Ala Ala Pro Thr His
        50                  55                  60

Ala Ala Lys Lys Ile Leu Ser Lys Leu Ser Gly Lys Glu Ala Ser Thr
```

```
65                      70                      75                      80

Ile His Ser Ile Leu Lys Ile Asn Pro Val Thr Tyr Glu Glu Asn Val
                    85                      90                      95

Leu Phe Glu Gln Lys Glu Val Pro Asp Leu Ala Lys Cys Arg Val Leu
                100                     105                     110

Ile Cys Asp Glu Val Ser Met Tyr Asp Arg Lys Leu Phe Lys Ile Leu
                115                     120                     125

Leu Ser Thr Ile Pro Pro Trp Cys Thr Ile Ile Gly Ile Gly Asp Asn
        130                     135                     140

Lys Gln Ile Arg Pro Val Asp Pro Gly Glu Asn Thr Ala Tyr Ile Ser
145                     150                     155                     160

Pro Phe Phe Thr His Lys Asp Phe Tyr Gln Cys Glu Leu Thr Glu Val
                165                     170                     175

Lys Arg Ser Asn Ala Pro Ile Ile Asp Val Ala Thr Asp Val Arg Asn
                180                     185                     190

Gly Lys Trp Ile Tyr Asp Lys Val Val Asp Gly His Gly Val Arg Gly
                195                     200                     205

Phe Thr Gly Asp Thr Ala Leu Arg Asp Phe Met Val Asn Tyr Phe Ser
        210                     215                     220

Ile Val Lys Ser Leu Asp Asp Leu Phe Glu Asn Arg Val Met Ala Phe
225                     230                     235                     240

Thr Asn Lys Ser Val Asp Lys Leu Asn Ser Ile Ile Arg Lys Lys Ile
                245                     250                     255

Phe Glu Thr Asp Lys Asp Phe Ile Val Gly Glu Ile Ile Val Met Gln
                260                     265                     270

Glu Pro Leu Phe Lys Thr Tyr Lys Ile Asp Gly Lys Pro Val Ser Glu
        275                     280                     285

Ile Ile Phe Asn Asn Gly Gln Leu Val Arg Ile Ile Glu Ala Glu Tyr
        290                     295                     300

Thr Ser Thr Phe Val Lys Ala Arg Gly Val Pro Gly Glu Tyr Leu Ile
305                     310                     315                     320

Arg His Trp Asp Leu Thr Val Glu Thr Tyr Gly Asp Asp Glu Tyr Tyr
                325                     330                     335

Arg Glu Lys Ile Lys Ile Ile Ser Ser Asp Glu Glu Leu Tyr Lys Phe
                340                     345                     350

Asn Leu Phe Leu Gly Lys Thr Ala Glu Thr Tyr Lys Asn Trp Asn Lys
        355                     360                     365

Gly Gly Lys Ala Pro Trp Ser Asp Phe Trp Asp Ala Lys Ser Gln Phe
        370                     375                     380

Ser Lys Val Lys Ala Leu Pro Ala Ser Thr Phe His Lys Ala Gln Gly
385                     390                     395                     400

Met Ser Val Asp Arg Ala Phe Ile Tyr Thr Pro Cys Ile His Tyr Ala
                405                     410                     415

Asp Val Glu Leu Ala Gln Gln Leu Leu Tyr Val Gly Val Thr Arg Gly
                420                     425                     430

Arg Tyr Asp Val Phe Tyr Val
        435
```